United States Patent [19]
Kirsten

[11] Patent Number: 6,011,901
[45] Date of Patent: Jan. 4, 2000

[54] COMPRESSED DIGITAL VIDEO RECORD AND PLAYBACK SYSTEM

[75] Inventor: Jeff P. Kirsten, Sunnyvale, Calif.

[73] Assignee: Timepres Corporation, Folsom, Calif.

[21] Appl. No.: 08/979,506

[22] Filed: Nov. 26, 1997

Related U.S. Application Data

[62] Division of application No. 08/444,286, May 18, 1995, Pat. No. 5,724,475.

[51] Int. Cl.[7] ............................. H04N 5/91; H04N 5/926; H04N 5/917
[52] U.S. Cl. ........................... 386/123; 386/124; 386/109
[58] Field of Search ..................................... 386/109, 111, 386/112, 123, 124, 129, 131, 68, 27, 33, 37, 52, 40, 46; H04N 5/91, 5/926, 5/917

[56] References Cited

U.S. PATENT DOCUMENTS 5,126,726   6/1992   Howard et al. .......................... 340/728
5,377,051  12/1994   Lane et al. ................................ 386/68

*Primary Examiner*—Robert Chevalier
*Attorney, Agent, or Firm*—Bennett Smith

[57] ABSTRACT

A record and playback system for video images, especially suited for multi-camera Industrial surveillance. Techniques for acquiring multiple asynchronous camera inputs, compressing video images, and storing digital image data are described. Selective resolution recording improves object discernability without large large increase in data storage. A recording system with automatic data archive that eliminates the need for regular operator attention is disclosed.

11 Claims, 46 Drawing Sheets

FIG. 1 - PRIOR ART

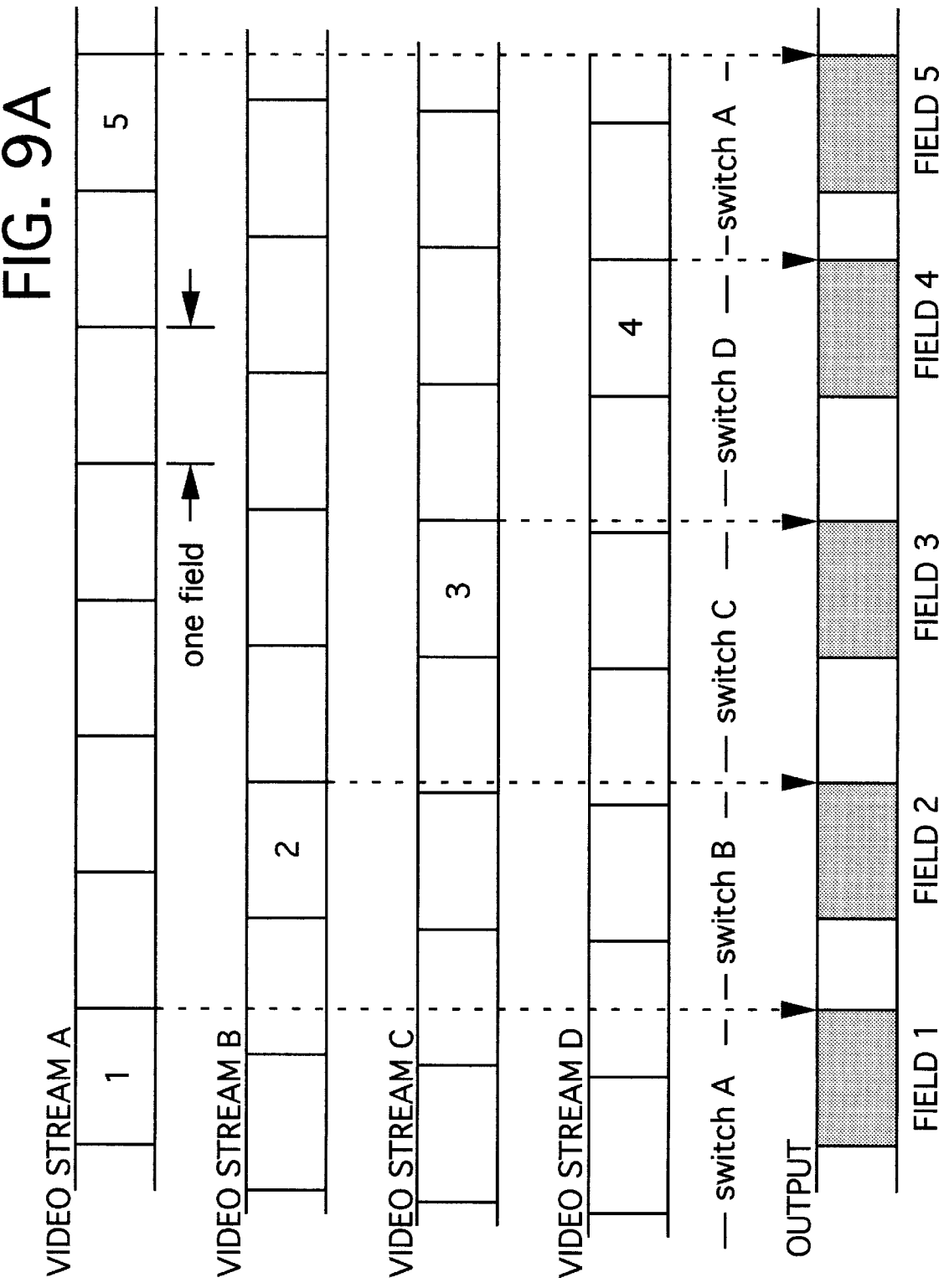

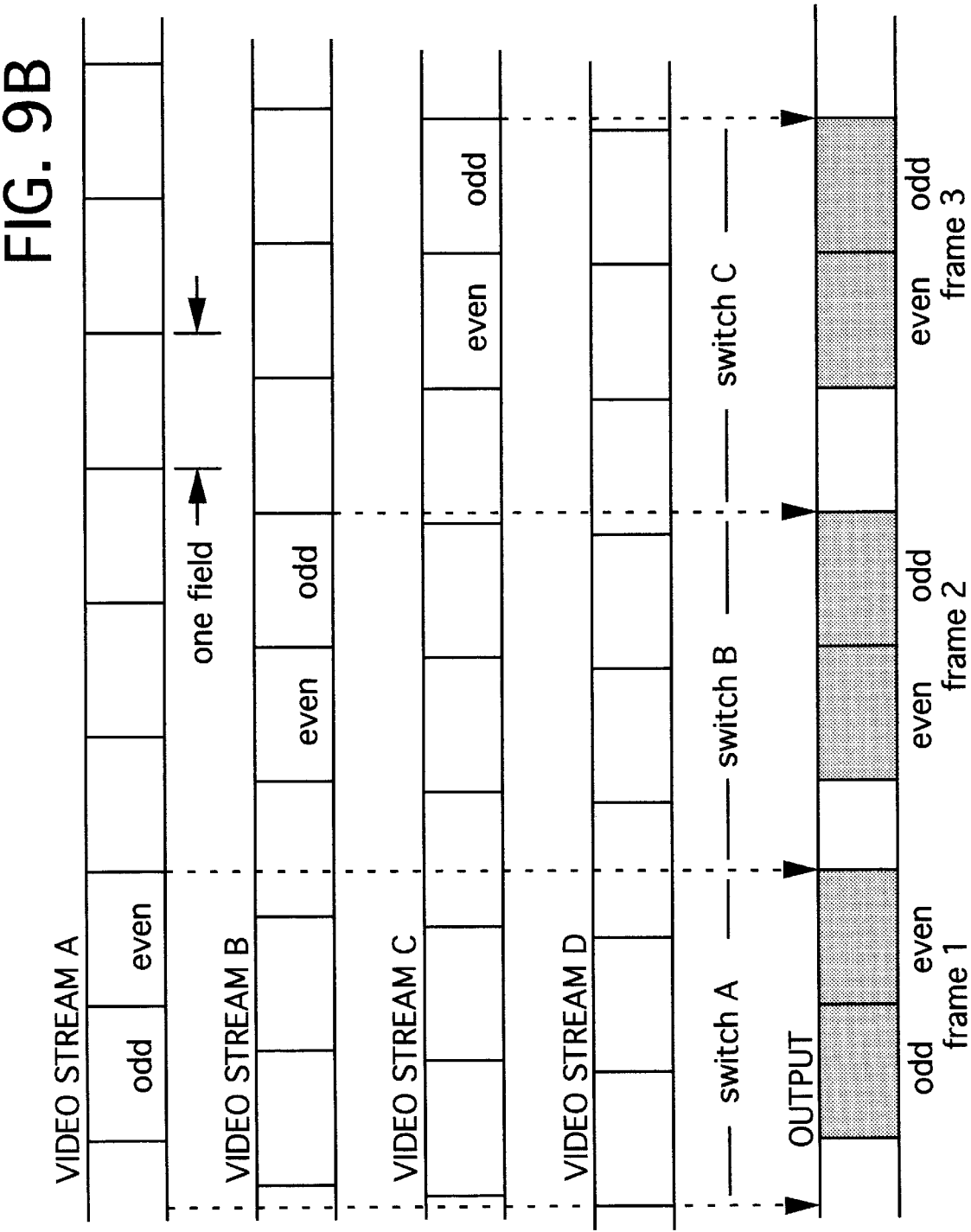

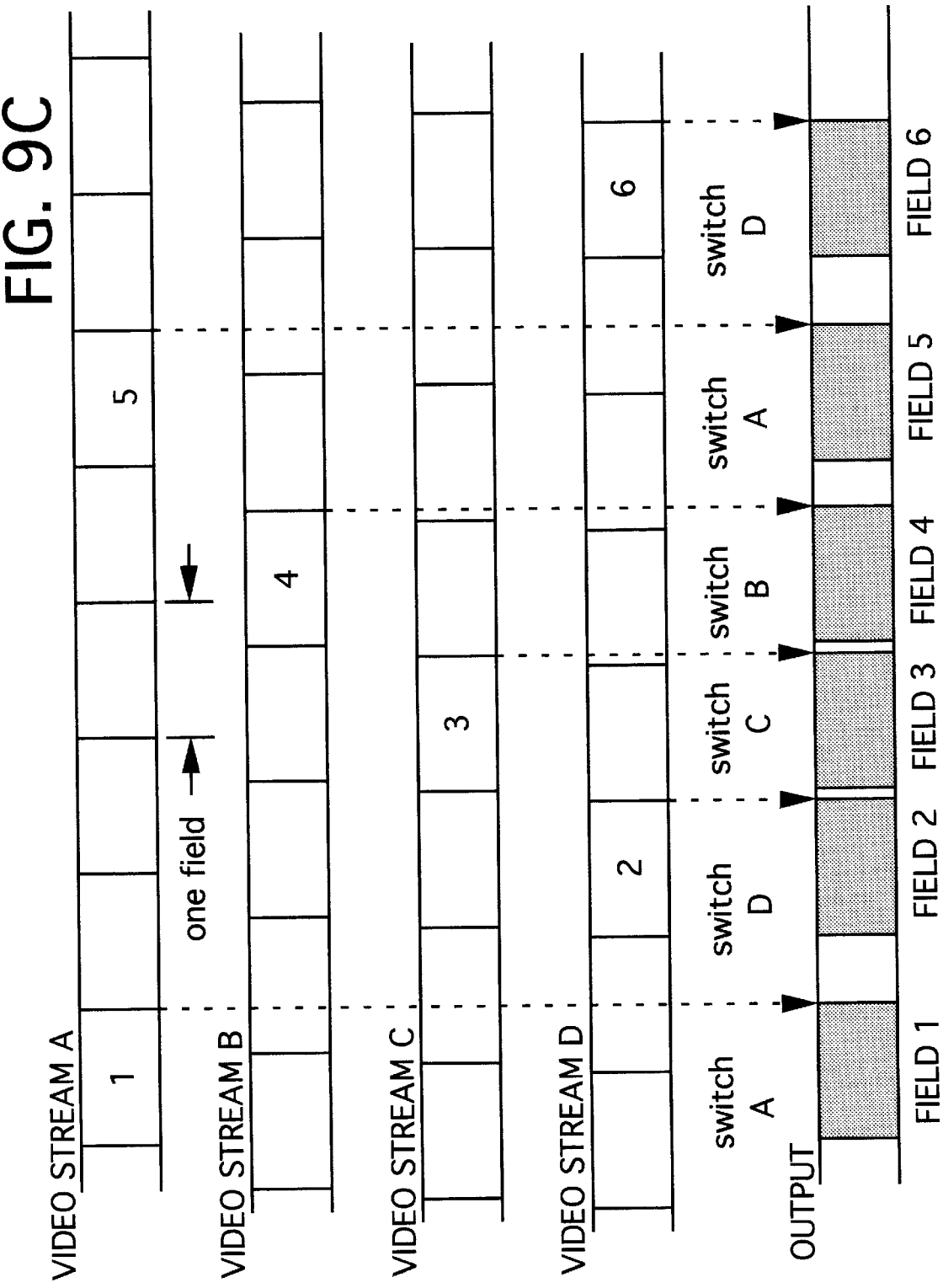

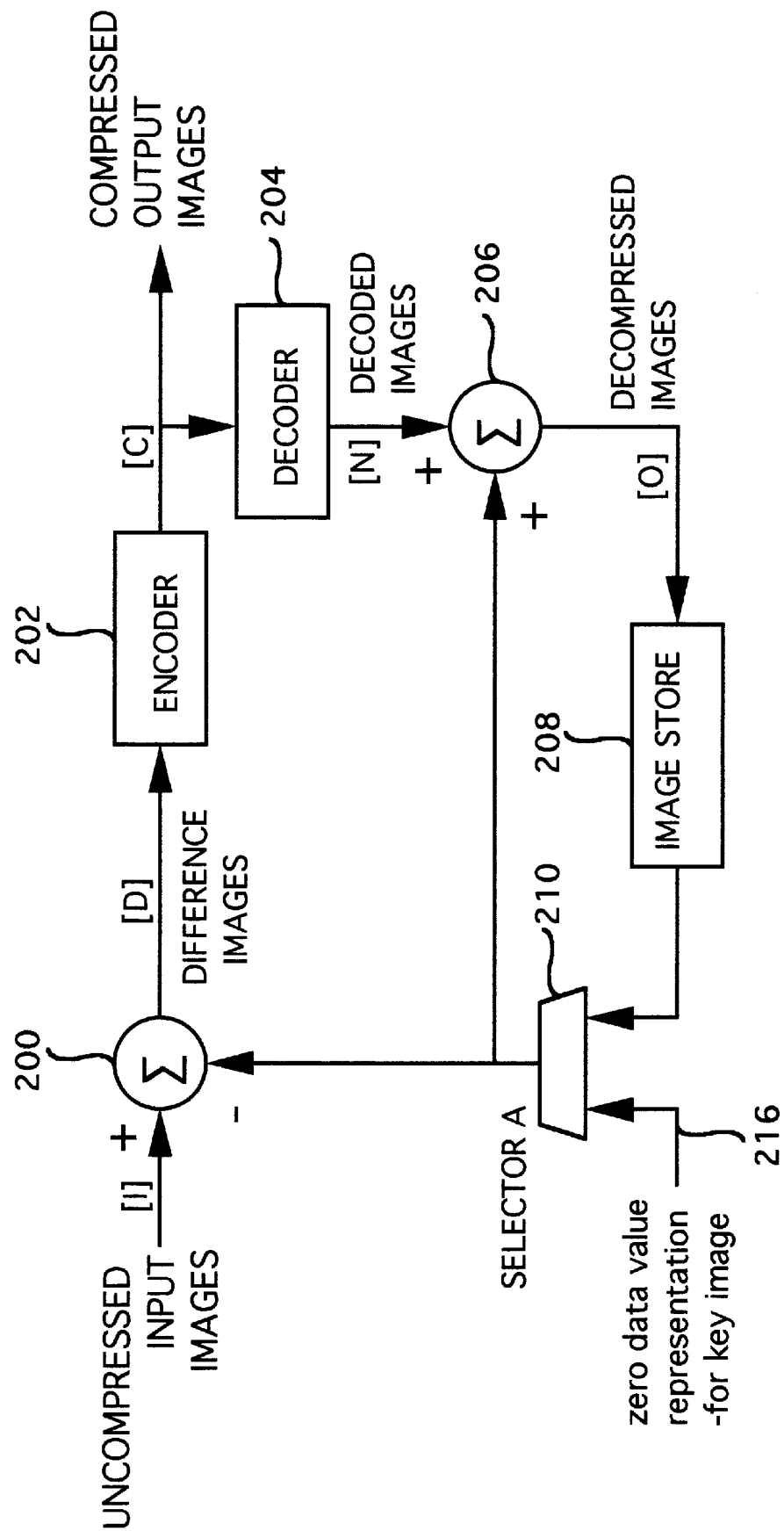
FIG. 11A – PRIOR ART

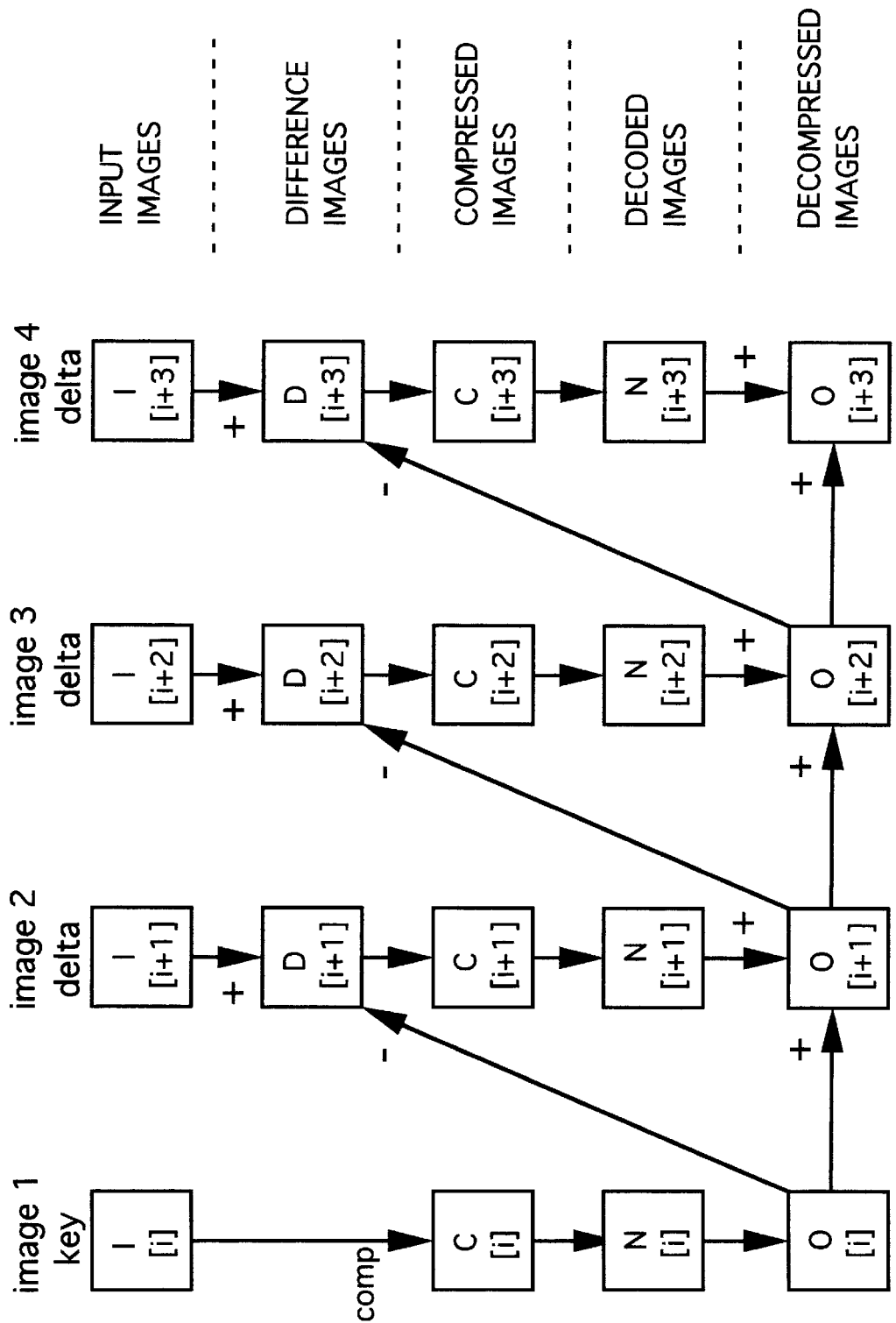
FIG. 11B - PRIOR ART

REPLACEMENT PROCESS A

REPLACEMENT PROCESS B 640 x 480 pel image
relative data: 4x 320 x 240 pel image
relative data: 1x windowed portion of Figure 11C
relative data: 1x split-resolution image
relative data: 1x + 1x = 2x difference image - low rate difference image - high rate

FIG 35A - PRIOR ART
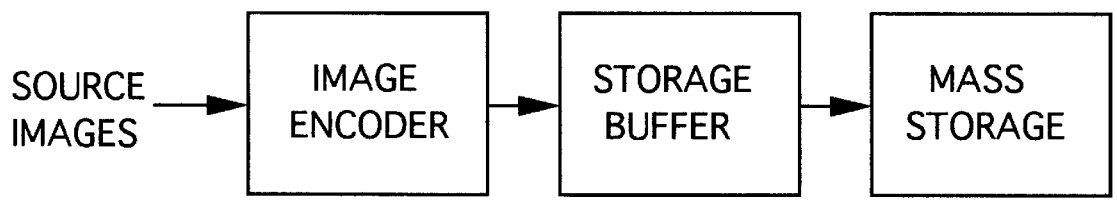
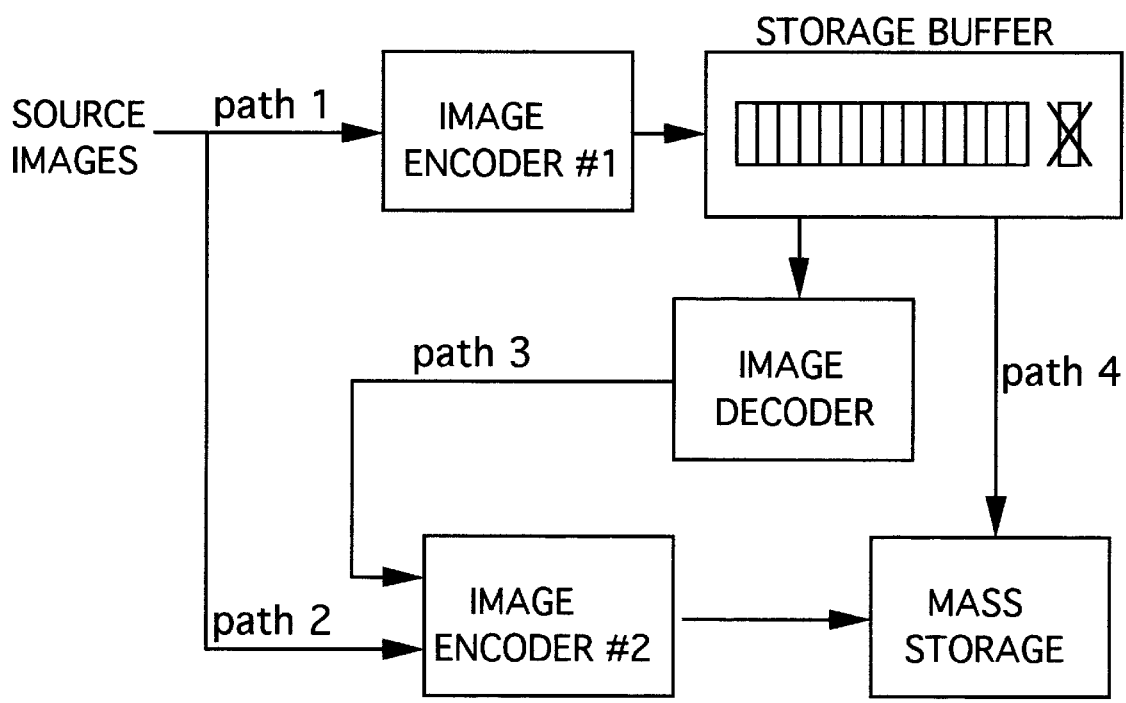
FIG 35B

ABSTRACT

COMPRESSED DIGITAL VIDEO RECORD AND PLAYBACK SYSTEM

This is a division, of application Ser. No. 08/444.286, filed May 18,1995, now U.S. Pat. No. 5,724,475.

FIELD OF THE INVENTION

This invention relates to the recording and recovery of video and other data from single or multiple monitored sites. It is particularly applicable to surveillance of sites such as industrial plants, banks, super-markets, and other commercial and institutional properties.

BACKGROUND

A primary value in video recording for surveillance and security derives from gathering an accurate record of image information from cameras and maintaining that record for some duration of time, or archive interval (archive intervals of 24 hours to two months are common). Conventional single-camera and multi-camera installations almost universally use videotape recorders (VTR), primarily the VHS format of videocassette recorders (VCR). to store the large volume of camera images needed to record and replay motion activity over useful archive intervals.

Operation and maintenance of VCRs presents a considerable cost and workload overhead in security systems, especially since most security systems are operated continuously, day in and day out, for the life of the installation. VCRs generally require overhaul for every 10,000 hours to 20,000 hours of operation (approximately 1–2 years of continuous operation), and pictures can degrade as the VCR accumulates hours of operation toward an overhaul date.

The relatively small number of images (432,000) that can be stored on a VHS cassette dictates that operators make frequent cassette changes on an ongoing basis, or employ many VCRs recording at reduced rates so that cassette changes can be made according to a convenient schedule (e.g. once every 24 hours). Long term unattended recording by repeated cycling of a single tape is not advised since tape life is on the order of 25 cycles, and no warning of image degradation due to tape wear is provided on standard machines.

In short, VCRs are bulky relative to the number of images stored and are prone to mechanical wear which causes picture degradation. VCRs require maintenance far more frequently than any other element of the surveillance system. It is acknowledged in the security industry that the VCR is the weak link in the task of recording massive amounts of image information on a routine year-in and year-out basis.

Proposals for consumer VCRs and camcorders based on digital rather than analog techniques are nearing acceptance at the time of writing. A proposed Standard Definition (SD) format for digital recording stores four and a half hours of NTSC equivalent video on a cassette that occupies 30% the volume of a VHS cassette. This represents a nearly eight-fold improvement in picture density over VHS technology. The mechanics of digital VCR recording, however, have been chosen to link head rotational speed and tape speed to frame rate in order to easily implement features such as editing, still playback, and multi-speed playback. This requires the compressed data stream to be of a fixed average length over intervals such as a frame or a fraction of a frame. This constraint limits the compression ratios that could be attained were a highly-variable-ratio compression scheme otherwise used. To achieve greater picture density, an alternate recording format will be required.

Many techniques have been devised to accelerate the rate of image recording in response to trigger events such as door switch closure or motion detected by infrared or video motion detectors. The objective is to raise the probability of capturing significant information at the time of an event. Many security managers elect not to use such techniques since they disrupt the uniformity of media fill times and the scheduling for changing recording media. The same problem of non-uniform media fill rates is brought on by a similar technique of recording extra images occurring prior to the trigger event; the so-called 'pre-trigger' recording techniques. Pre-trigger recording, which has become practical with the advent of digital video methods, could be utilized more widely were the problem of media fill variability solved.

VHS videocassette recorders deliver horizontal resolution for color Images of approximately 2401 TV lines for standard models and approximately 400 TV lines for S-VHS models. Many videocameras available for security have horizontal resolutions of 330 or 460 TV lines.

Performance of either the camera or the VCR becomes wasted in the mismatch. Also, since resolution of VCRs is fixed by design, techniques to raise or enhance the recorded image resolution in response to particular monitoring conditions are not practiced in the existing art of industrial surveillance.

Several techniques have evolved in the field of security and surveillance for adding other types of data into the video stream for recording on the VCR. For example, in U.S. Pat. No. 5,216,502 Katz describes how to record transaction data from cashier lanes with the video images from the lanes by impressing the digital transaction data onto the audio track of a VCR, or onto the end lines of the video frame recorded on the VCR. In U.S. Pat. No. 4,949,173 Mitsuhashi discusses methods to carry continuous-time audio along with intermittently recorded (time-lapse) video images. Multiplexer devices (discussed further below) generally code alarm status information and camera source identification onto the video input prior to storage on the VCR.

Multiplexer devices are commonly used in multi-camera installations to choose single fields or frames from any of the asynchronous camera sources to create a video image sequence for recording onto a VCR. Multiplexers are employed to maximize the rate of coverage at each camera view (to minimize the time between images) while minimizing the total number of images that must be stored on the recorder. Multiplexers also provide time-base correction for continuous or time-lapse recording VCRs, which is necessary since the rotating head-drum in a VCR cannot instantly synchronize to a randomly arriving field. Commercial multiplexers for surveillance employ video analog-to-digital-to-analog techniques and constitute a significant fraction of overall system cost.

FIG. 1 shows a representative conventional multi-camera system using a multiplexer 60. The time-multiplexed output of the multiplexer is applied to a first VCR 62 for recording. Playback of previously recorded information from a second VCR 64 is returned to a time-multiplexed input on the multiplexer. During playback the multiplexer selects one camera view from the time-multiplexed playback signal and displays this camera view on a monitor 66. The multiplexer can also deliver live camera images to the monitor.

SUMMARY AND OBJECTS

A first object of the invention is to provide a long-running video recording capability for surveillance applications that delivers equal or greater image storage capability than conventional VCR techniques for lower overall equipment and operating costs.

Another object of the invention is to provide an information record and recovery architecture that can be flexibly expanded to accommodate the many types of information arising in security and surveillance applications. These information include motion detector inputs, alarm status, point-of-sale data, and audio.

Another object of the invention is to provide a superior range of performance choices for video recording over that of standard VHS VCRs or proposed consumer digital VCRs. These include a choice of image resolution to match the performance of the camera; choice of image resolution to match the particular needs of a monitored view; and selectively higher resolution of critical portions of an image.

Another object of the invention is to provide superior reliability and to lessen or eliminate routine maintenance.

Another object of the invention is to provide a single field/frame record and playback platform that operates with a plurality of cameras without the use of an external multiplexer device.

Another object of the invention is to provide enhanced-mode recording during an interval extending both prior to and subsequent to a trigger event. Enhanced-mode recording constitutes an increase in image rate, in image resolution, or both.

Another object of the invention is to reduce the physical bulk of recording equipment in large site installations, and to reduce the number and size of media cartridges needed for archival storage.

Another object of the invention is to provide a true unattended recording system for surveillance that requires no operator intervention and operates reliably for the life of the equipment. This unattended recording system maintains a set of images recorded over the most recent archive interval for review or copy. This system fills a need for smaller installations where manpower is unavailable to carry out media changes, cleaning, or maintenance on a periodic basis.

The invention digitizes selected frames or fields of video from a single video source or multiple asynchronous video sources, compresses the digitized video, and stores the compressed video onto a digital storage device. The invention also provides means to decompress and play back the stored video images. Separate inputs on the invention accept alarm state data, audio data, or other general alphanumeric or binary data. This additional data can easily be included into storage since the format of the storage device is independent of the data types recorded. The invention is basically a flexible data storage system which can accommodate new data sources without the need to convert and fit data to a preexisting format as is required for dedicated video recorders.

FIG. 2 shows a general multi-camera record and playback application according to principles of the invention. A video selector 70 between camera inputs and the digitizer selects single or multiple fields or frames from cameras. By tracking the phase of each camera signal as it is digitized, the order of camera selection can be arranged such that single fields or frames can be acquired at nearly the full rate of the video signal format. This feature enables the invention to replace the multiplexer normally used ahead of the VCR, resulting in significant cost savings.

Video fields or frames selected by the selector pass to a video digitizer 72 and a image compressor 74. The digitized images are compressed by algorithms designed to operate specifically with fixed-view, low motion content images of the type characteristic of surveillance applications. These algorithms, which produce a variable data rate as a function of image content, achieve higher average compression ratios than do compression techniques designed for general video program content. It is postulated that average compression ratios of 100:1 or greater can be achieved in typical surveillance applications. At 100:1 compression a 480×360pel 8-bit monochrome image is reduced to less than 2 kilobytes. High compression ratios enable smaller storage devices, a key to enabling reliable, cost-effective alternatives to VCRs.

The compressed data rate associated with each camera view in a monitored site varies widely as a function of image content and motion. This content and motion varies from camera view to camera view and varies also according to time of day. The invention achieves low average compressed data rates across multiple camera views by exploiting the averaging effects of combining a large number of compressed data streams over the time interval available for filling storage media. Multi-source averaging causes data to accumulate in storage at a more uniform rate than would be the case if data was accumulated from a single camera source alone. Accumulation of data over long time intervals, e.g. 24 hours, also lessens the effect of rate variations, caused by daily activity cycles, on media fill times.

A rate control system is incorporated in the invention to assure consistency in storage capacity fill times in the presence of varying compressed data rates. The rate control feature changes the rates and resolution at which images are captured in order to fill storage capacity at, or nearly within, a target time interval. An additional rate control feature anticipates daily and weekly data rate patterns to achieve fill time targets while maintaining a high degree of regularity in image rates and resolution.

The invention described affords wide latitude in choosing the rates and resolution of recorded images. The resolution of existing art VCRs is essentially fixed by design, with two resolutions available in VHS format—standard and component-video (S-Video). In contrast, the resolution of each image retained by the invention can be chosen independently to match the performance of cameras and to respond to the requirements of scene content and event triggers. Equipment can be designed to deliver resolution greater than that of standard and component-video VHS recorders.

The invention can save images that occurred prior to a trigger event by temporarily storing images from selected cameras at rates greater than the normal record rate. If no trigger arrives before an expiration time the temporary images are discarded. If a trigger arrives in time however the temporary images are re-assigned to a mass storage device. Saving pre-trigger images in this fashion can provide a more comprehensive record of an event.

A first embodiment of the invention stores the compressed images on a removable-media storage device 76, such as a magnetic digital tape drive. This arrangement is cost effective when it is desired to archive large amounts of data or when data must be retained for a long archive interval. Rate control techniques cause media cartridges to be filled in specified target intervals even in the presence of variable compressed data rates.

A second embodiment of the invention uses a fixed-media storage device 78, for example a magnetic disk drive. This arrangement permits completely automatic, unattended recording for indefinite periods of time. No operator is needed to routinely change disk or tape cartridges. A data replacement process overwrites the oldest images on the storage drive. Rate control insures that new data is written at a rate such that a maximum number of images are stored without losing data newer than the archive interval.

FIGS. 3A and 3B show how image data is stored and retained for the duration of an archive interval in removable-media and fixed-media embodiments of the invention. Cartridges are the basic unit of storage in the removable-media embodiment. The archive storage loop is implemented by physically cycling media cartridges through an external cartridge shelf. By contrast, the archive storage loop in the fixed-media embodiment shown in FIG. 3B is internal to the mass storage device. A series of data records is retained as archive within the storage device. A data replacement process allows data records to be discarded as they ages past the archive interval making room to write new data records. The fixed-media embodiment of the invention therefore automates the process of recording, retaining and discarding data.

Maintainability advantages: The removable-media embodiment using a digital tape drive writes several times as many images to tape per minute of tape drive head rotation as do analog VCRs. This writing speed advantage is a consequence of image compression and reduces the rate of head and mechanical drive wear per number of images recorded. Maintenance intervals for the equipment are consequently increased. Commonly used 24-hour time-lapse recorders record five images per second. By contrast, the digital tape embodiment of the invention operated with a tape drive transferring 500 kbytes/second stores two-hundred fifty 2 kbyte images per second. The digital tape embodiment thus has an image writing speed advantage of 50:1 relative to a 24-hour time-lapse VCR. Assuming a similar mean time between overhaul for the two types of drives then the digital tape embodiment would be expected to write a far greater number of images between overhauls than the analog VCR.

The fixed-media embodiment can operate a sealed unit disk drive with heads that do not contact the disk surface. Disk drives have demonstratably better lifetime than tape drives when operated under conditions of continuous data transfer.

Performance advantages: The relationship below holds for both conventional VTRs and compressed-image recording systems of the type represented by the invention:

$$\text{data stored} = \text{image recording rate} \times \text{data per image} \times \text{recording time} \quad (\text{relation 1})$$

where in a non-compressed video recording system:

$$\text{data per image} \propto \text{image resolution} \quad (\text{relation 2})$$

and in a compressed video recording system:

$$\text{data per image} \propto \frac{\text{image resolution}}{\text{compression ratio}} \quad (\text{relation 3})$$

Compression ratio is a function of both the amount of detail in a single image and the change of detail, or motion, occurring between images.

The relations suggest that for a given data storage capacity the factors of recording rate, image resolution, and recording time, or time to fill available storage capacity, can be traded off against each other according to the needs of a particular application.

A digital tape embodiment of the invention can store 2.5 million 'VHS equivalent' images (360×240pels) on one 8 mm tape assuming a 5 gigabyte tape drive and further assuming two kilobytes of data per compressed image. This is more than five times as many images as are stored on a conventional VHS format tape (432,000 fields per VHS tape), or 2.5 times as many images as will be carried on the proposed SD format cassette for digital VCR. As relations 1 through 3 suggest, this additional storage capacity can be traded for higher image recording rates, higher image resolutions, or longer recording times.

Equipment cost advantages: It is postulated that equipment can be produced by use of the invention that stores an equal or greater number of images per dollar of equipment cost than by conventional VCR technology. This result becomes possible as the cost of digital storage and the cost of the hardware to execute compression decrease. Fixed-view camera images of the type found in surveillance applications can be compressed more deeply than general movie or broadcast program content. Average compression ratios of 100:1 or greater in surveillance applications are expected. By contrast, VCRs store analog data in non-compressed form. The fundamental advantage of image compression represents a large offsetting factor against other costs inherent in the approach described by the invention.

Further cost advantages accrue from replacement of the multiplexer in present-art security systems. The invention effectively replicates the function performed by the multiplexer for the minor cost of adding a few analog video switches.

Operating cost advantages: The tape embodiment of the invention costs less to operate because more images can be stored on the digital tape cartridges than on VHS cassettes. Recording media therefore does not need to be rotated through machines as frequently, saving manpower.

Better volumetric efficiency also reduces operating costs. The 8 mm digital tape cartridges cited earlier occupy one-fifth the volume of VHS tapes while holding five times as many images. This volumetric advantage of 25:1 results in a simpler archiving scheme requiring less storage space—a significant gain in large installations.

These and other features and advantages of the invention will be better understood in view of the accompanying drawings and the following detailed description. The drawings include exemplary embodiments of the invention and illustrate various objects and features thereof. Use of functions and systems appearing in the drawings and description are not limited to the context of the exemplary embodiments.

BRIEF DESCRIPTION OF DRAWINGS

FIG. 9A is an example of selecting fields from asynchronous sources where the source sequence is arbitrary.

FIG. 9B is an example of selecting frames from asynchronous sources where the source sequence is arbitrary.

FIG. 9C is an example of selecting fields from asynchronous sources where the source nearest in phase is chosen next.

FIG. 11A is a block diagram of a prior-art interframe image compressor.

FIG. 11B illustrates the data flow topology for the interframe image compressor of FIG. 11A.

FIG. 35A shows a prior art recording system with pre-trigger recording capability.

FIG. 35B shows a recording system with pre-trigger recording capability according to the invention.

DEFINITIONS

In this document the words 'image', 'picture', 'field', 'frame', and 'video' are used with the following understandings. 'Image' and 'picture' are used interchangeably and refer to data representation of visual information either in digital or analog form. 'Video' implies a series of images connected in time sequence to convey motion or time-related activity. 'Video' also implies analog video signal formats such as NTSC, PAL, and others, of which fields and frames are the discrete elements. A field or frame also represents an image. In common usage, 'frame' can refer to a single image out of a series of images.

The invention disclosed herein is capable of storing pictures and images from video sources and replaying them in time sequence and at a rate necessary to convey the effects of action and motion. The invention can be operated at reduced image rates as is commonly practiced in surveillance and security work to extend time coverage for a given storage capability. The invention can also store and regenerate images from single video sources at the full rate defined by video standards such as PAL and NTSC. For these reasons, the invention is considered as a 'video recording device'.

DETAILED DESCRIPTION OF THE INVENTION

Figure 4:
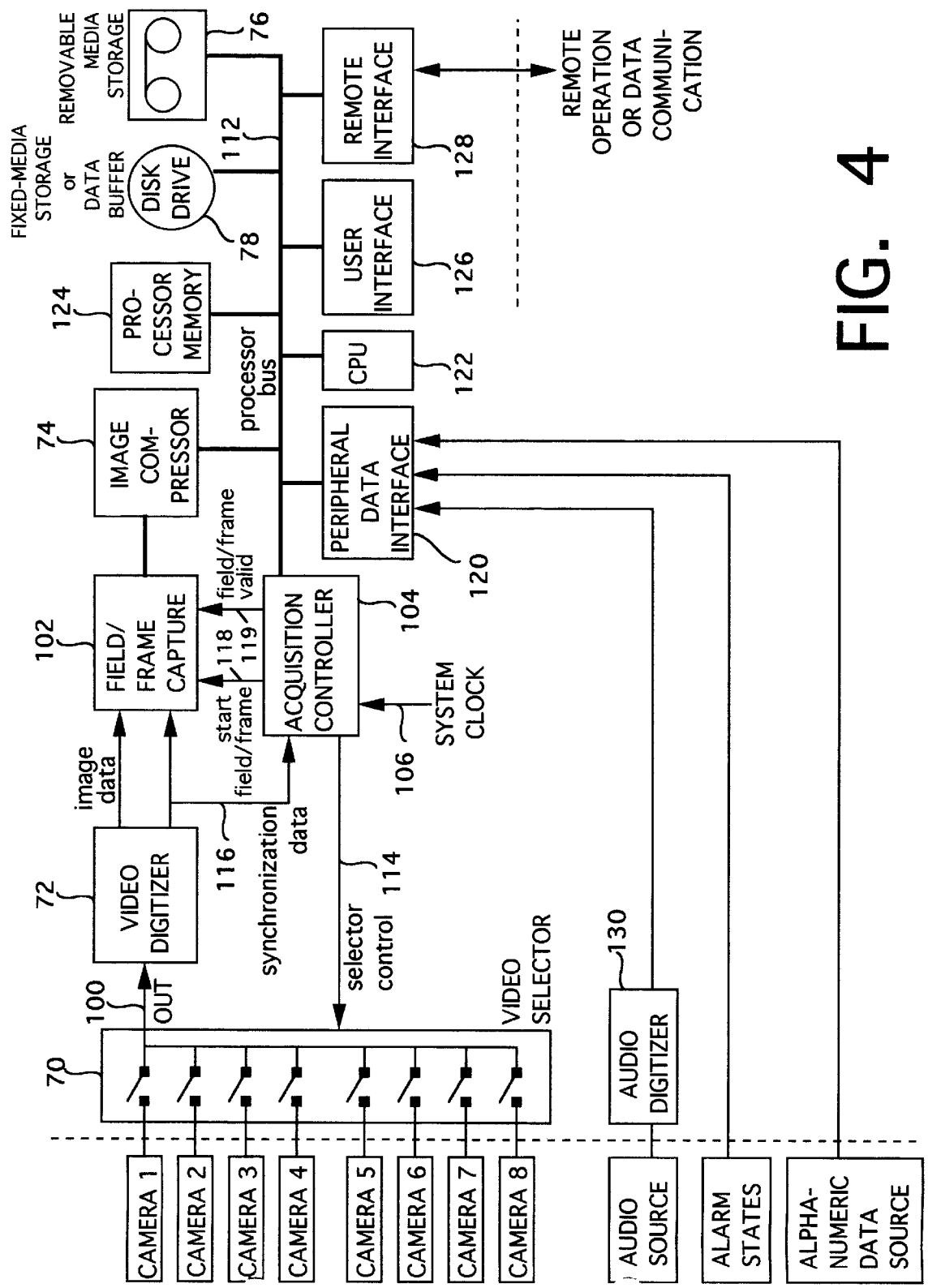
FIG. 4 is a block diagram of an implementation of the record function of the invention.
Figure 6:
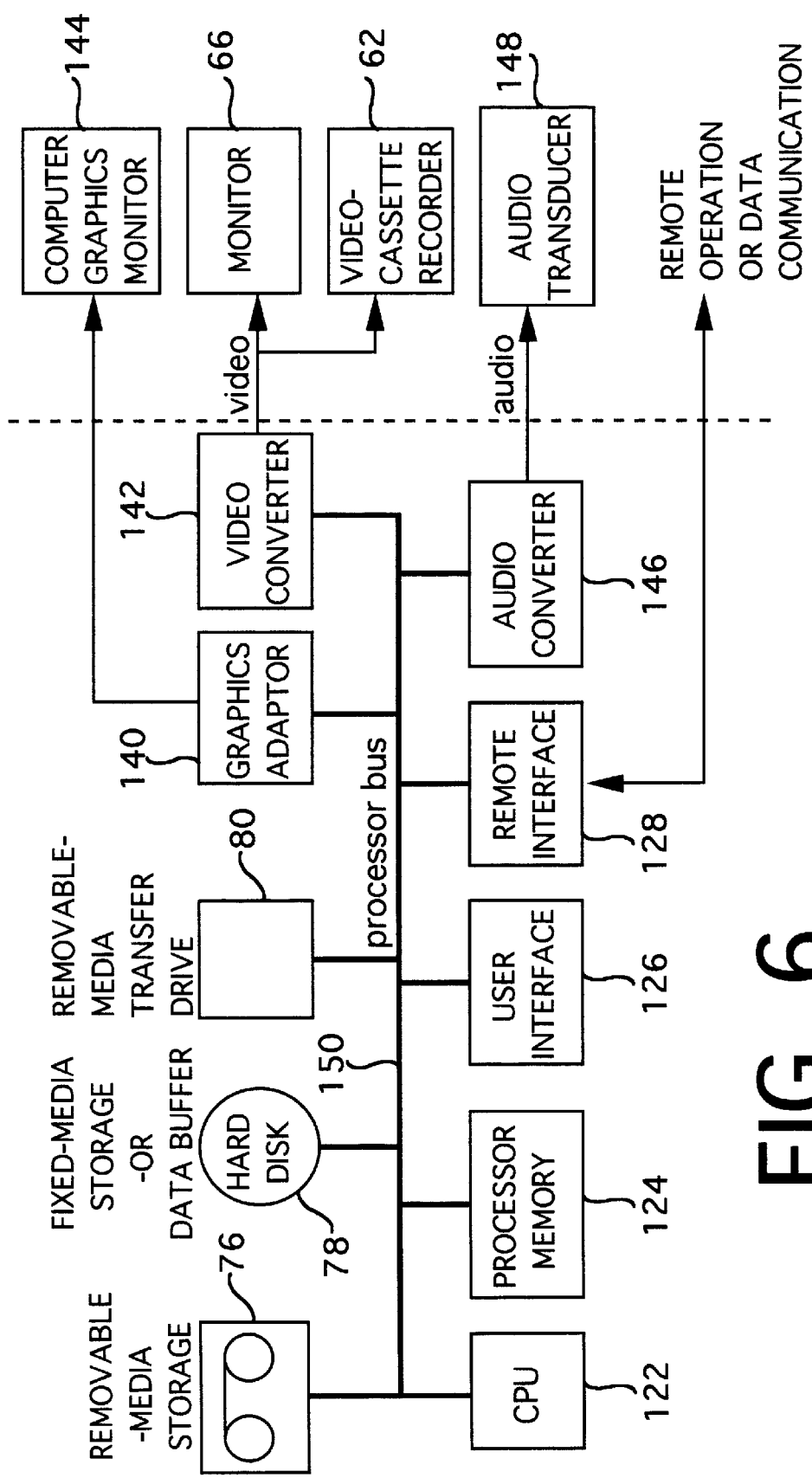
FIG. 6 is a block diagram of an implementation of the playback function of the invention.

FIG. 4 is a block diagram showing an implementation of the record function of the invention. FIG. 6 similarly shows hardware blocks for the playback function of the invention. A set of separate record-only and playback-only instruments can be constructed in accordance with the removable-media storage embodiment of the invention. Alternately, combined record/playback instruments can be constructed for both the removable-media and the fixed-media storage embodiments by combining the record and playback functions and eliminating redundant blocks.

For simplicity of illustration the record function will be described with the example of eight camera sources connected as inputs. In practice, the record function could be devised to accept any number of video inputs, including a single camera input, or a time-multiplexed input containing multi-source video.

A video selector 70 selects one of the eight camera signals and routes this signal to an output terminal 100. The selector output terminal is coupled to a video digitizer 72. The video digitizer extracts a digital representation of the Image data and the synchronization signals from the analog video. The video digitizer may also be capable of detecting codes that have been inserted in the vertical synchronizing interval of the video source input. An input section for component (Y/C) video (not shown) can also be devised with parallel selector paths and digitizers for the Y and C signal components.

An acquisition controller 104 controls the state of the selector which couples video signals to the digitizer by way of selector control 114. Synchronization data 116 is received by the acquisition controller from the digitizer. The acquisition controller utilizes this synchronization data to detect the start and end of fields, the phase of fields relative to a system clock 10, and the type of fields—odd, even, etc. The acquisition controller also generates a field/frame-valid 119 signal under the conditions that an entire portion of a field containing image data was digitized during the time a single video source was selected. The acquisition controller communicates with a CPU 122 via a processor bus 112.

A digital field/frame capture 102 receives image data and synchronization data from the video digitizer. The field/frame capture stores an array of image data from a single video field or a pair of fields representing a frame. Synchronization data 116 is used to key the image data into correct array locations. Capture of a field or frame commences on receipt of a start field frame 118 signal from the acquisition controller. When the field/frame capture receives a field/frame-valid signal the image data retained in the array is designated a complete image. The image data is then transferred to the image compressor 74.

Data from non-image sources including audio, alarm states, and other alphanumeric data are coupled to a peripheral data interface 120. Inputs from an audio source are first applied to an audio digitizer 130, the output of which couples to the peripheral data interface.

Several other devices connect to the processor bus 112. These include one or more fixed-media storage devices 78 (e.g. magnetic hard-disk drive), one or more removable-media storage devices 76 (e.g. magnetic digital tape drive, rewritable optical disk drive, or floppy disk-drive), central-processor (CPU) 122 and processor memory 124, means for implementing a user interface 126, and means for coupling to remote interfaces 128.

FIG. 6 shows hardware blocks for the playback function of the invention. All hardware blocks connect to a common processor bus 150. Removable-media storage drive 76 accepts media recorded on a separate recording device. A fixed-media storage drive 78 is shared with the record function in a common record/playback device. Removable-media transfer drive 80 permits re-recording of image sequences from the primary storage devices as will be described later. The implementation shown assumes image decompression for playback will be implemented in software running on the CPU. Dedicated hardware for decompression are also considered under the invention.

Two methods can be chosen for displaying playback images and text as indicated in FIG. 6. A computer graphics adaptor 140 connects to the processor bus to supply images to a computer graphics monitor 144. A wide variety of graphics adapters and graphics monitors are commercially available for personal computers (PC) and workstations. A second means connects a video converter 142 to the processor bus. The video converter generates composite or component-video for viewing on a standard TV monitor 66 or for transfer to a VCR 62.

An audio converter 146 reproduces audio files via an audio transducer 148. Remaining hardware blocks shown in FIG. 6 include a CPU, processor memory, and means for user and remote interface as appeared also in the record function described in FIG. 4.

Operation:

The record function will be described with reference to the record hardware blocks shown in FIG. 4 and the record data flow diagram of FIG. 5. For simplicity, the following discussion assumes the example of recording NTSC video (60 fields per second).

Camera sources in surveillance installations, if not driven by external synchronizing signals, can be considered as asynchronous, meaning image fields do not begin at identical times. Cameras are sometimes locked to AC power line frequency. In such a case, field periods (inverse of field rate or frequency) will match between cameras but field phases may not. Cameras may alternately run on independent timebases. Field periods may then differ slightly, causing field phases to continually advance or regress relative to each other.

The video selector 70 under control of acquisition controller 104 enables the invention to acquire single video fields or frames from multiple asynchronous sources according to two switching alternatives. A first switching alternative enables fields or frames to be acquired from sources in any arbitrary sequence at average rates of up to one-half the video input rate (e.g. 30 fields per second). These rate limitations are imposed by the fundamentals of selecting asynchronous video signals by way of a single selector. A second switching alternative offers an increase in single-field acquisition rates by allowing the invention to control the order of video source selection according to relative phases of the sources. Acquisition at minimum average rates of $^N/_{N+1}$ of the input rate for N video sources can be achieved with this technique. The average acquisition rate for sixteen asynchronous camera sources, for example, would become 56.47 fields per second. Of course, sustained acquisition of multiple fields or frames from single sources is possible with either switching alternative at the normal full rates of 60 fields per second or 30 frames per second.

Figure 8:
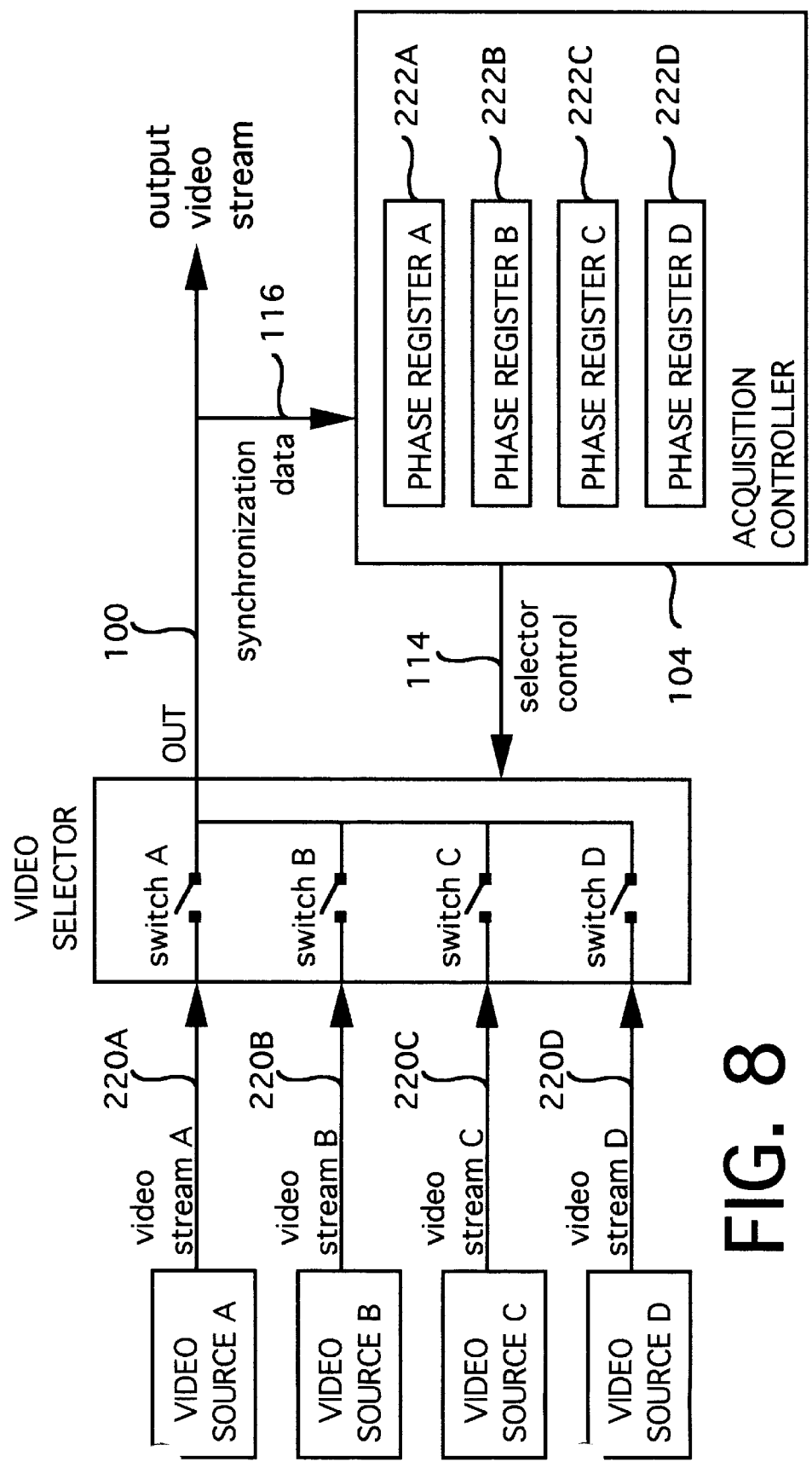
FIG. 8 is a detail block diagram for source selection of asynchronous video inputs.

FIG. 8 represents a portion of the hardware shown in FIG. 4 in greater detail. Video sources A, B, C, and D, produces video streams 220A–D which are coupled to video selector 70. An output video stream appears at the output 100 of the selector. Acquisition controller 104 operates the selector by way of selector control 114.

FIG. 9A shows an example of how whole single fields are selected from multiple asynchronous sources according to the first switching alternative. This example assumes the four asynchronous sources and selector shown in FIG. 8. Any number of video sources could be selected in practice. A source switching sequence of A-B-C-D-A is used in this example. Referring to FIG. 9A, the selector first selects video stream A to direct field 1 to the selector output. Immediately after the portion of field 1 containing image data has terminated the acquisition controller directs the selector to select video stream B. A partial image field from video stream B passes before a whole field, which will constitute field 2 in the output stream, begins. Switching continues after field 2 is complete to select whole fields 3, 4, and 5 from video streams C, D, and A respectively, with partial fields occurring in between. Note that partial fields are always less than one field interval in duration. Since partial fields are never longer than the desired whole fields, the net rate of whole fields appearing in the output stream always equals or exceeds one-half the source field rate.

If a frame is composed of two contiguous fields and the field order is unimportant (odd-even or even-odd) then a maximum average of 20 such frames per second can be produced in the output stream with the first switching alternative (up to one field will be lost for each two fields acquired as a frame). An example of this is presented in FIG. 9B. If a certain field order within a frame—odd/even or even/odd—must be preserved then maximum average rate drops to 15 frames per second, or one-half the source rate.

The field rate of the output stream can be increased by using the second switching alternative which drives the order of source selection according to the field phase of the input video streams 220A–D. This alternative is tolerable for surveillance monitoring since the frequency of camera views is important—the recording sequence of cameras is not generally apparent to the viewer. With this alternative field and frame rates in the output stream approach that of the input streams when the number of cameras is large. The example of the second switching alternative shown in FIG. 9C begins with field 1 being selected from video stream A, as was done in the example of FIG. 9A. The next stream trailing closest in phase to video stream A is video stream D. By selecting stream D after stream A the smallest partial field, or unusable interval, is lost. Following stream D the selector connects in turn stream C, stream B, and then completes the cycle by returning to stream A. A total of one full field interval was lost during the cycle. Hence, the maximum average rate is $N/N+1$ times the source stream rate as cited earlier, where N is the number of video sources.

In a practical application of the second switching alternative, the acquisition controller 104 maintains phase registers 222A–D to store a digital phase value for each video stream (see FIG. 8). These phase registers may be implemented by software running on the CPU. Phase register A 222A, for example, stores the most recently measured phase value for video stream A 220A. Phase measurements are derived from synchronization data 116. This phase data is contained in the video stream at the output of the video selector 70 and is applied to the acquisition controller. On start-up of the recording instrument the acquisition controller first determines the phase of all video input streams 220A–D by operating the selector such that the phase of each stream can be measured. Initial phase values are established for each source relative to the system clock 106. Following start-up the recorder begins an image acquisition cycle on an arbitrary input stream. It then proceeds by progressively selecting streams which offer minimum delay to the start of Image data relative to the stream just completed. This process continues until images have been acquired from all requested streams, after which the acquisition cycle can begin again. The phase value associated with each stream is updated in the corresponding phase register as each stream is acquired.

Figure 10:
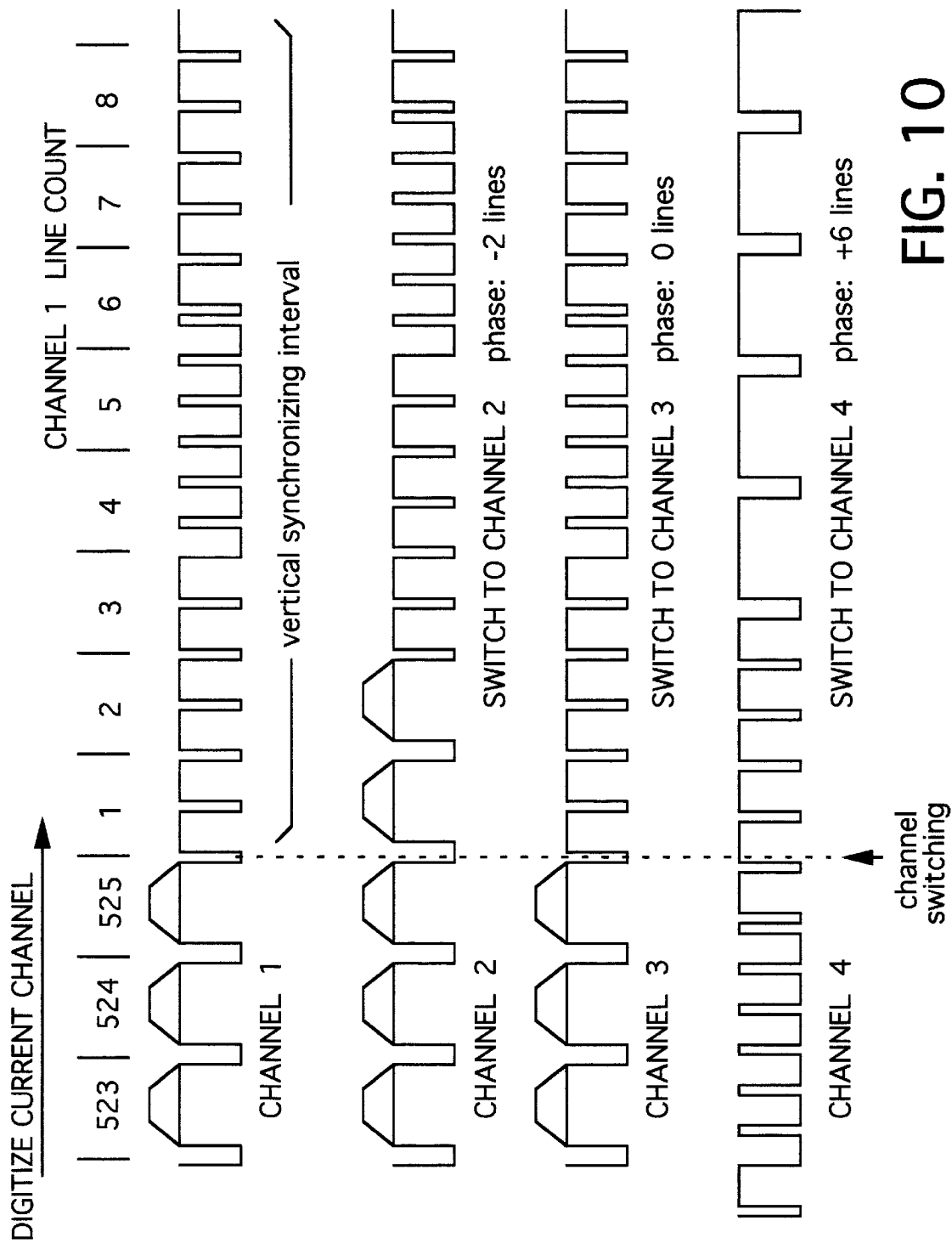
FIG. 10 is an example of switching between video channels of different phase in the vicinity of the vertical synchronizing interval.

FIG. 10 illustrates possible phase relationships at the time video sources are switched. The figure hypothesizes four different channels, each containing a video signal near the time of the vertical synchronizing interval. Switching from channel 1 to any of channels 2, 3, or 4 is assumed. Switching occurs after line number 525 on channel 1. Channel 2 is a possible next source since it lags channel 1 by only two horizontal lines. But channels 3 and 4, which match and lead the phase of channel 1 respectively, could also be selected since serration or equalization pulses remain in these channels for measuring phase. Channels 1 and 3 represent the case where video signals are exactly synchronous. Channel 4 represents approximately the largest phase lead (+6 horizontal lines) that still allows a phase measurement to be made during the vertical synchronizing interval.

As each stream is digitized its phase is measured and updated in the corresponding phase register 222A–D. Updating stream phase every cycle corrects for source phase jitter and even for progressive phase error caused by small differences in the field period of the video sources. As a result the source order sequence may vary from cycle to cycle. A margin of phase error can be tolerated in source selection as illustrated in the difference between switching channels 1 and 3 and switching channels 1 and 4 in FIG. 10. The phase difference between channels 3 and 4 is six horizontal lines. Splitting this phase as +/–3 lines, and dividing over one field interval of 266 lines implies that a phase error of ±3 divided by 266, or ±1.1%, can be tolerated in estimating the phase of video sources.

The phase error tolerance provides some measure of tolerance against field period mismatch, though not against a mismatch which would cause more than +/–1.1% phase change between phase updates. Constant magnitude field period errors cause progressive accumulation of field phase error. A much greater tolerance against field period errors can be achieved by implementing a second set of registers (not shown) to track the field period error of each video source. Field period error is determined by measuring how much field phase changes in the interval between field phase samples.

The object of using field phase and field period error registers is to estimate the phase of a video stream prior to selecting that same stream for digitization. Field phase at any time, t, is estimated as the phase last measured at time zero plus the field period error multiplied by time, t. Of course, apparatus can be devised to measure the phase of input streams independently of the video selector. This obviates the need for phase and period register values, though it somewhat raises the cost of hardware.

Returning again to FIG. 4, the CPU directs acquisition of fields or frames via the acquisition controller 104. It is implied, but not shown in the figures, that the CPU can alter the size of the capture array by changing the video digitizer sampling rate to acquire more or fewer picture elements. Capturing two successive fields as a frame doubles the vertical dimension of the array size. Either a field or a frame will be treated as a single image by functions subsequent to the field/frame capture block.

The image compressor 74 receives images from the field/frame capture 102. The image compressor can perform either intraframe or interframe compression of images. Intraframe compression generates a set of data for each original image which, taken alone, sufficiently represents the original image. Intraframe compression is often referred to as still-image compression, as still images are treated independently without relation to other images in the time sequence. Interframe compression by contrast intends to generate a data set which is smaller than that generated by intraframe compression for the same set of images. Interframe compression exploits the similarities, or redundancies, within a set of images to reduce the amount of data needed to represent the set.

Methods based on transform coding such as DCT (discrete-cosine transform) or wavelet transforms are suitable for compressing surveillance video. JPEG is a DCT-based intraframe technique for still images. MPEG is a DCT-based interframe technique for moving images. A tremendous cost advantage may materialize for MPEG compressors as VLSI implementations develop and mature. However, VLSI implementations for MPEG may lack the flexibility to be optimized for surveillance video recording applications. Also, the computationally intensive motion estimation processes implemented by MPEG integrated circuits may be of limited value for the fixed-view image sequences characteristic of surveillance video.

Surveillance images can be expected to have a high degree of temporal redundancy since image sets are obtained from a single camera without transition to other video sources. Frequently a camera is physically fixed and any moving objects within the camera field of view occupy only a small fraction of the field of view. A high degree of compression can be obtained with the simple interframe technique of encoding a first image as a key image and then encoding the remaining images as deltas taken relative to the preceding image. Encoding can be done by DCT, wavelet, or other suitable technique. Coding errors are canceled out by including the encoder along with a decoder identical to the one used for decompression/playback within the loop that generates the delta image. This prior art technique is illustrated in FIGS. 11A and 11B.

In FIG. 11A, uncompressed input images are applied to the non-inverting input of difference element 200. Selector A 210 supplies data to the inverting input of the difference element and to a summing element 206. The output of the difference element couples to encoder 202. Encoder output is delivered from the compression function as compressed output images. Decoder 204, which performs the inverse operation of encoder 202, receives compressed images from the encoder output and delivers decoded images to the summing element. The output of the summing element is delivered to an image store 208. Image store output is applied to one input of selector A.

If a key image is to be generated then selector A selects a zero data value representation 216 such that the input and output of both the difference and summing elements are equal. If delta images are to be generated then selector A selects the output of the image store. Data moves according to the diagram to produce compressed output images and to update the contents of the image store. Note that decompressed images entering the image store are identical to those that will be reproduced by an eventual decompression function. The data flow diagram of FIG. 11B depicts compression of a key image and three delta images according to the process of FIG. 11A.

The interframe compressor of FIG. 11A carries history of the video sequence being compressed in the image store. To implement video compression of multiple, unrelated, image streams therefore requires a separate compressor of the type shown in FIG. 11A for each video stream. Such multiple image streams are generated by multi-camera surveillance applications. Correlation is high in the image stream from a single camera, but low between the streams from various cameras.

Figure 11C:
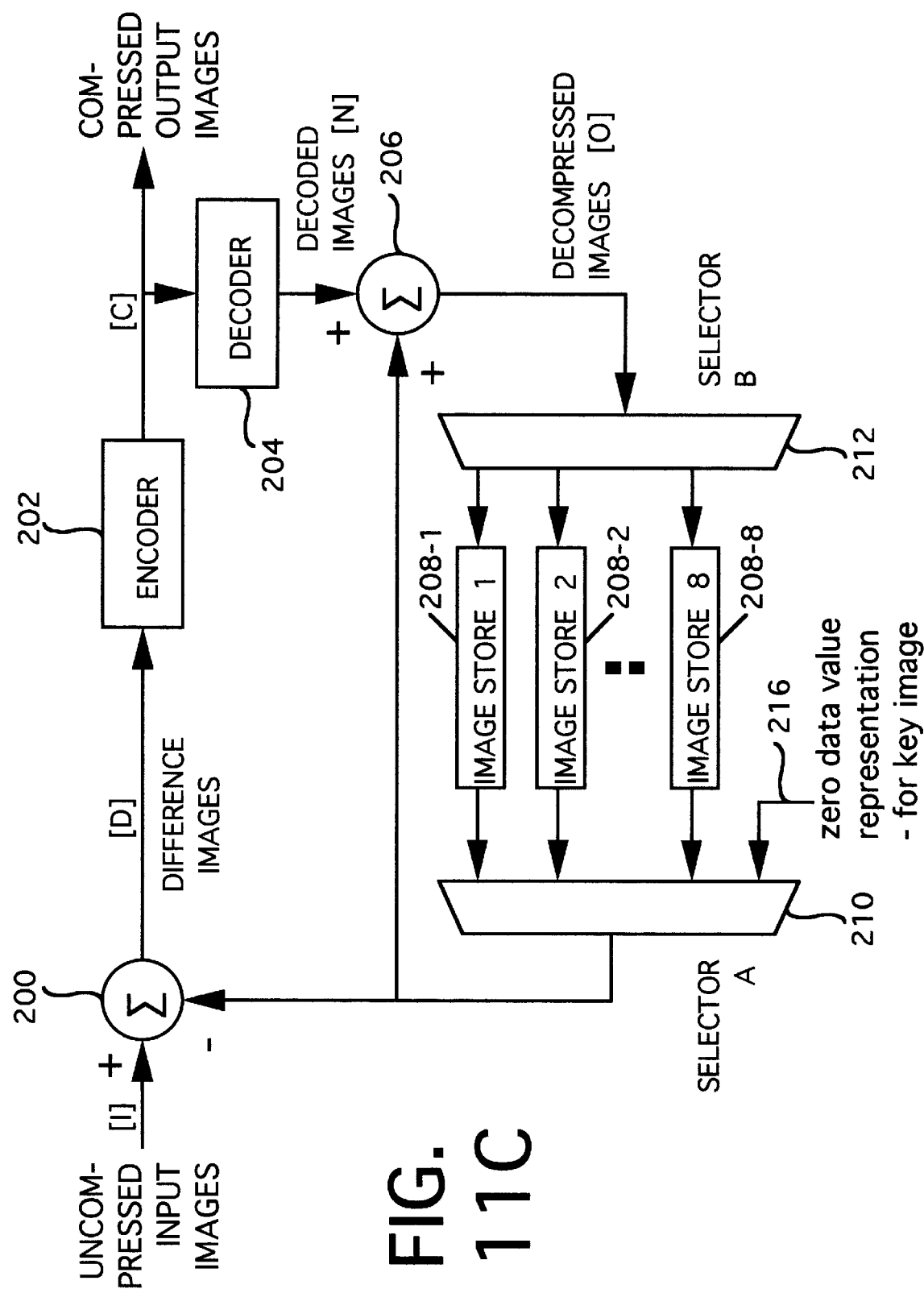
FIG. 11C is a block diagram of an interframe image compressor for multiple streams of images.

An alternate approach to multiple stream compression is to share a single compressor between video streams and to maintain a separate image store for each stream. This approach is depicted in FIG. 11C. When compressing a delta image for a video stream 1, for example, selector A 210 selects the previously stored image associated with video stream 1 from image store 1 208-1. At completion of the compress cycle, selector B 212 passes the newly decompressed image associated with video stream 1 to image store 1.

Figure 11D:
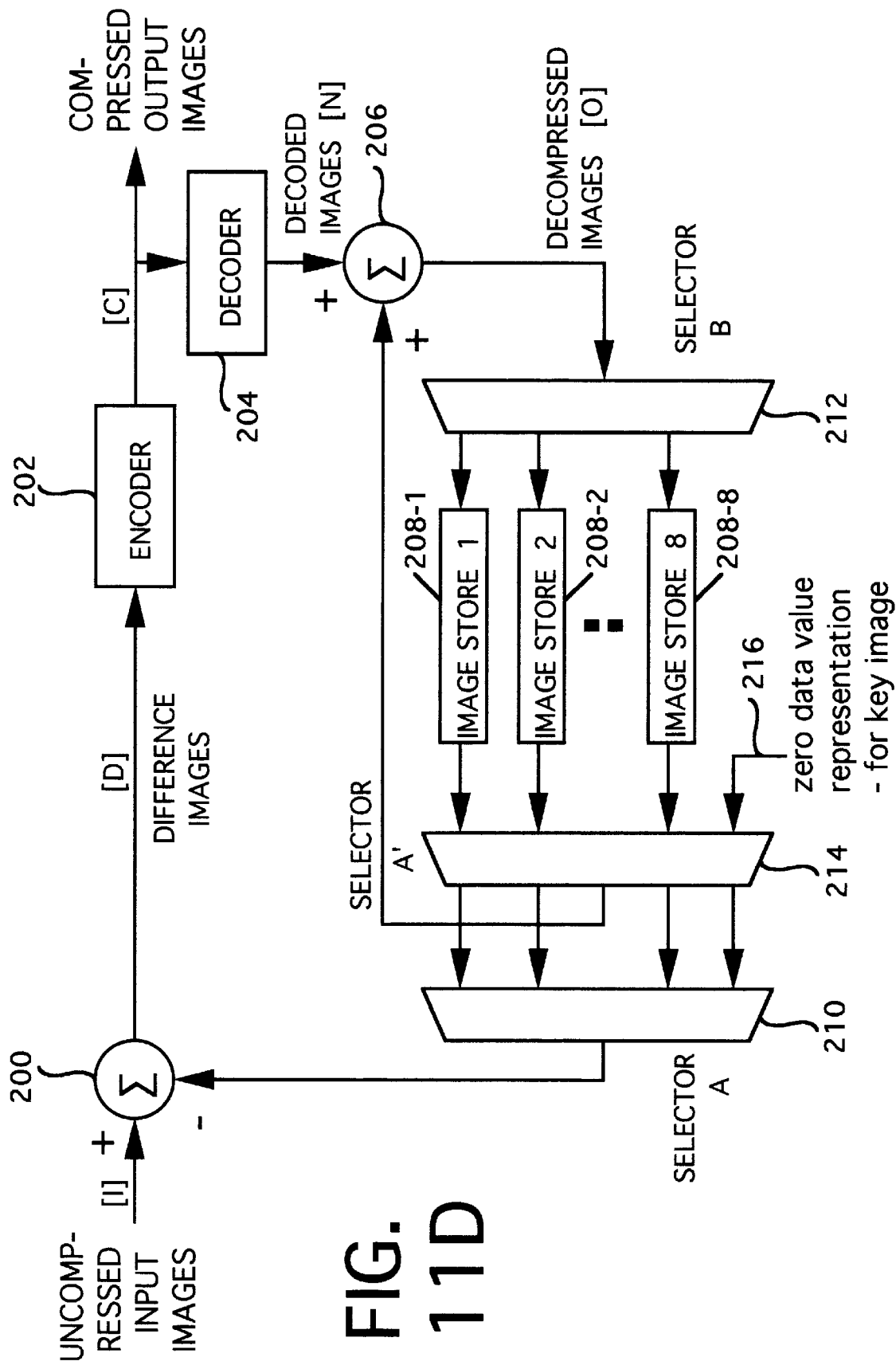
FIG. 11D is a block diagram of a pipelined version of the interframe image compressor of FIG. 11C.

The multi-channel compressor can be pipelined, unlike the single-channel compressor of FIG. 11A. FIG. 11D illustrates the pipeline principle with the addition of a second selector A' 214 at the output of the multiple image stores. With this arrangement each block in the diagram, difference element 200, encoder 202, decoder 204, and summing element 206 can be assigned a different image to process without waiting for data from the previous image to complete propagation through the loop. Assume, for instance, that each of the aforementioned elements requires one execution cycle to process an image. A single execution cycle is postulated for illustration where: difference element 200 processes an input image from video stream 4; encoder 202 processes a delta image associated with video stream 3; decoder 204 processes a delta image associated with video stream 2; and summing element 206 processes a delta image associated with video stream 1. Selector A' 214 in this instance couples output from image store 1 208-1 to the summing element; selector B 212 couples output of same summing element as the new value for decoded image 1 into image store 1. Selector A couples output from image store 4 (not explicitly shown) to the difference element.

Figure 5:
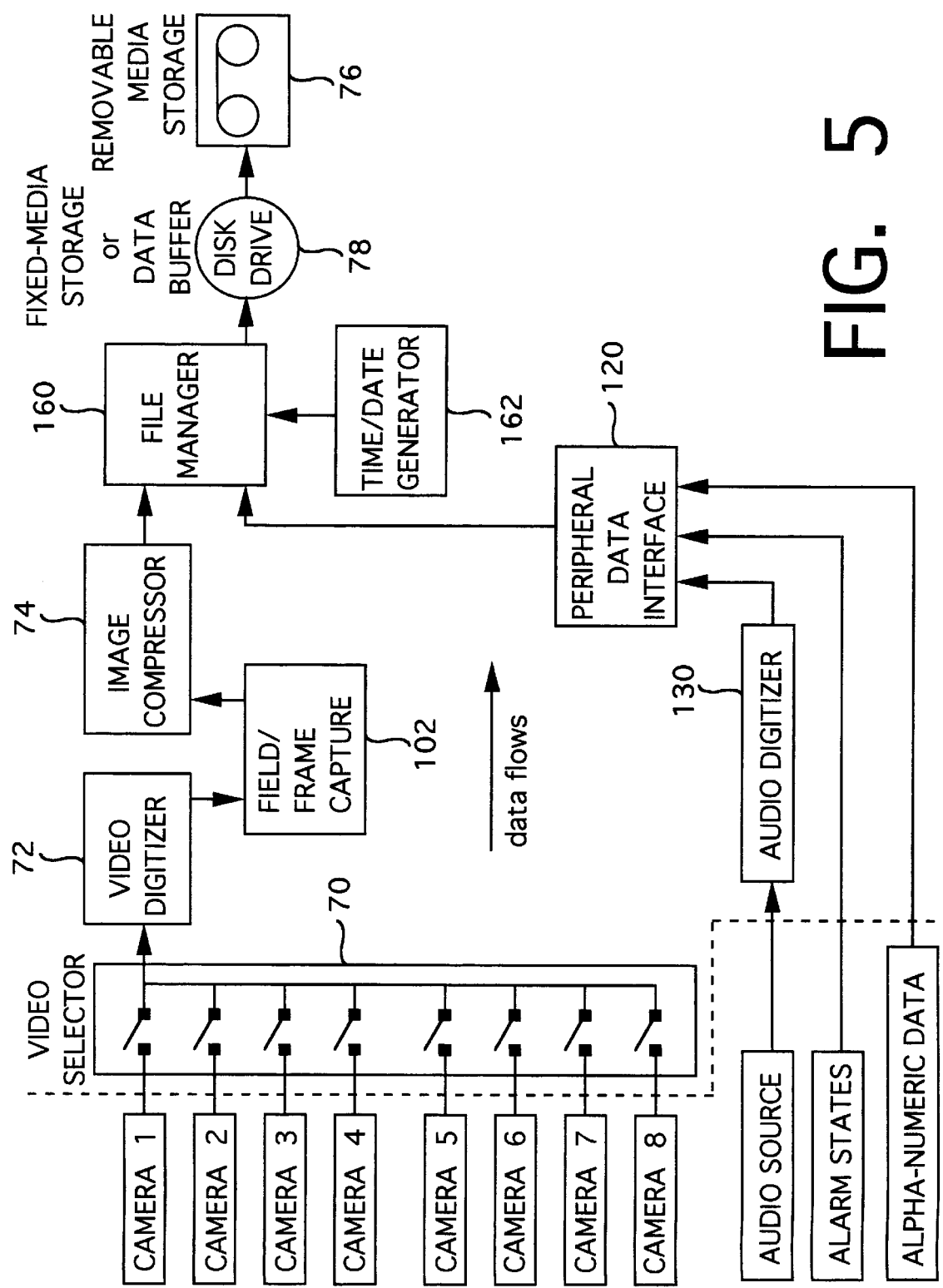
FIG. 5 illustrates data flows for an Implementation of the record function.

File Manager:

FIG. 5 summarizes data flows for the record function. Compressed image data is passed to a file manager 160 which appends date and time codes provided by a time/date generator 162. Camera source codes and codes for decompressing images are included with the data by way of the capture and compression stages. The file manager also receives non-image data including digital audio, alarm triggers, and other data that can be represented in text or binary form, appends date and time codes, and organizes them for writing to the storage devices.

One or more storage devices store the compressed image data in a format independent of the data type. That is, the storage device format is not, for example, based on block sizes associated with video fields or frames. In a first embodiment of the invention, data is temporarily stored on a fixed-media storage device 78 (e.g. a magnetic disk drive) and then is transferred from this fixed-media storage device to a removable-media storage device 76 (e.g. instrument tape drive or removable-media disk drive). This transfer occurs at a rate conducive to efficient mechanical utilization of the removable-media storage device. The fixed-media device serves, in effect, as an input buffer for the removable-media device. If a tape drive is used, for example, as the removable-media device then the tape runs only for short bursts to transfer blocks of data at maximum rate, and is idle the remainder of the time. This arrangement is most efficient for storing variably-compressed data since there is no need to link the compressed data rate to a constant tape speed. In playback, the above process will be reversed as data is transferred from tape to disk and then read from disk at a rate to match playback display.

A second embodiment of the invention uses only a single mass storage device, employing for example a fixed-media storage device such as a magnetic disk drive. From this embodiment a completely automatic, unattended recording monitor system which needs no routine media changes, cleaning, or maintenance can be devised. This unattended recording monitor overwrites older data with new data according to a replacement process. The replacement process causes images recorded across a most recent interval of time called an archive interval remain available on the storage device for review or copy. Rate control techniques discussed elsewhere in this specification assure that data will not be written at a rate such that archive limits would be violated or that new data would be lost.

Blocks of images recorded on the second embodiment device may also be placed on hold such that they will be preserved indefinitely and not be overwritten. Block(s) can be designated for holding according to factors such as date, time, and camera source. Block holding would be used, for example, if an event occurs within a known time window and images needed to be preserved for later review or for transfer outside the recording device. Block holding, of course, reduces available space on the storage device. The rate control system must compensate for this reduced space by writing data at a lower rate.

Figure 12A:
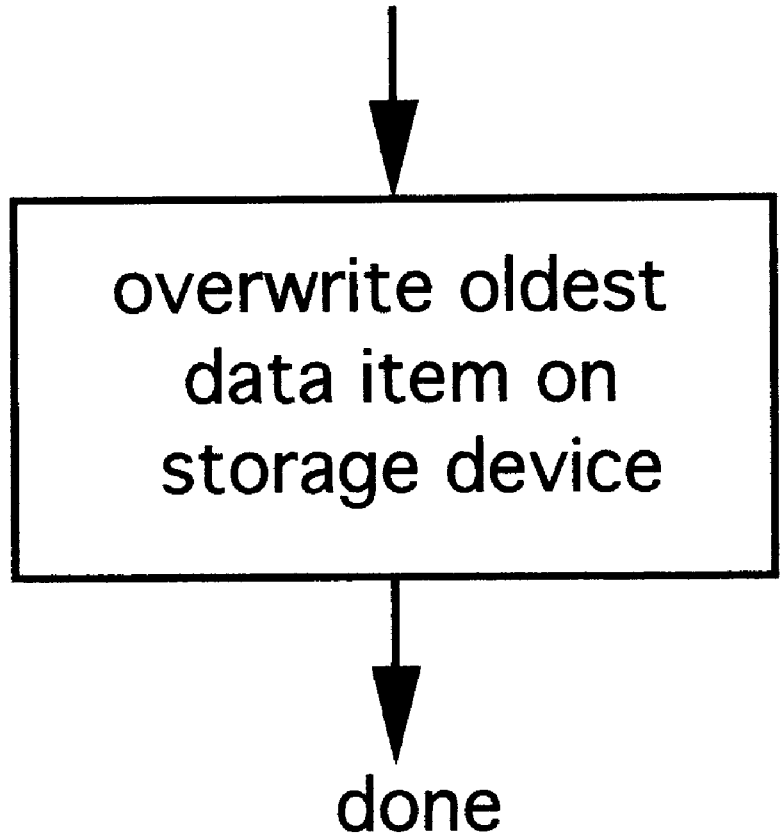
FIG. 12A is a flowchart of Replacement Process A used for overwriting storage applications.

Data is overwritten on the storage device according to one of several possible data replacement processes. Replacement process A shown in FIG. 12A operates according to the simple rule that new data always overwrites the oldest data item on the storage device. This process has an advantage in that an unbroken data record will be maintained beyond the archive interval. The disadvantage of this process however is that any fragmentation of data on the storage device is perpetuated. Data fragmentation can occur when storage blocks are placed on hold or when the operating system, for some reason, does not write data at the next physically available location on the storage device.

Figure 12B:
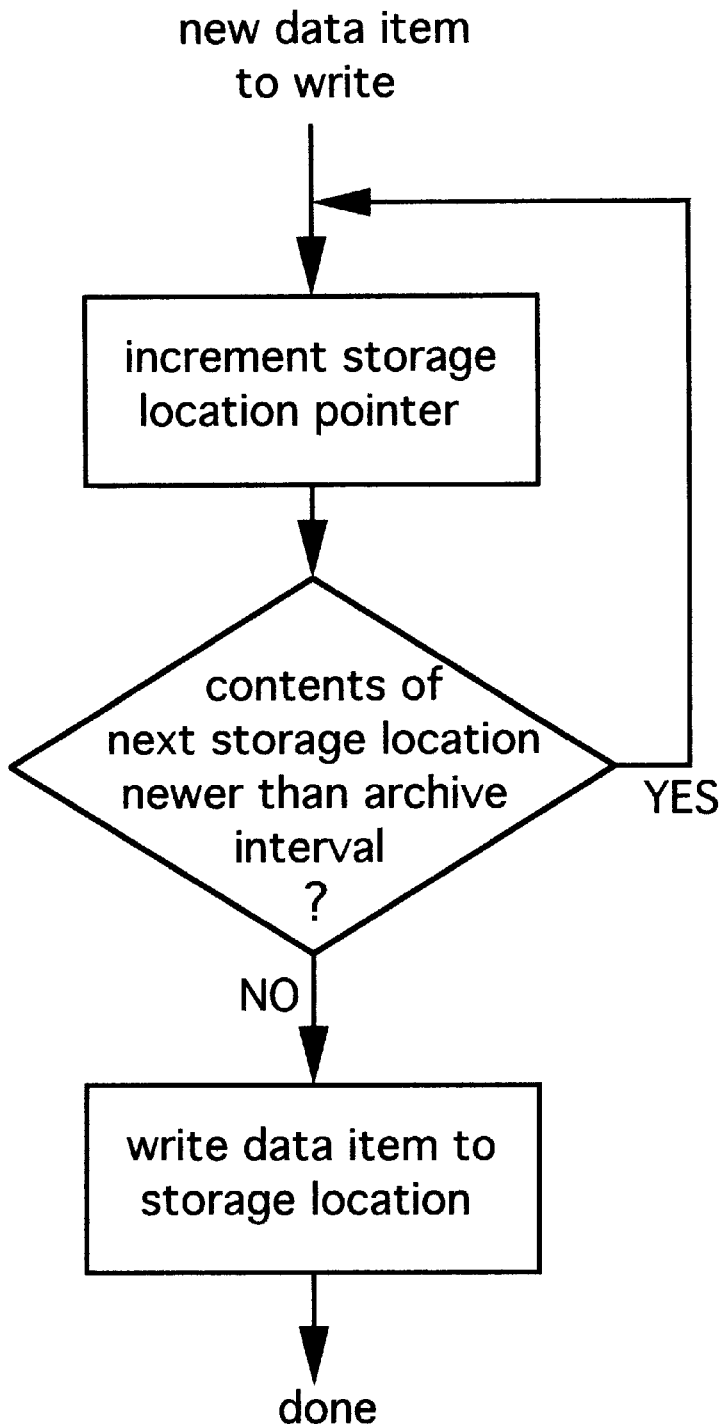
FIG. 12B is a flowchart of Replacement Process B used for overwriting storage applications.

Replacement process B (FIG. 12B) defines a storage location pointer to represent physical locations on the drive. This pointer carries the value of the location last written when process B is entered. The process first increments the pointer to the next physical storage location. If data occupying that location is newer than the specified archive interval then the storage pointer is incremented again and the following location is checked. This process continues until a location is found that can be overwritten without violating the archive mandate. Process B therefore fills the storage device sequentially, except when data items protected by the archive interval are encountered. Data replacement according to this process will tend to defragment the storage device, provided that storage is running at less than full capacity (defined as not all data items newer than the archive interval).

Other replacement processes are possible that combine the principles of replacement processes A and B. For instance, replacement process A could be adhered to until storage device fragmentation exceeds a certain threshold. Replacement process B could then be invoked until the storage device becomes sufficiently defragmented. Maintaining storage records in a defragmented state can reduce mechanical wear on the storage drive. A magnetic hard-disk drive, for example, is generally assumed to last longer if head seeks to different areas of the disk platters are reduced.

Figure 7:
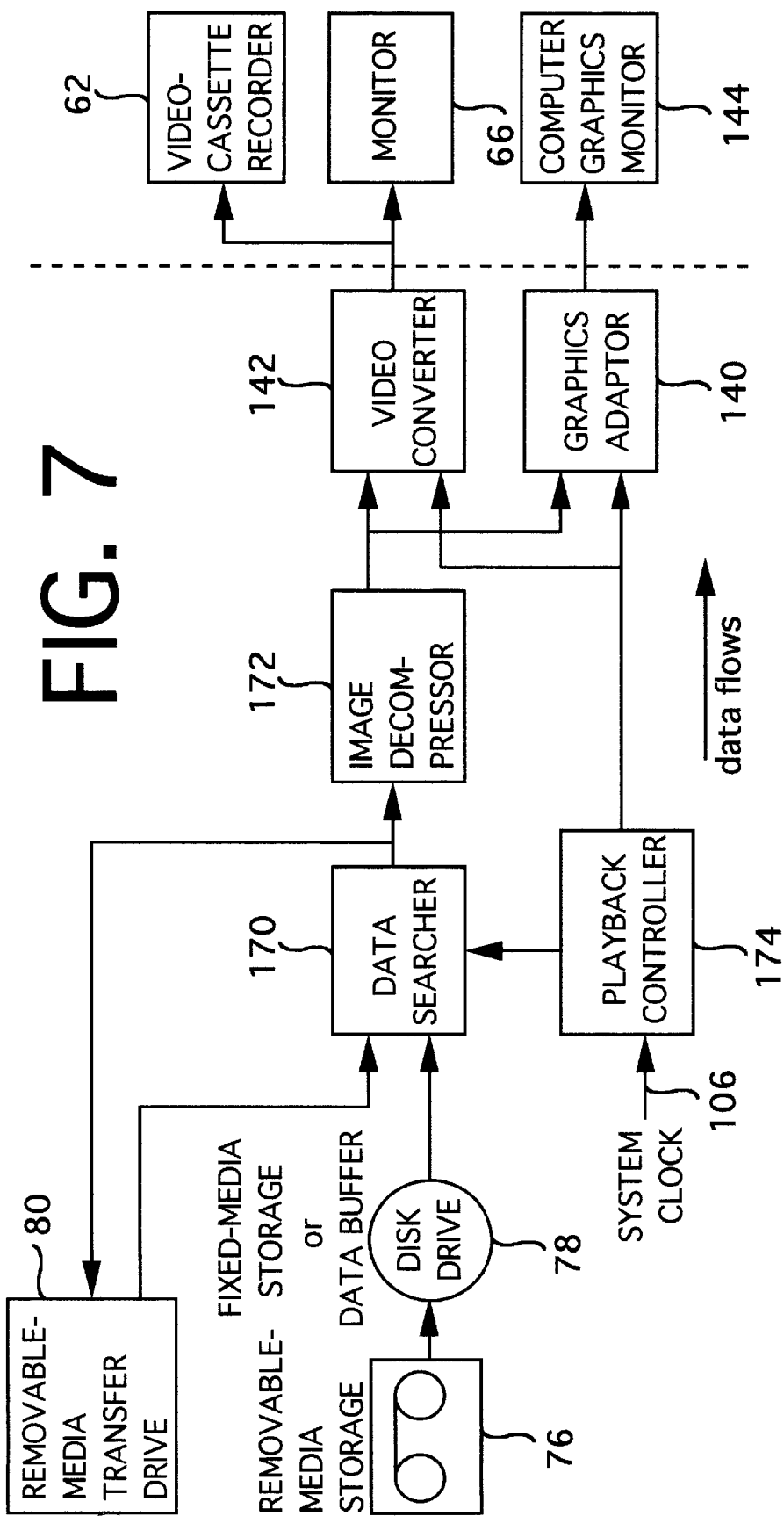
FIG. 7 illustrates data flows for an implementation of the playback function.

FIG. 7 summarizes signal flows for the playback function. A playback controller 174 directs which images or sequence of images are to be decompressed and displayed. Motion images must be reproduced in step with a clock to recreate motion as it was recorded. The playback controller directs a data searcher 170 to fetch images from storage for the requested sequence. These images are decompressed by image decompressor 172. The playback controller loads decompressed images into video converter 142 or graphics adaptor 140 in step with a playback clock derived from system clock 106. The playback controller may cause the video converter or graphics adaptor to repeat images until a new image is available from the storage record. The playback controller, image decompressor, and data searcher may be implemented by software executing on the CPU and, as such do not appear on the hardware drawing of FIG. 6.

Removable-media transfer drive 80 is accessed by the data searcher as a playback source. The data searcher can also retrieve data sets from removable-media storage 76 or fixed-media storage 78 for copy to the removable-media transfer drive.

RATE CONTROL TECHNIQUES

Operators of surveillance systems generally prefer recording devices that fill the storage media in predictable time periods. In a removable-media system—one that records on tape cassettes, for example—it is preferable that the cassettes become full only after a predetermined interval, or recording fill target interval. The cassettes can then be changed by the operator on a regular schedule (e.g. once every 24 hours) and saved for an archive interval. An archive interval is the interval of time data must be retained after the time of recording.

In a fixed-media system—one that records onto a hard-disk drive, for example—where older data are continually overwritten by new data, it is desired that data be retained for a minimum of the specified archive interval. Thus, any given point on the media should not be overwritten more frequently than once per archive interval. In this case therefore, the recording fill target interval, or time to fill the storage media once, is equal to the specified archive interval.

The goal, whether the storage media is removable or fixed, is to fill, or nearly fill, the media in the fill target interval. Ideally, the media would never become filled prior to the end of the fill target interval such that important data would be lost. Stated another way, the goal is to provide a rate of coverage, in terms of recorded image rates and resolution, that is both the maximum attainable for a given storage capacity and consistent, or without large fluctuations, across the entire recording interval. Loss of data near the end of the interval due to full storage media is an example of inconsistent coverage (see example shown in FIG. 16).

At least two factors contribute to variability in data flows and media filling rates in a compressed video recording device. One is the increase in the compressed video data rate that occurs when images with larger motion content are compressed by the interframe image compressor. A second factor, which is independent of data compression, results from accelerating the recording rate in response to event triggers. This technique is sometimes applied in order to capture more information during a possibly important event. Both factors are functions of activity at the recording sites and, as such, cannot be compensated for by initial machine programming. Left uncorrected, the variable data flows would cause irregular and unpredictable fill times for the storage media.

The invention solves the problem of irregular media fill times in a compressed video recording system by making variable the amount of image data which is recorded, and by applying a control system to adjust this amount of image data in order to manage the filling of the storage media. This solution will be referred to in general as a 'rate control system'.

Mathematically, the compressed video data rate is equal to the image rate multiplied by the data per image. Using relations 1 and 3, we find:

$$\text{compressed data rate} \propto \frac{\text{image rate} \times \text{image resolution}}{\text{compression ratio}} \quad \text{(relation 4)}$$

In the above context, data rate is expressed in quantities such as bits per second, and image rate in images per second.

The compression ratio is a function of image complexity factors such as detail and motion.

The control system operates to modify the image recording rate and/or the image resolution to compensate for changes in compressed data rate caused by factors such as motion within the field of view, variations in image detail, and recording changes driven by event triggers. In response to these factors, the control system seeks to maximize, and make uniform, image recording rate and resolution given the limitations imposed by a finite storage space for data and the requirement to support a particular fill target interval.

Figure 13:
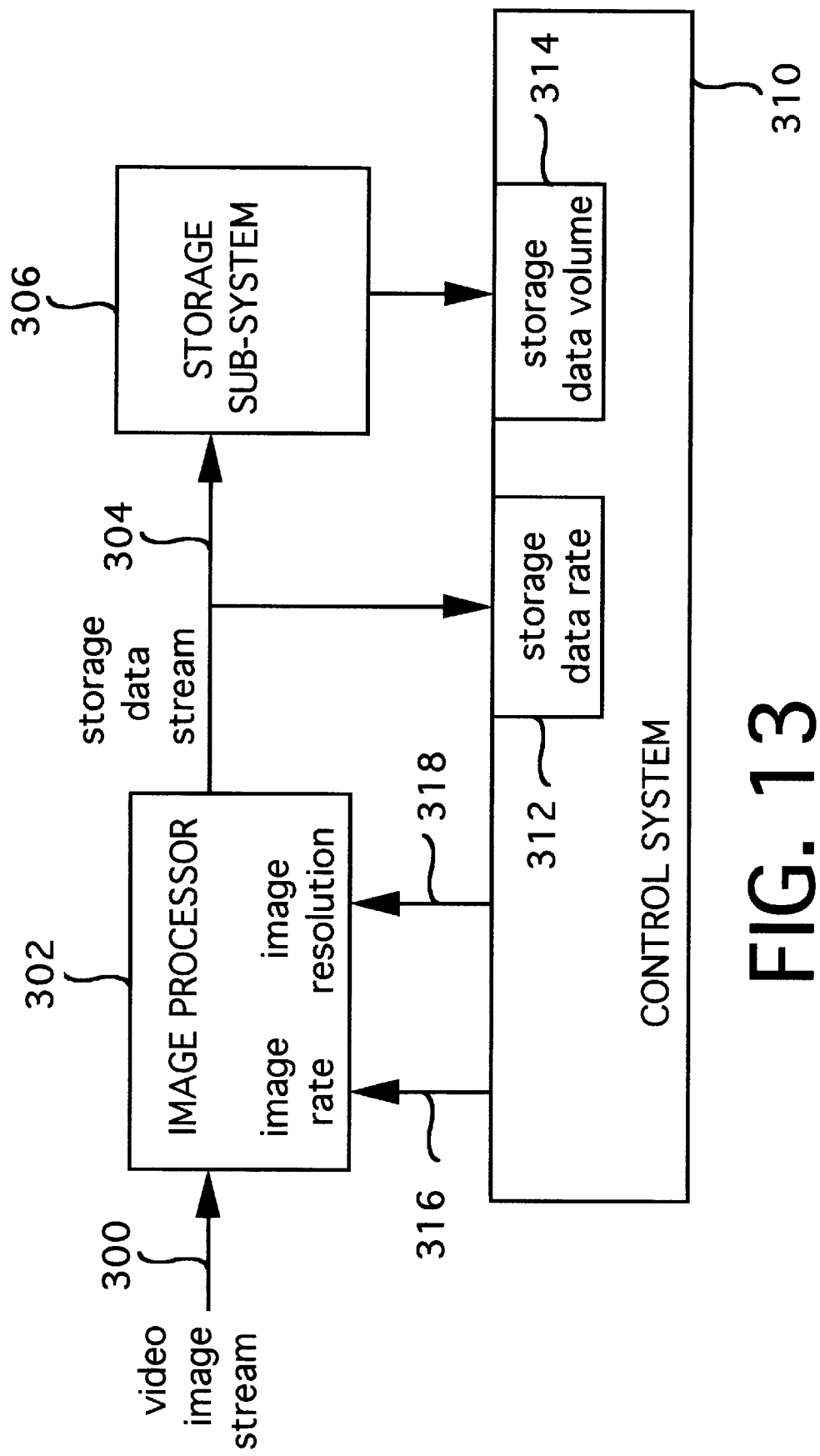
FIG. 13 is a block diagram of fundamental rate control applied to a recording system.

FIG. 13 shows a fundamental rate control system according to the principles described above. Input images from a video image stream 300 are applied to an image processor 302. The image processor represents all processing functions to be carried out prior to data storage including digitization, data reduction, and image compression. The output of the image processor is a storage data stream 304 containing the processed video images. The storage data stream is directed to a storage sub-system 306 for storage. The storage sub-system contains the storage media on which data is stored. A control system 310 includes capability to monitor storage data rate 312, which is the rate of data in the storage data stream. The control system also monitors attributes of the storage sub-system including storage data volume 314, which is the volume of data accumulated in storage. The image processor 302 receives control inputs for varying parameters of image processing. These inputs include image rate 316, and image resolution 318. Each of these inputs connects to an output from the control system 310.

The control system 310 varies parameters of the image processor 302 in order to control the data rate of the storage data stream 304. By controlling the storage data stream the control system is able to cause the storage sub-system to fill in a desired manner.

The remainder of this section first describes control systems that operate without feedback. It then introduces a basic and then an enhanced feedback control algorithm for controlling single-pass filling of storage media. A basic control algorithm is set up simply by invoking the two parameters of fill target (equal to storage capacity) and the fill target interval to control the rate at which data is sent to storage. An enhanced control algorithm makes use of additional parameters such as a set of predetermined data rate estimates or profiles. Data rate profiles improve control performance by anticipating the typically recurring patterns in the rate of significant data encountered at most monitored sites. Finally, the basic and enhanced algorithms are adapted to the case of continuously-overwritten storage in fixed-media recorders.

Figure 14:
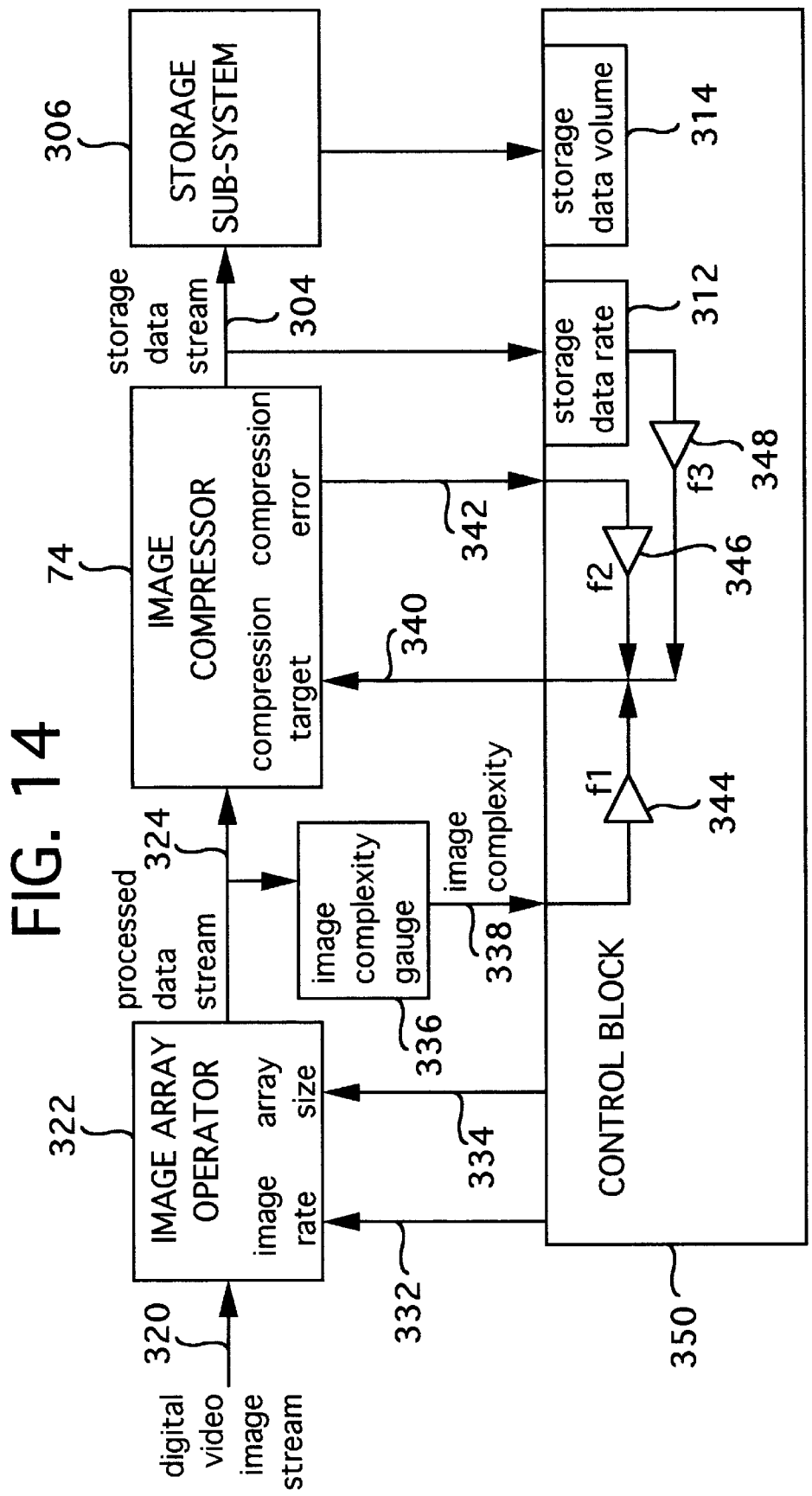
FIG. 14 is a block diagram of a recording system for digital video inputs with rate control, also incorporating parameters of compression in the rate control process.
Figure 15:
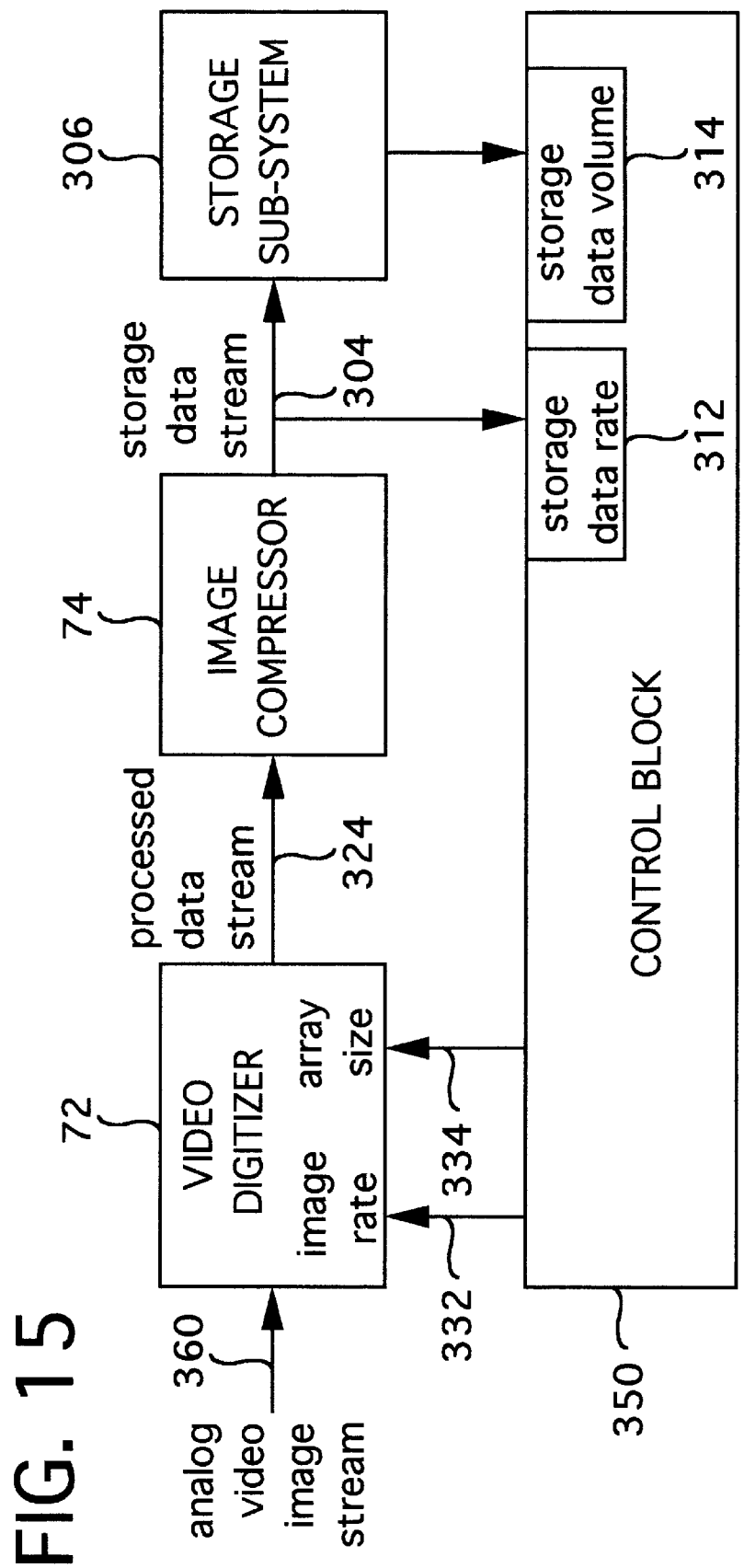
FIG. 15 is a block diagram of a recording system for analog video inputs with rate control.

FIGS. 14 and 15 illustrate particular rate control systems derived from FIG. 13 in which digital and analog video inputs are accepted. FIG. 14 also shows how parameters of compression can be incorporated into the rate control system. Actual applications may utilize fewer means than shown in any of FIGS. 13, 14, or 15.

In FIG. 14 the image processor 302 of FIG. 13 is broken into the two separate functions. These functions are an image array operator 322 and an image compressor 74. A digital video image stream 320 is first applied to the image array operator. The image array operator passes a partial number of the whole images available at the input under control of the image rate 332 input. The image array operator can also reduce the pixel density of passed images either by respacing pixels through interpolation or by direct elimination of pixels. This array reduction operates under control of the array size 334 input. Reducing pixel density effectively lowers the resolution of images. Both image rate and array size parameters, which are determined by the control block, can reduce the rate of data transferred to the storage media. The output of the image array operator is a processed data stream 324 which is directed to the image compressor 74. The image compressor outputs a storage data stream 304 which is directed to the storage sub-system 306.

Parameters sampled by the control block 350 include the storage data rate 312 and the storage data volume 314. The volume of data in the storage media is, of course, the integral of the storage data rate taken from the beginning of the fill interval, as will be shown later in relation 6. Therefore a control block can be devised that monitors only one of the parameters, either storage data rate 312 or storage data volume 314 and infers the other by calculation. The control block acts on the image rate 332 and array size 334 inputs to the image array operator to control the rate of the storage data stream as before.

The image compressor 74 in FIG. 14 represents an additional point in the data path where the rate of the storage data stream can be both measured and altered. The rate of data in the storage data stream is inversely proportional to compression ratio. Higher compression ratios tend to introduce larger compression errors, or losses of fidelity between the original and eventual decompressed images. Also, greater input image complexity tends to force compression errors higher unless the compression ratio is lowered.

Compression ratio may be influenced by the compression target 340, which is an input to the image compressor. Several strategies exist for controlling the compression target. First, image complexity can be measured ahead of the image compressor by an input complexity gauge 336. The resulting image complexity 338 data is applied to function f1 344 of the control block. The output of function f1 in turn controls the compression target 340 parameter. A second strategy is to measure the compression error 342. Compression target is then adjusted by way of function f2 346 to maintain a desired compression error. A third strategy is to monitor storage data rate 312 and adjust the compression target by way of function f3 348 to maintain a desired storage data rate at the expense of compression error. Functions f2 and f3 represent feedback paths in contrast to function f1 which represents a feedforward path. As such, f2 and f3 can be implemented either iteratively or cumulatively. An example of iterative feedback is multiple pass compression of a single image with varying compression targets controlled via f2 until the desired compression error is attained. An example of cumulative feedback is single pass compression of images and adjustment of compression target via f3 according to the result of one or several prior images.

With the foregoing in mind, it is apparent that there are several possible methods of inferring storage data rate for a particular compression implementation. Image complexity, compression target, compression ratio, and compression error can each provide information for driving a rate control system. It is also apparent that the storage data rate can be influenced by altering the compression ratio by way of the compression target parameter. Thus, image resolution and image fidelity can be traded to control the rate of the storage data stream for the purpose of rate control.

FIG. 15 illustrates a rate control systems for analog video inputs. Details for monitoring and controlling parameters of compression are not shown in this figure, though they could be applied as were shown in FIG. 14. In FIG. 15 an analog video image stream 360 is connected to a video digitizer 72. The video digitizer digitizes a partial number of the whole images in the analog video image stream under control of the image rate 332 input. The pixel density of the resulting image array is determined by the sampling rate of the video digitizer. Sampling rate, and thus array size, is controlled by the array size 334 input to the digitizer. The output of the video digitizer is a processed data stream 324. The remainder of the system shown in FIG. 15 operates in the same manner as do the systems of FIGS. 13 and 14.

Control Without Feedback:

Most video cameras generate frame rates in excess of that required for typical surveillance recording. In fact, it is usually necessary to process and store only a small fraction of frames from the camera in order not to overextend the data storage medium. In a system without feedback control, camera frames are chosen for processing at a pre-set constant rate which is generally a fraction of the input camera rate. In a system with feedback control, control can be introduced at several points in the system as described previously. For example, the fraction of camera frames chosen can be controlled to be greater or less than the pre-set constant. In addition, control can be imposed on parameters of the image itself—e.g., array size and compression ratio. The collective effect of influencing these parameters for the purpose of rate control is represented by a quantity now introduced called the "data rate modifier." A value of unity for the data rate modifier means that the collective action of the control variables is the same as for their pre-set, or nominal, values as programmed by the designer or operator of the recording device. Data rate modifiers greater or lesser than one mean that the control feedback system has caused the collective action of the control variables to be greater or less than their nominal values. In the later discussion, it is brought out that the data rate modifier can vary as a function of time, and is accordingly given the symbol r(t).

Figure 16:
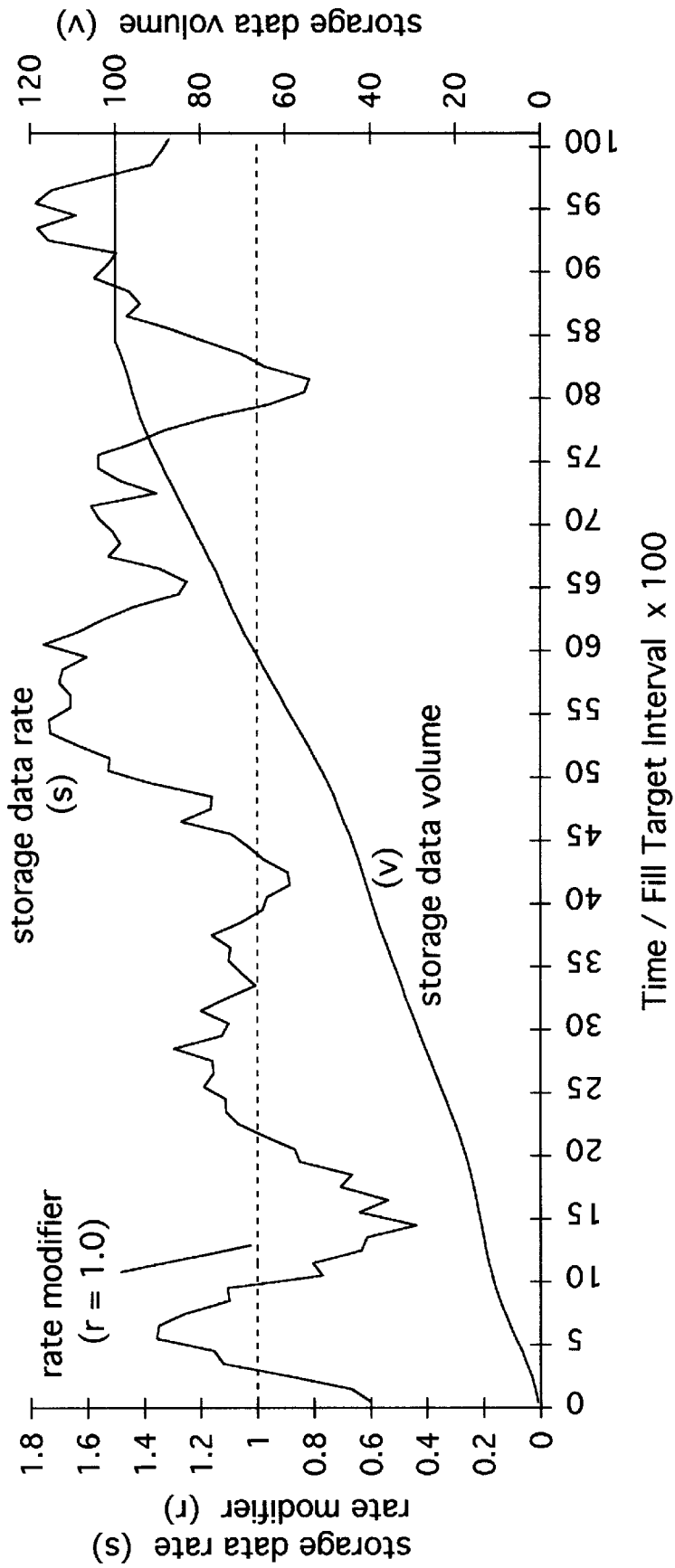
FIG. 16 is a time history example of a storage device being filled by a data stream of variable rate.

Illustration of rate control examples begins with a system in which the rate modifier r(t) has been set to a constant value of unity. This is the case where no feedback control is applied and all data rate influence are set to constant, nominal values. FIG. 16 shows a time history for this example in which a storage data stream of variable data rate is filling the storage media.

The storage data rate—the rate at which compressed data is being sent to storage—is shown across the fill target interval in FIG. 16. Even though factors such as image rate are constant, as determined by the rate modifier, the storage data rate nevertheless fluctuates. The fluctuation is a result of image motion and detail changing with time—i.e., when there is significant motion in the fields of view of the surveillance cameras, the storage data rate necessarily rises. In this example, this rate fluctuates randomly over approximately a 4:1 range. Storage data volume—the accumulated data in the storage media—is also shown in the figure. Storage data volume can be graphically calculated by finding the area under the storage data rate line from t=0 to the abscissa. The fill target is set equal to the storage capacity of 100 units in this example. The rate modifier, r(t), which, as mentioned above, is set to a value of 1.0, is similarly shown. Unfortunately, this value of rate modifier results, in this example, in the storage media becoming filled after only 85% of the fill interval has elapsed—i.e., with 15% of the time interval still remaining, and no place for the remaining data to go.

Figure 17:
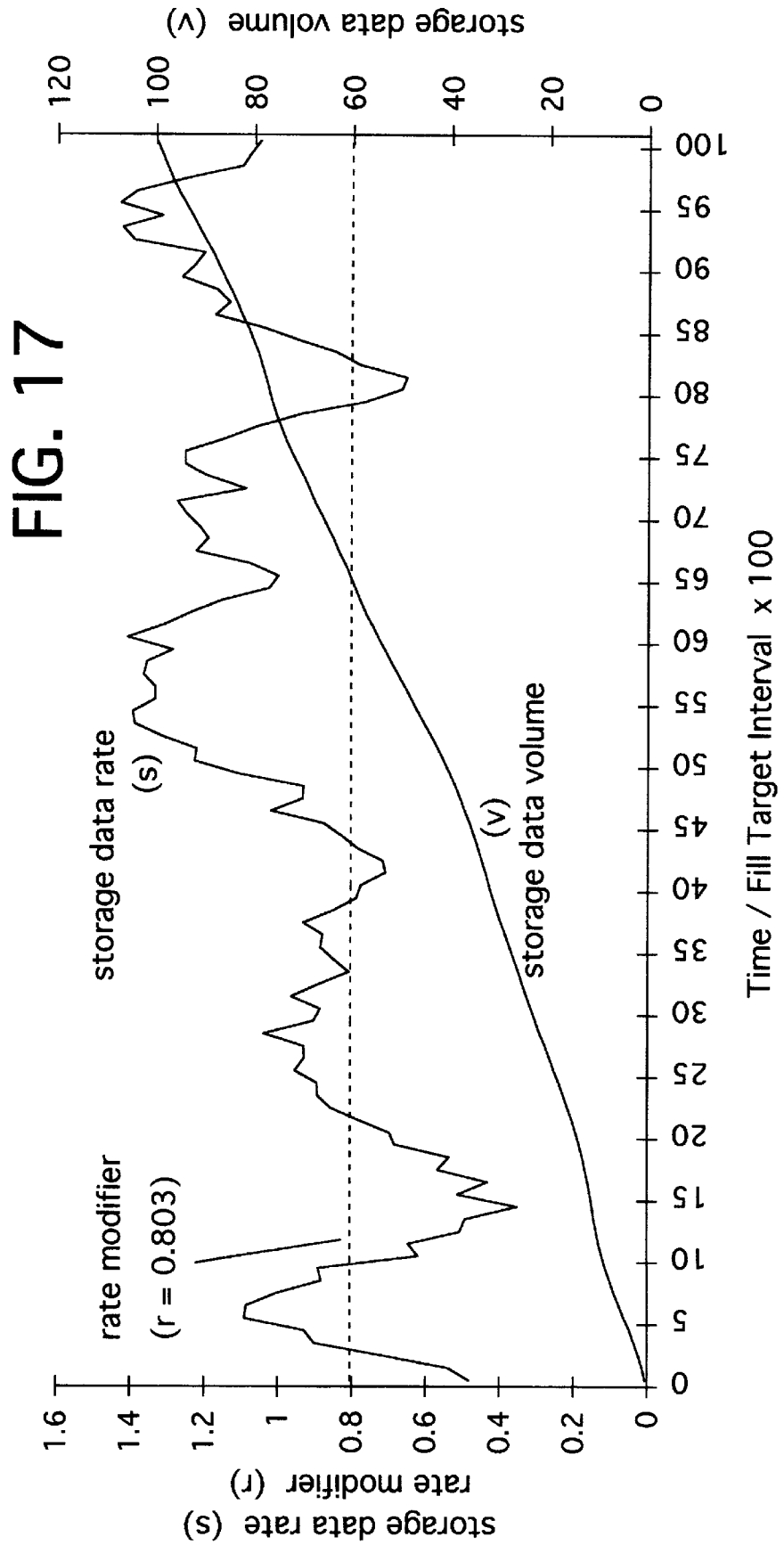
FIG. 17 is a time history example similar to FIG. 16 where a rate modifier has lowered the storage data rate.

FIG. 17 illustrates the same non-feedback situation as FIG. 16, except that the data rate modifier has been lowered to a value of 0.803. The storage data stream is accordingly lower by the same amount over that of FIG. 16. The value of 0.803 has been chosen based on a priori knowledge of what the data rate history will be over the next fill interval, thereby resulting in the exact filling of the storage media (capacity=100 units) at the end of the fill interval. Of course, this is an impractical situation, since complete and reliable a priori knowledge of data rates is not possible in practice. Nonetheless, it serves to illustrate the key criteria of maintaining level record rates and resolutions and thus consistent coverage of the monitored site.

An obvious method of employing feedback to fill the storage media exactly on time is to force the rate of data entering the storage media to be constant, and of such a rate that it always matches the storage fill target divided by the fill target interval. However, this solution is unacceptable for the reason that it would cause the combined image rate and resolution to fluctuate drastically and in inverse proportion to the motion content of the images. Image rate would race, for example, when no motion was present in the recorded field of view and drop to a rate many times lower when large activity commenced. Motion triggers applied to video recorders, in fact, seek exactly the opposite effect—that of increasing the frame rate when activity is present.

Figure 18:
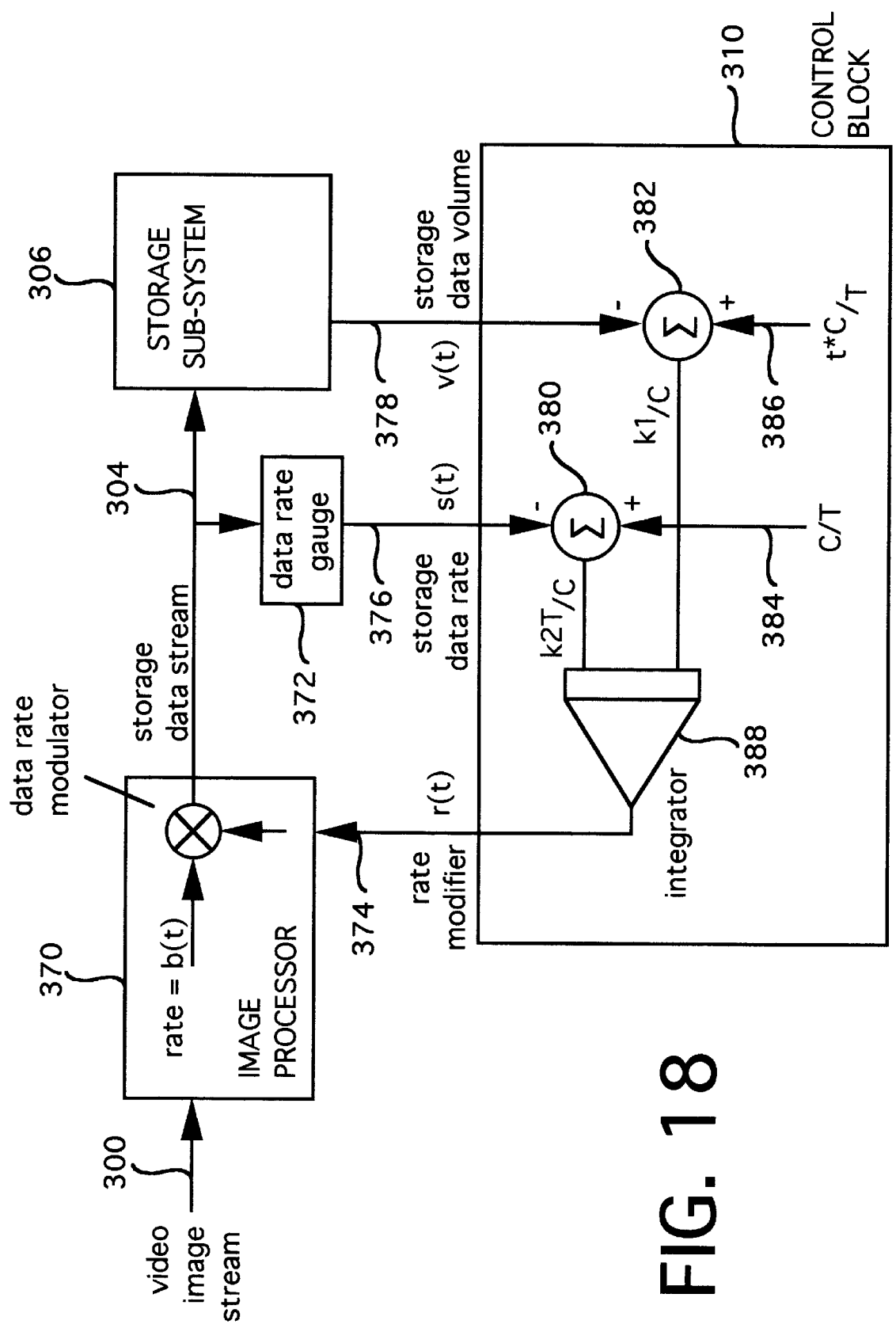
FIG. 18 is a block diagram of a rate control system according to the principles described for basic control loops.

Basic Control Loop:

FIG. 18 introduces an example of a basic control algorithm implemented within the control block. This example uses the rate modifier concept to simplify representation of image rate and image resolution control as discussed earlier. The rate modifier modulates, or multiplies, a hypothetical base data rate, b(t), resulting in the storage data rate, s(t). The base data rate is the rate data would enter storage were the control loop to exert neither an accelerating nor a decelerating rate influence.

In FIG. 18 the video image stream 300 is applied to a image processor 370. The image processor in the figure accepts a rate modifier 374 as the single control parameter. The rate modifier lumps together the effects of varying image rate, image resolution, and compression parameters as described above. The output of the image processor is a storage data stream 304 which is directed to the storage sub-system 306 as before. The storage sub-system outputs a measure of the storage data volume 378 which is applied to the control system 310. A data rate gauge 372 monitors the storage data stream and outputs a measure of the rate of this stream as storage data rate 376. Storage data rate is applied to the control block. Storage data volume is represented by the symbol v(t). and storage data rate is represented by the symbol s(t).

The main control element in the loop is an integrator 388 that serves to smooth the response to short-term fluctuations in compressed data rate while providing sufficient long-term correction to fill the storage media acceptably close to the fill time target, T. The output of the integrator is the rate modifier 374. The rate modifier is represented by the symbol r(t). The integrator is driven by two quantities. One is the difference between the storage data rate 376 and a value corresponding to an "idealized" data rate of C/T 384. This difference is generated by difference element 380 and is scaled by the factor k2T/C. The second quantity is the difference between the storage data volume 378 and a value corresponding to an "idealized" data accumulation of t*C/T 386. This difference is generated by difference element 382 and is the scaled by the factor k1/C. Constant C is the fill target for the storage media. Constants K1 and K2 set loop performance.

At the start of a cycle of operation, r(t) is set equal to unity. As the cycle proceeds, the integrator will adjust the value of r(t) to more nearly optimize the storage utilization. The algorithm of FIG. 18 is equivalently expressed by relations 5 and 6 below:

$$r(t) = 1 + \int_0^t ((k1/C*(t*C/T-v)) + (k2*T/C*(C/T-s)))dt \quad \text{(relation 5)}$$

s(t)=r(t) * b(t) and $$v(t) = \int_0^t s\,dt \quad \text{(relation 6)}$$

where variables:

t is time b(t) is base data rate, or data rate prior to loop correction such that s(t)=r(t) * b(t)

r(t) is the data rate modifier, which is the variable generated by the control loop s(t) is the storage data rate—the rate at which compressed data is sent to storage v(t) storage data volume—the volume of data accumulated on the storage media and constants:

C is the fill target—the target amount of data to be stored on the storage media during time interval T T is the recording fill target interval to store the data, C, on the storage media. T is usually chosen to equal the archive interval.

The basic control loop described by FIG. 18 and relation 5 is a second-order loop. The second integration is embodied in the operation of filling the storage media, as shown by relation 6. A second-order loop is employed so that the error between the storage data volume v(t) and its target value of C * t/T will approach zero for a steady-state base data rate b(t). Rate feedback, set by coefficient K2, stabilizes the double-integrator loop.

The delay inherent in the integrator response permits temporary increases in compressed data rate—caused by unexpected image motion, for example—to be accumulated in the storage media without immediately lowering image rate to compensate for the extra data. As a consequence. the loop cannot prevent filling past the fill target if these unexpected increases in data rate occur near the end of the fill interval, T. It is therefore prudent to choose the capacity of the storage media to be greater than the fill target, C. The margin of capacity over fill target is chosen as a function of the loop response speed and the anticipated worst-case step increase in base data rate.

Figure 19:
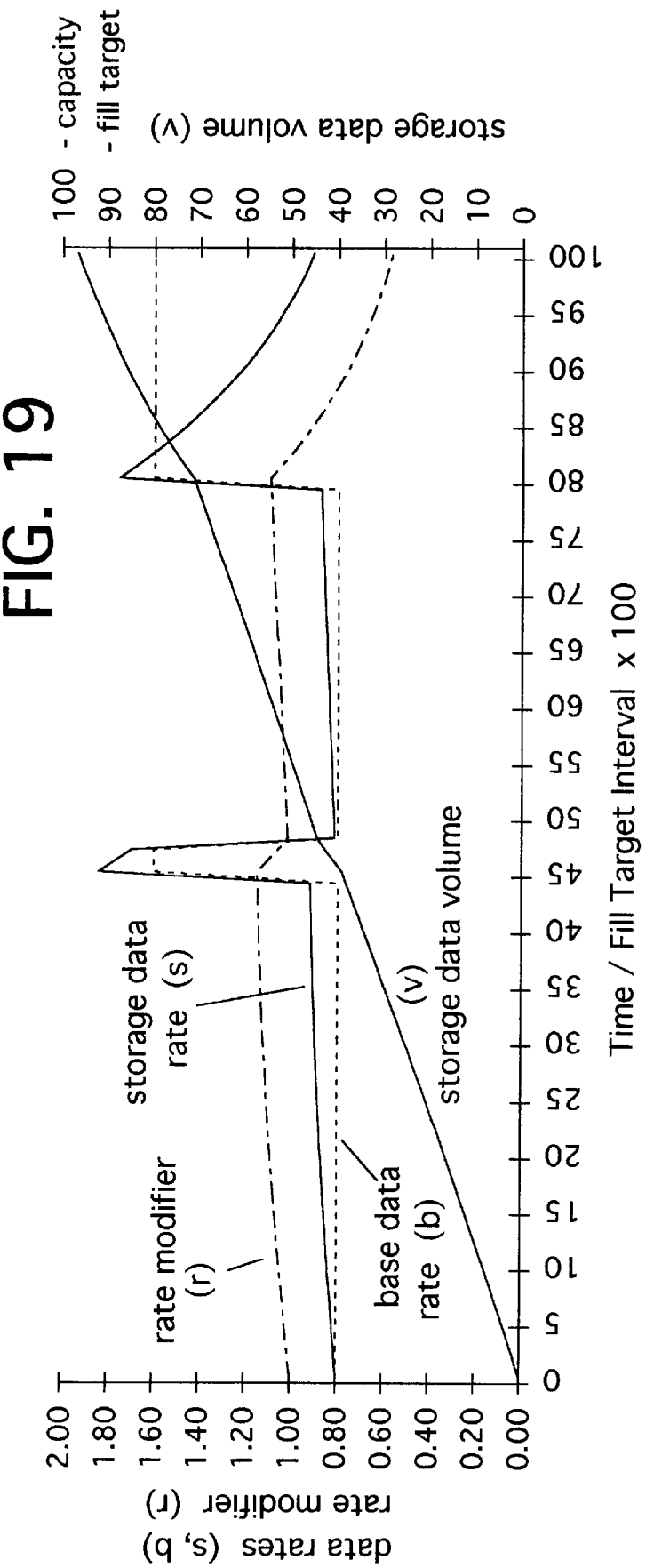
FIG. 19 is a time history example illustrating the response of the basic control loop to step changes in base data rates.

The example of FIG. 19 examines the response of the basic control loop to step inputs. Here, the value of the fill target, C, has been set to 90% of the actual storage capacity of 100. This provides a filling error margin of 10%. In this example, the base data rate, b(t), steps between the two levels of 0.8 and 1.6. Loop constants k1 and K2 are set to 0.15 and 0.05, respectively. The base data rate, which is 0.8 until time step t=45, is slightly below the target value for the storage data rate, s(t), of 0.9 (C=90 divided by T=100). Therefore in accordance with the algorithm, the loop slowly increases the rate modifier, r(t), above the initialization value of 1.0. By raising r(t) the loop is acting to increase the rate of data entering storage by, for example, processing a greater number of camera images than were originally required by initial conditions.

In the time interval t=45 to t=48 the base data rate briefly doubles to 1.6. This represents the case, for example, where the compressed data content of each image has doubled because of motion. In response to this however, the rate modifier drops by only 12%. This means the loop forces down the rate that images are recorded by only 12%. The rest of the base rate increase is accommodated in storage as extra accumulated data. Near the end of the fill interval, the base data rate again (unexpectedly) doubles from time t=80 until the end of the interval. Base data rate increases near the end of the fill interval would be difficult to accommodate, except that since fill target, C. has been set to 90% of capacity, the unexpected data can be stored. The final result is that data fills 96.8% of the storage media capacity—in excess of the fill target of 90 units but well within the actual capacity of 100 units.

Figure 20:
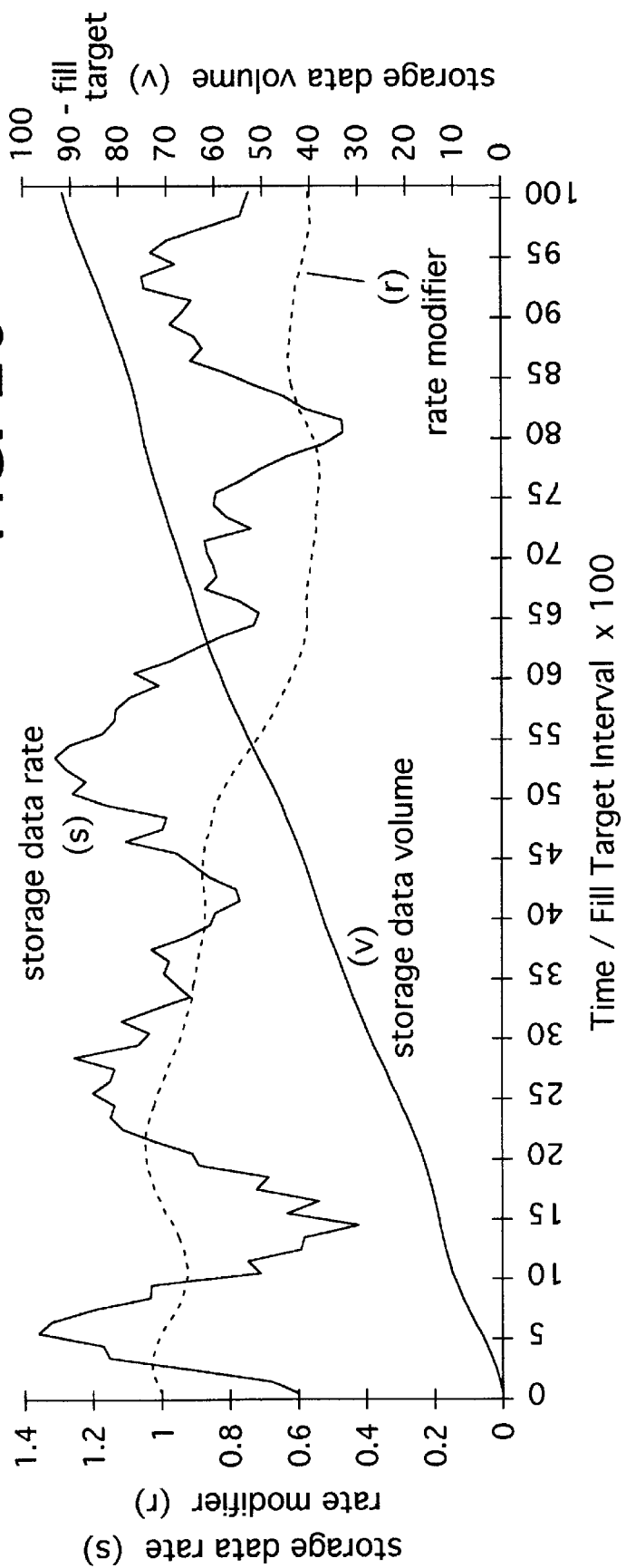
FIG. 20 is a time history example illustrating the response of the basic control loop to varying base data rates.

The example of FIG. 20 uses the same loop settings as the example of FIG. 19, but assumes the base data rate shown in FIGS. 16 and 17, which is more representative of an actual application. Once again it can be seen that, because of the integration in the control loop, the short-term fluctuations in base data rate, b(t), have the desired small effect on the rate modifier. The longer-term increase in base data rate apparent in FIG. 16, results in the rate modifier value being adjusted downwards across the interval in FIG. 20 to prevent storage media overflow. Final data storage exceeds fill target by only 2% in this example; there is still an unused margin of 8% of the storage media capacity.

Rate Profiles:

The performance of the basic control algorithm of FIG. 18 can be improved if some realistic estimate of data rates can be provided in advance of the recording cycle. It is particularly useful if the estimates can be related to clock or calendar time—i.e., time of day or day of week. In this section, we discuss how information of this type assembled into what we call a "profile," can be used in an Enhanced Control Loop to improve the performance of the system.

A survey of monitored site applications reveal that motion activity, and therefore compressed data rates, typically follow daily and weekly patterns. For example, a video recording system monitoring an industrial plant or office staffed primarily by a weekday workforce might generate a base data rate, b(t), of the type shown in the seven day graph of FIG. 21. Here, the data rate exhibits a pattern of broad peaks during the weekday hours of 7AM to 6PM. This results from the majority of the workforce being present at the facility during these times. In finer detail, each of the five weekday broad peaks is punctuated by sharper peaks coinciding with activities such as lunch, work breaks, and the arrival and departure of personnel. Smaller, irregular peaks may occur on evenings and weekends as a handful of employees and security staff check in and out of the facility. A certain minimum base data rate manifests Itself at the output of the image compression system even when no motion content is present in the scene. This minimum rate results from camera noise, image background fluctuations, and protocol data identifying advancement of the image sequence.

Figure 22:
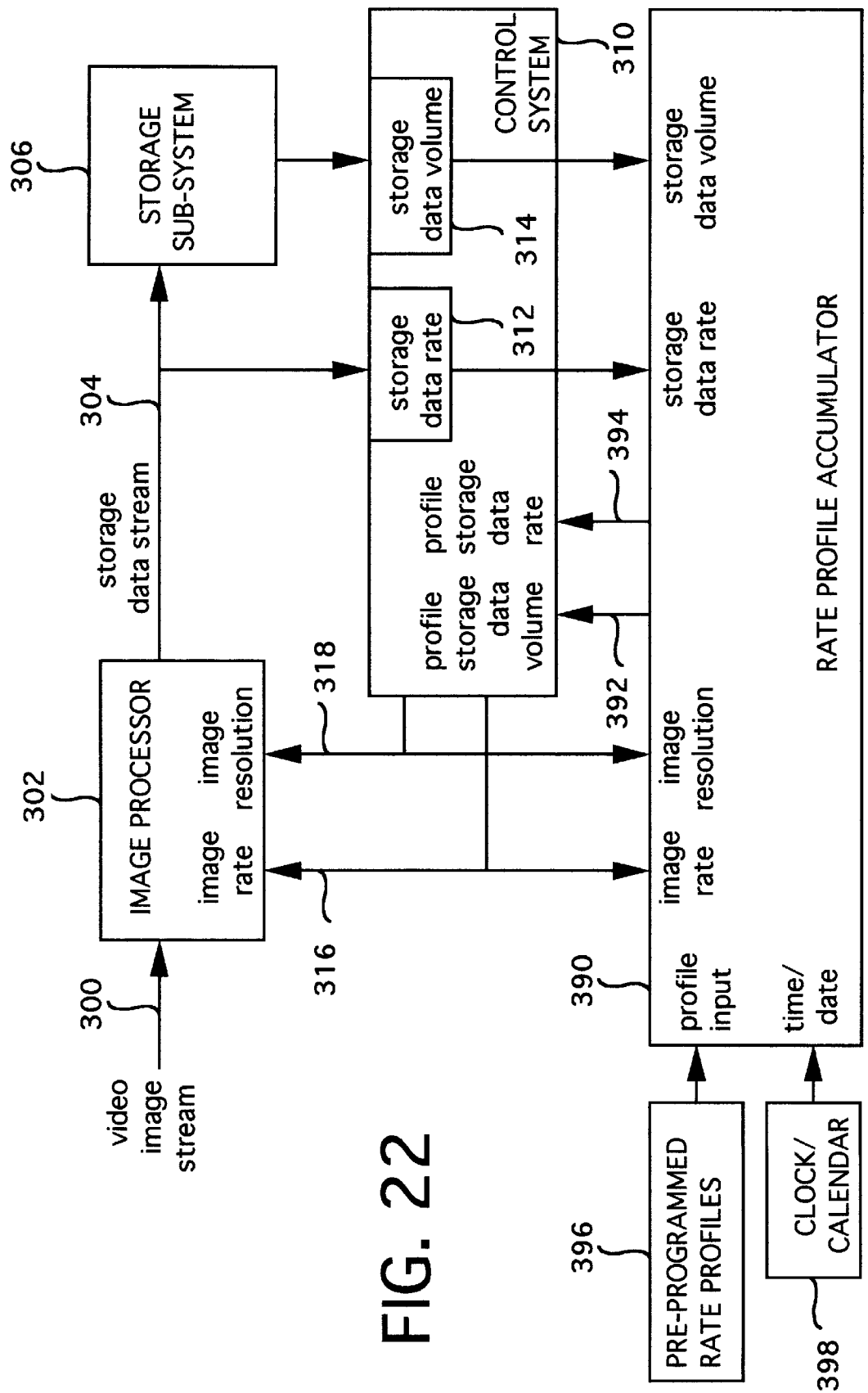
FIG. 22 is a block diagram of a recording system with rate control, Including rate profile functions for implementing enhanced control loops.

FIG. 22 introduces the enhanced control loop concept by adding two components to the fundamental rate control system described in FIG. 13. These two components are a rate profile accumulator 390, and a clock/calendar 398. A store of pre-programmed rate profiles 396 can optionally be included. The rate profile accumulator receives the information of storage data rate 312 and storage data volume 314. These parameters are monitored by the control system 310. The rate profile accumulator also receives information of image rate 316 and image resolution 318. These parameters are outputs of the control system. Finally, the rate profile accumulator receives time/date data from the clock/calendar 398, and accepts profile data from the store of pre-programmed rate profiles 396.

Figure 21:
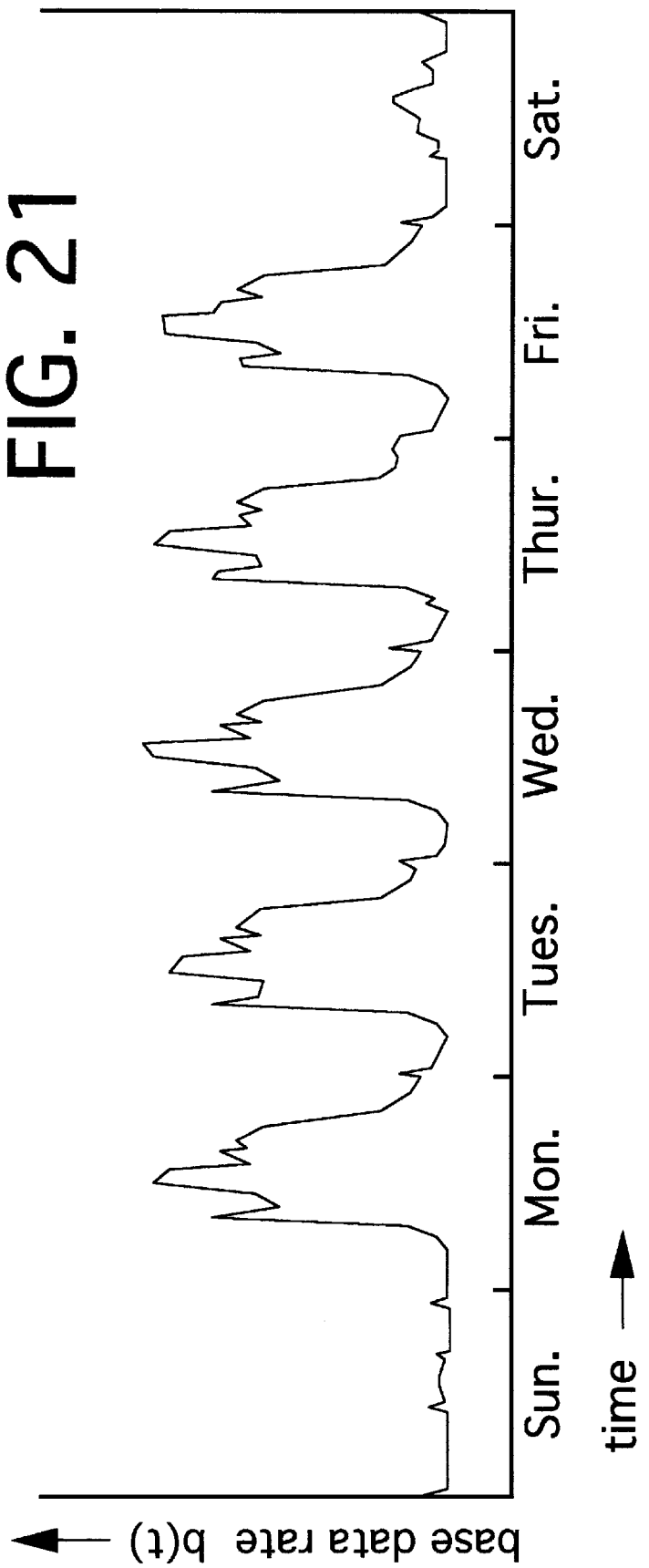
FIG. 21 is a 7-day time history example of base data rates in a weekday-staffed work site.

The purpose of the rate profile accumulator is to observe the data rates over a period of time, and by averaging this activity over a number of time periods—days, weeks or months—develop a rate profile. FIG. 21 is actually such a rate profile, showing data collected over a number of weeks, and averaged to develop the curve shown. Pre-programmed rate profiles include all profile data that is not accumulated through the monitoring of instrument record cycles. Pre-programmed profiles are externally programmed data, either programmed during design of the instrument or locally programmed for the particular site of operation.

The output of the rate profile accumulator is a pair of signals. These signals represent estimates of the storage data rates and storage data volumes to be encountered in a new recording cycle. The first signal is the profile storage data rate 394, which is represented by the symbol sp(t). The profile storage data rate is used by the control block as a target for the storage data rate during the new recording cycle. A second signal is the profile storage data volume 392, which is generated by integrating the profile storage data rate from the start of the recording interval. Profile storage data volume is represented by the symbol vp(t), and is used by the control block as a target for storage data volume during the recording cycle.

The profile storage data rate, sp(t), and profile storage data volume, vp(t), signals serve as templates of storage media filling to allow the enhanced control loop to better maintain stable image rates and resolutions against the variable data flows encountered in a real recording cycle. This is based on the assumption that data patterns in a new recording cycle will resemble, to a degree, the data patterns that occurred in earlier record cycles. The enhanced control loop thus exercises minimum control influence by way of the rate modifier output variable when data patterns in the record cycle match that of the profile cycle. The data profiles employed by the enhanced loop contrast to the constant value data rate and linear-time storage accumulation targets (C/T and t*C/T) employed by the basic control loop. As before, the objective is to maximize the amount of data transferred to the storage media in a predetermined interval without large rate modifier fluctuations and without exceeding the capacity of the storage media such that subsequent data would be compromised or lost.

The rate profile accumulator shown in FIG. 22 collects and maintains a record of base data rates observed in operation of the recording device over an extended period of time. Note that base data rate is defined, as before, as the rate of compressed video data produced by the system when it operates according to some default, or preset, image rate and resolution parameters to the exclusion of any influence by the rate control loop. This base data rate must therefore be inferred indirectly by the rate profile accumulator since, while the control loop is operating, the base data rate will not exist as a directly measurable quantity in the system. The rate profile accumulator therefore measures actual data rate into storage s(t) and takes account of the effects imposed by the rate modifier r(t) on image rate and resolution to calculate the profiles according to b(t)=s(t)/r(t). The resulting assessment of base data rate can be stored as a series of bytes. For example, a byte can represent a 15-minute average of operation. The record for a complete year could then be retained in only 35 kbytes of storage.

A rate profile is generated from segments of the base data rate record that best correlate to the recording interval of interest. Correlation is most likely to be found across daily and weekly patterns, although correlation to monthly, seasonal, or other time intervals could be examined and used where applicable. For example, if a storage media is to be filled over a 24 hour interval from 9AM on Tuesday to 9AM on Wednesday then a rate profile is assembled for this interval by recalling 52 prior examples of the interval Tuesday 9AM to Wednesday 9AM from the year-long record of base data rates. The 52 segments are averaged together to produce a rate profile which projects the likely base data rate for each 15-minute segment of the upcoming Tuesday 9AM to Wednesday 9AM interval. Statistical techniques can be applied to assess confidence in the profile. Anomalous segments can thus be detected and left out of the averaging process.

Figure 23:
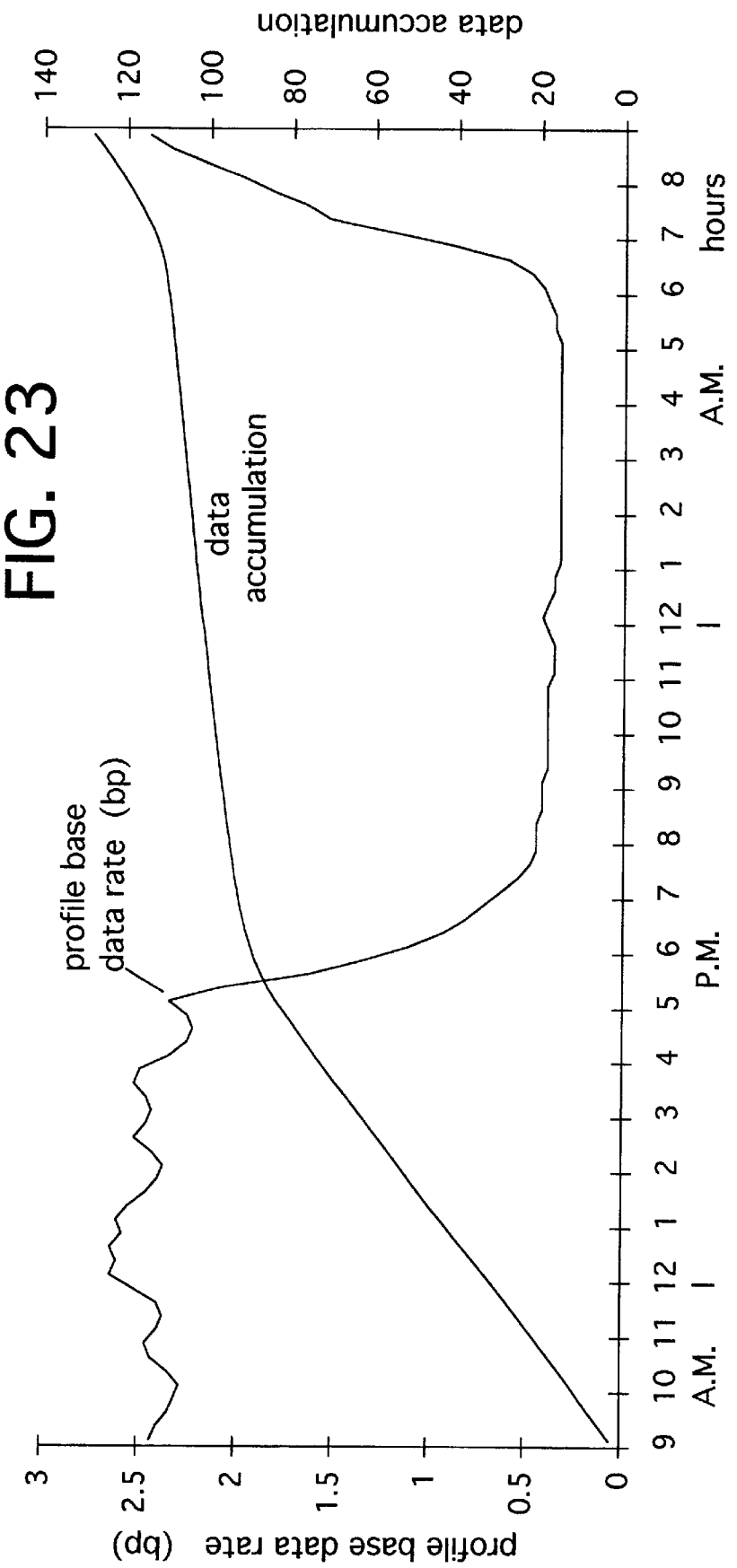
FIG. 23 is a time history example of unscaled profile data rates.

FIG. 23 shows a profile base data rate, bp(t), generated for a 24-hour interval according to the methods described above. The line for bp(t) shows high base data rates during the hours of 9AM to approximately 6PM caused by the bulk of the daytime workforce being on location during those times. The low base data rates from 6PM until approximately 7AM the following morning occur while the plant or facility is fairly empty. High base data rates resume at 7AM when the next workday commences. Data accumulation, which is generated by integrating bp(t) from the start of the interval, is also shown. In this particular example the data accumulation curve terminates at a value of 128 at the end of the 24 hour interval.

Figure 24:
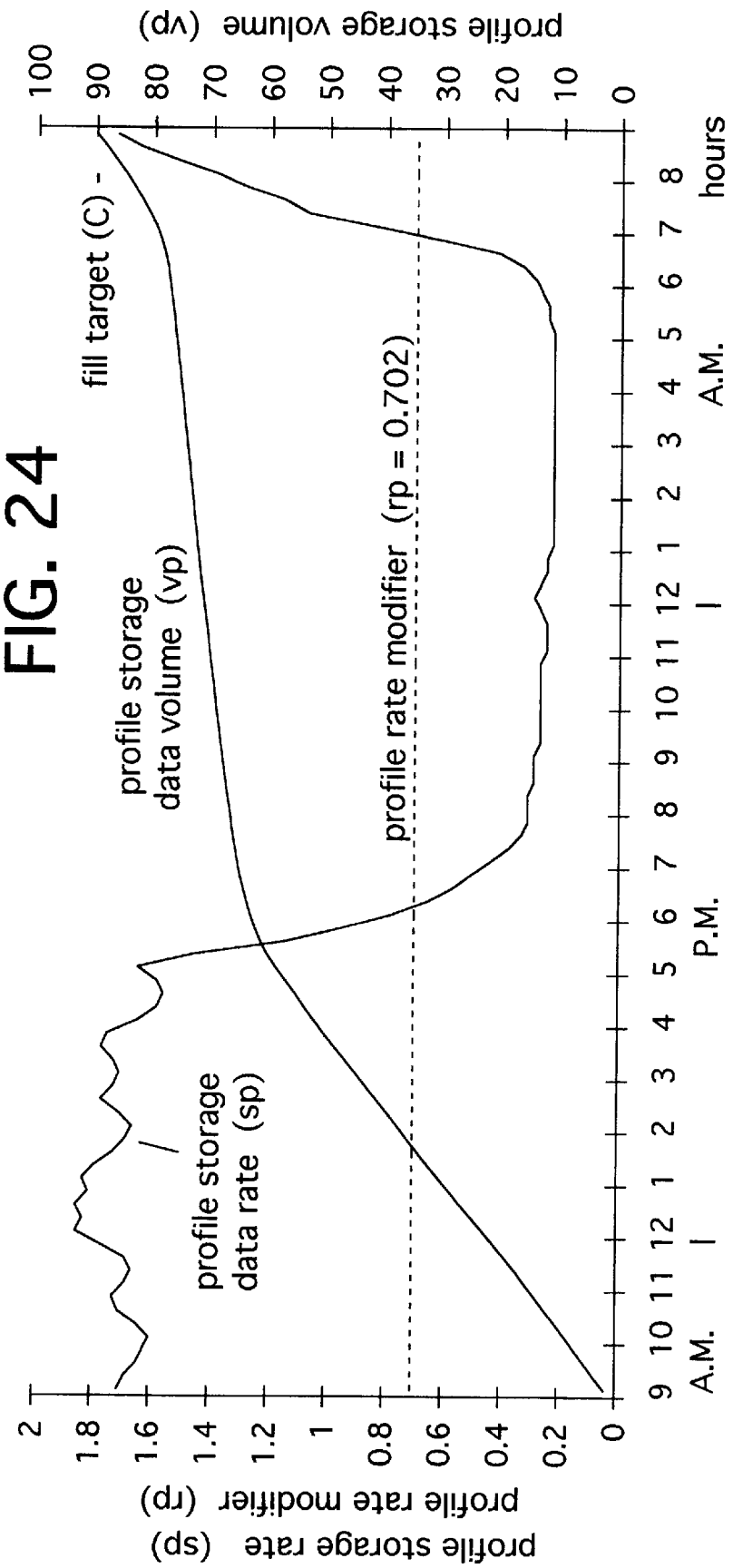
FIG. 24 shows the profile data rates of FIG. 23 scaled by a profile rate modifier.

Profiles sp(t) and vp(t) are generated from the curves of FIG. 23 simply by scaling so that data accumulation matches the fill target, C at the end of the interval. As in an earlier example, a fill target of 90% of the storage media capacity of 100 units is chosen. The curves of FIG. 23 must therefore be scaled by 90/128, or 0.702 to cause 90 units of data to be accumulated by the end of the interval. The result is a set of curves for profile storage data rate, sp(t), and profile storage data volume, vp(t), shown in FIG. 24. A third line has been added to show the scaling factor of 0.702 which is constant across the interval. This scaling factor can also be interpreted as the profile rate modifier, rp, since it would represent the optimal rate modifier value for a recording interval with the given profile base data rates. As will be seen later this value, rp, can be used as a starting, or initialization value, for the rate modifier in enhanced loop operation.

Summary 1: the steps taken to create rate profile curves for a new recording cycle are:

1) Determine which time segments in the existing record of base data rates are anticipated to correlate with the new recording interval;

2) Generate a profile base data rate, bp(t), as a mean-average of base data rate segments such that:
   bp(t)=[b1(t)+b2(t)+. . . .+bn(t)]/n, where b1(t) through bn(t) represent n base data rate segments selected from the record of base data rates in step 1.

3) Scale this profile base data rate, bp(t), by a constant rp to create a profile storage data rate curve, sp(t), and a profile storage data volume curve vp(t) such that the storage volume at the end of the target interval, T, equals the fill target C. Specifically rp, sp(t,) and vp(t) are defined so that;

$$rp = C \bigg/ \left( \int_0^T bp\, dt \right)$$ (relation 7)

$$sp(t) = rp * bp(t)$$ (relation 8)

$$vp(t) = \int_0^T sp\,dt \qquad \text{(relation 9)}$$

and, therefore;

vp(T)=C

Figure 25:
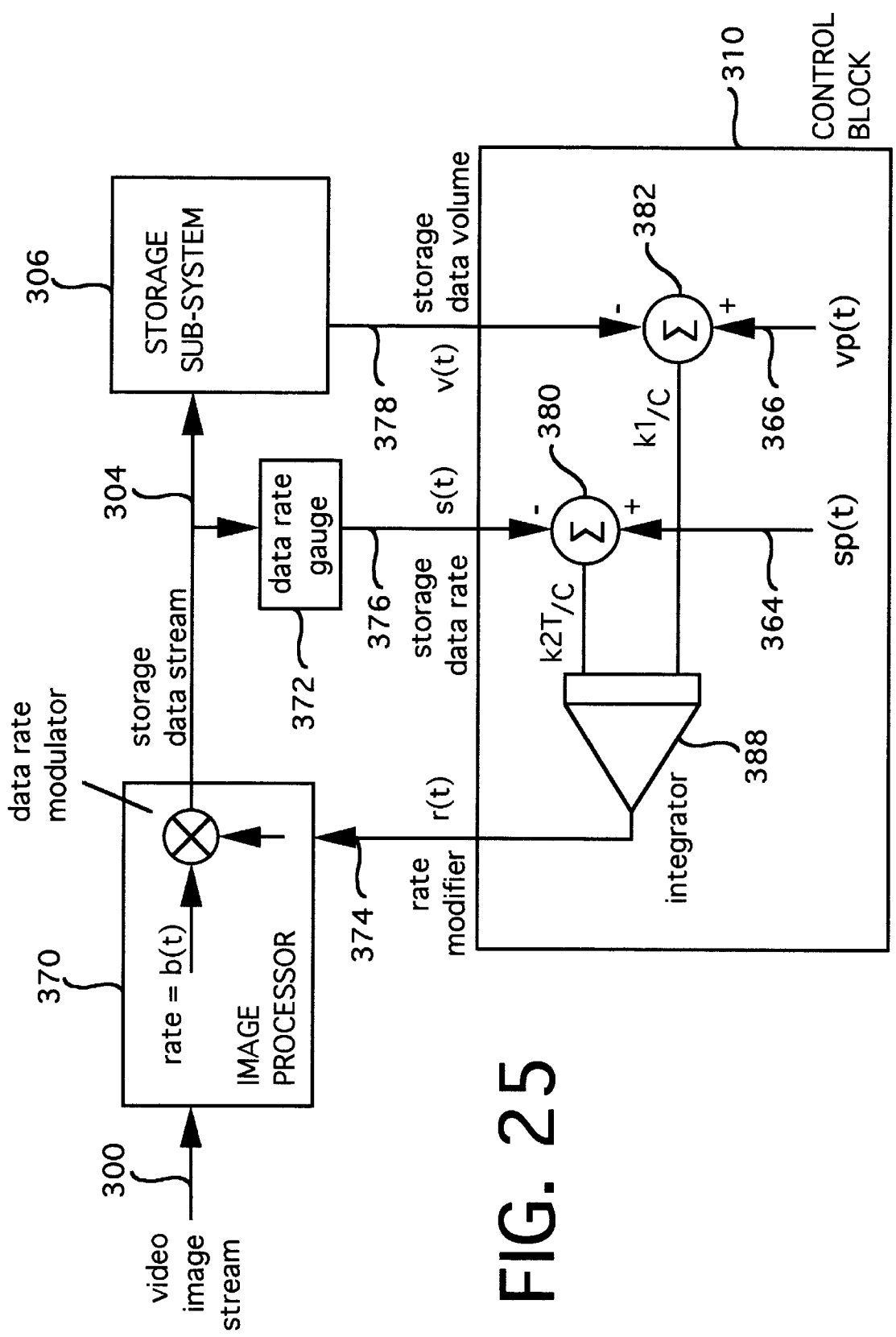
FIG. 25 is a block diagram of a rate control system according to the principles described for enhanced control loops.

Enhanced Control Loop Utilizes Rate Profiles:

The enhanced control algorithm is based on a modification of the basic control algorithm previously described by FIG. 18 and relation 5. This new algorithm which is described by FIG. 25 and relation 10 incorporates the rate profile data represented by variables rp, sp(t), and vp(t). Specifically, relation 10 is derived from relation 5 by substituting vp(t) for t*C/T in the k1 term, sp(t) for C/T in the K2 term, and rp for the constant of integration of one (the value of r(t) at t=0).

$$r(t) = rp + \int_0^t ((k1/C*(vp-v)) + (k2*T/C*(sp-s)))dt \qquad \text{(relation 10)}$$

where variables: s(t) is the storage data rate
sp(t) is the profile storage data rate
v(t) storage data volume—the volume of data accumulated on the storage media
vp(t) is the profile storage data volume
r(t) is the data rate modifier, which is the control loop output variable
rp is the rate modifier calculated for the rate profile
b(t) is base data rate, or data rate prior to loop correction such that
ns(t)=r(t) * b(t)
t is time
and constants: C is the fill target
T is the recording fill target interval The enhanced control algorithm shown in FIG. 25 is Identical to the basic control algorithm shown in FIG. 18 with the exception of inputs 384 and 386 appearing in FIG. 18. These inputs have been replaced by sp(t) 364, the profile storage data rate, and vp(t) 366, the profile storage data volume.

The purpose of the enhanced loop is to use rate profiles representing information from prior recording cycles to anticipate data flow patterns in a new recording cycle such that smaller adjustments can be made to the loop response parameter r(t). In other words, the closer the prestored profile matches the new cycle the less action is undertaken by the loop as the new cycle proceeds.

Figure 26:
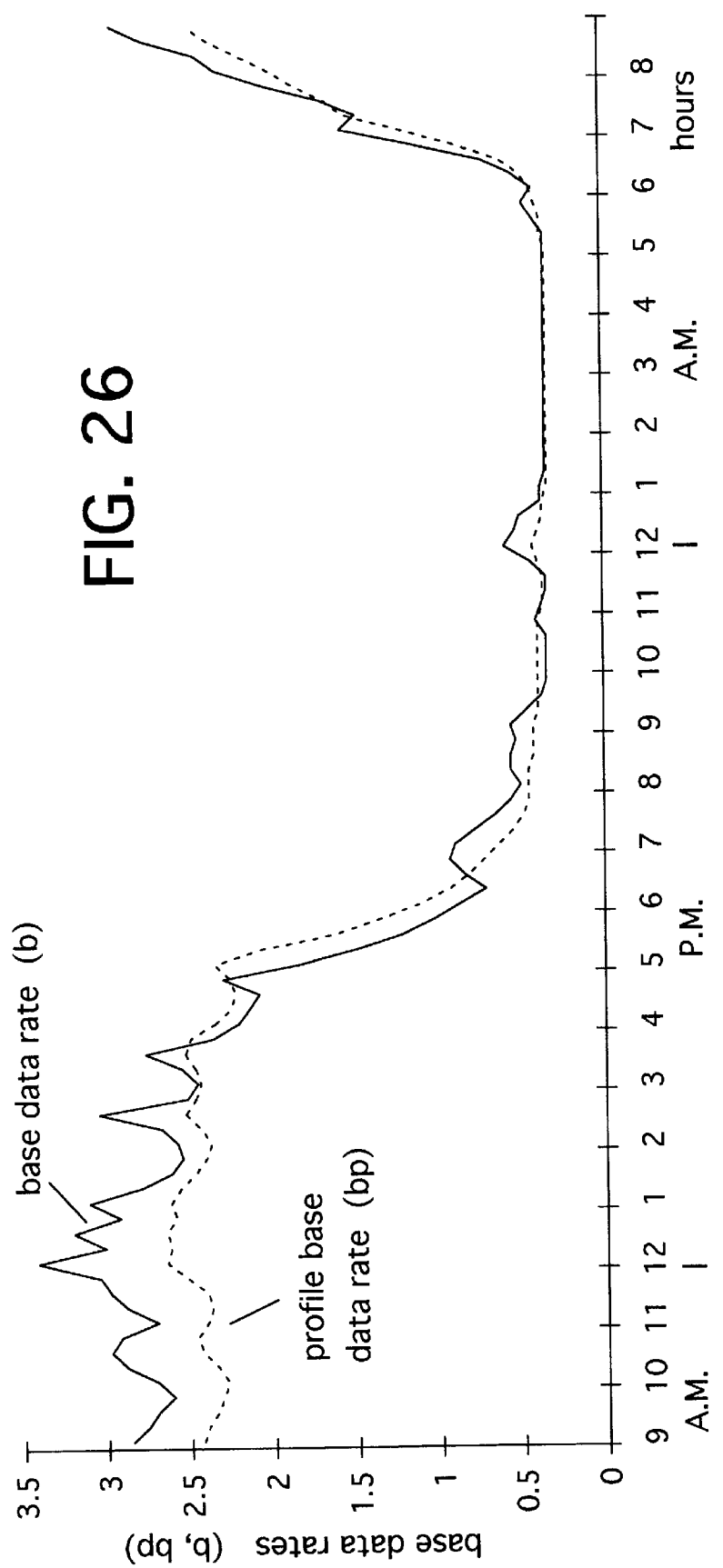
FIG. 26 is a time history example that compares the base data rate for a new recording cycle with a profile rate derived from earlier cycles.
Figure 27:
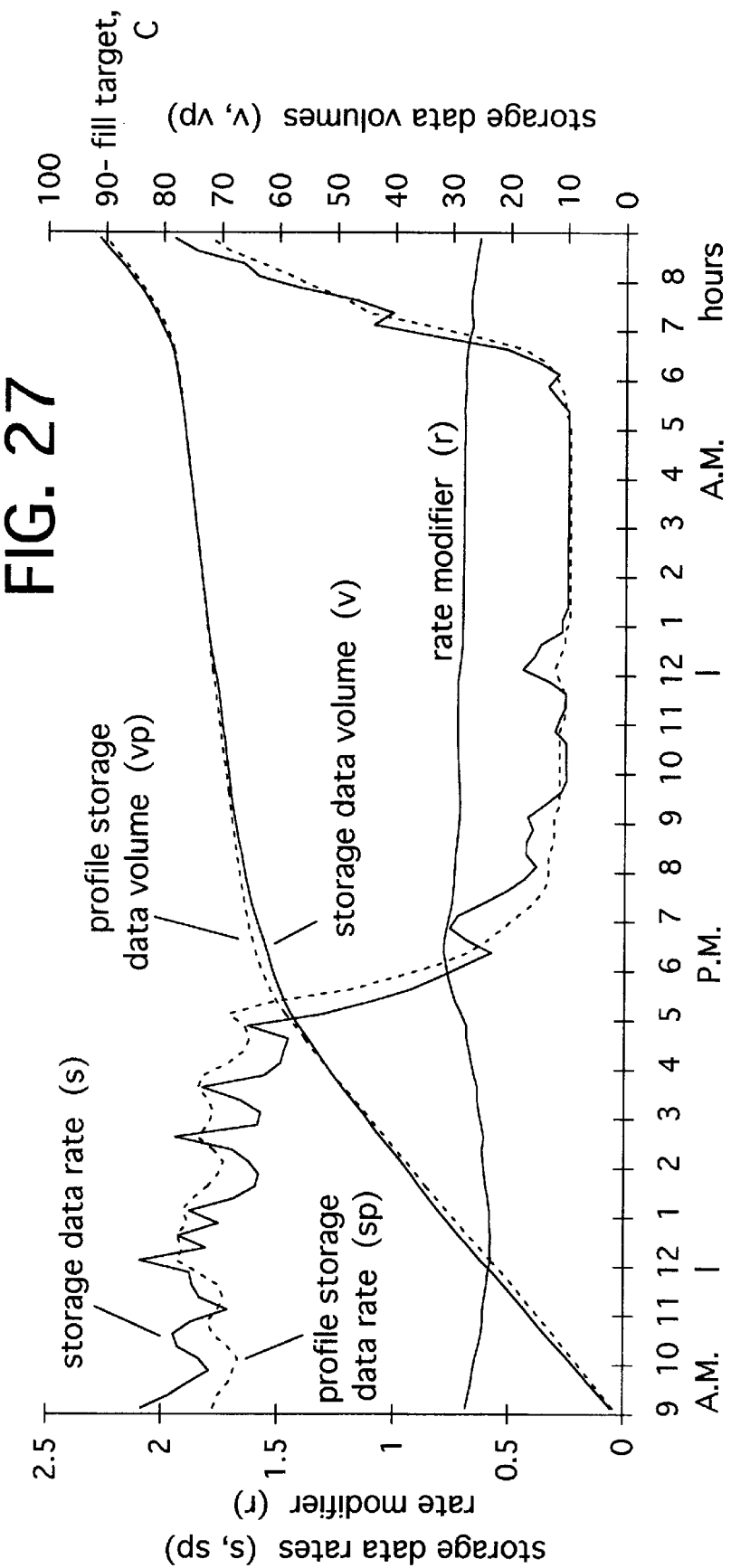
FIG. 27 is a time history example illustrating the response of the enhanced control loop to the base data rate of FIG. 26 while using the profiles of FIGS. 24.

FIGS. 26 and 27 show an example of enhanced loop operation. The base data rate, b(t), that will be encountered in a new recording cycle appears in FIG. 26. Also shown is the profile base data rate, bp(t), which will be engaged as a template for this new recording cycle. This profile base data rate is identical to the one appearing in FIG. 23 and is similar to, but does not exactly match, the base data rate b(t) of the new recording cycle.

FIG. 27 shows how the enhanced control loop adjusts the rate modifier r(t) during the new recording cycle to fill the storage media to the target of 90 units. Curves for profile storage data rate, sp(t), and profile storage data volume, vp(t), are repeated from FIG. 24. Since the new cycle is presumed similar to the profile cycle the value rp determined earlier for the profile cycle is assumed as the best initial setting for the rate modifier r(t). The rate modifier r(t) accordingly begins the interval with a value of 0.702 in FIG. 27.

As the new recording cycle proceeds, the rate modifier r(t) is driven by two error signals. The first error signal is proportional to the difference between actual and profile storage data volume (vp−v). This difference can be inferred from the gap between the curves for vp(t) and v(t) drawn in FIG. 27. The second error signal is proportional to the difference between actual and profile storage data rates, also apparent in FIG. 27. These error signals are scaled as described in relation 10 and applied to the integrator supplying the rate modifier r(t). The benefits of the enhanced loop are apparent from examination of rate modifier r(t) values of FIG. 27. The rate modifier varies only over the range of 0.576 to 0.783 (a range of −18% to +12% compared to the initial value of 0.702) while accommodating a base data rate which varies across a ten-to-one range.

Control for Systems with Overwriting Storage:

Continuously overwriting systems are allowed to overwrite stored data which has been on the storage media for a duration greater than an archive interval. Relations 11 and 12 below express the quantity of data on the storage device. For the case of overwriting storage the archive interval equals the fill target interval. This is so because overwriting data once per archive interval is equivalent to filling the media once per archive interval. Both fill target and archive interval will be represented by the variable T.

$$v(t) = \int_0^t sd\,t; \text{ for } t < T \qquad \text{(relation 11)}$$

$$v(t) = \int_0^t sd\,t - \int_T^t s(t-T)d\,t; \text{ for } t > T \qquad \text{(relation 12)}$$

Relation 11 represents the initial interval, 0<=t<=T, during which the storage device is filling for the first time. The operation of the system during this interval is identical to the single-pass fill cases described earlier. Relation 12 adds the term s(t−T) to express removal of data which is older than the archive interval T. For operation after time T new data is added to the storage device while older data is simultaneously removed (more accurately, space for the older data is deallocated) as described in relation 12. The quantity of stored data ideally reaches and maintains a steady-state value close to full capacity, with some margin maintained as described earlier as a cushion against rate fluctuations.

Basic control loops (those not using rate profiles) for the overwriting storage case are considered next. One control methodology for overwriting storage seeks to maintain a constant quantity of data in the storage media. This tppe of loop is described by relation 13 in which the k1 term compares accumulated storage, v(t), against the fill target constant C, and the K2 term compares incoming data rate s(t) with outgoing rate s(t−T).

$$r(t) = 1 + \int_0^t (k1/C*(C-v) + k2*T/C*(s(t-T) - s(t)))dt; \qquad \text{(relation 13)}$$

for t > T

Such a loop operates on the assumption that if data inflows, s(t), approximately match data outflows, s(t−T), then data accumulated in storage, v(t), will remain at or near the fill target C. A problem with this approach arises however, because patterns of data accumulation in earlier intervals (e.g. t=0 to t=T) tend to affect the data accumulation patterns in the intervals that follow (e.g. t=T to t=2T, etc.). In effect, space available to write new data, which arrives at rate s(t), becomes coupled to the rate, s(t−T), that earlier data is released. If data was accumulated at a non-uniform rate in a previous archive interval, then this constant storage criteria tends to cause some of the non-uniformity to propagate ahead to the current archive interval. Stabilizing the loop can be difficult as well, due to the 'history' effects carried forward by the s(t−n term.

Better results are obtained simply by extending the single-pass loop principles outlined in relation 5 as if storage were infinite and as if data were never removed during the entire interval (t>0). We define this new basic control loop according to relation 14 by substituting the single-pass expression of v(t) appearing in relation 6 into relation 5. This is done to eliminate the data removal term s(t−T) which is otherwise present for the overwriting case of v(t) according to relation 12.

$$r(t) = 1 + \int_0^t \left( \left( k1/C * \left( t * C/T - \int_0^t s\, dt \right) \right) + (k2 * T/C * (C/T - s)) \right) dt;\text{ for } t > 0 \quad \text{(relation 14)}$$

The control loop of relation 14 takes into account only the rate of data entering the storage device s(t) and not the rate s(t−T) at which older data is removed. Long-term stability of this loop is good when k1 and K2 are chosen such that the loop settles within the time interval T (choosing setting constants k1 as 0.15 and K2 as 0.05 provide good settling). Loop stability can be understood intuitively by noting that if the loop settles within the interval T then inclusion of terms describing data removal s(t−7), as were done in relation 13, will only reintroduce transients that have previously settled out. The loop of relation 14 operates on the premise that, if the correct amount of data is introduced into storage during new archive intervals then the effects of off-target data quantities from earlier intervals will disappear as this earlier data is removed.

Figure 28:
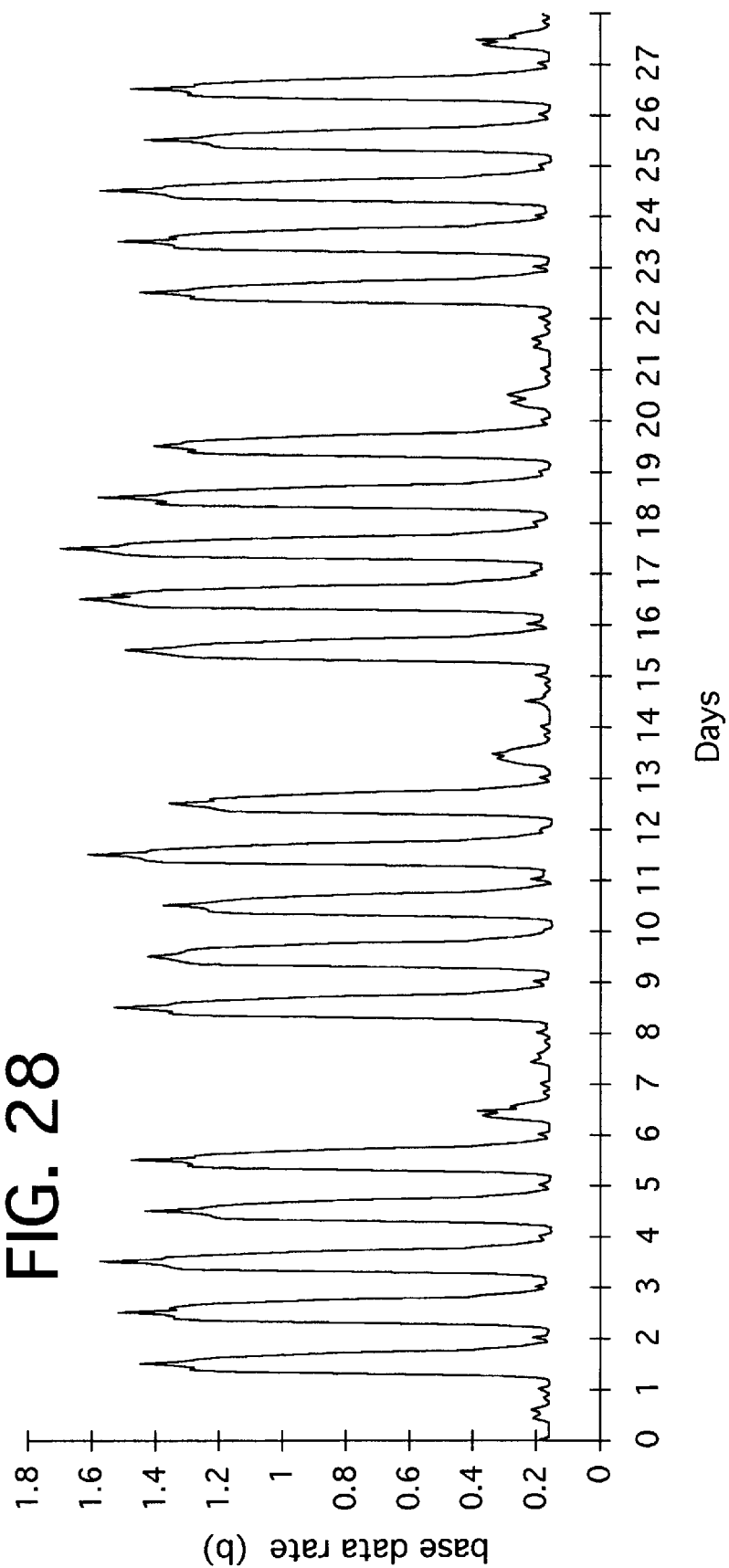
FIG. 28 is a time history of base data rate to be used in the examples of FIG. 29 through FIG. 31.
Figure 29:
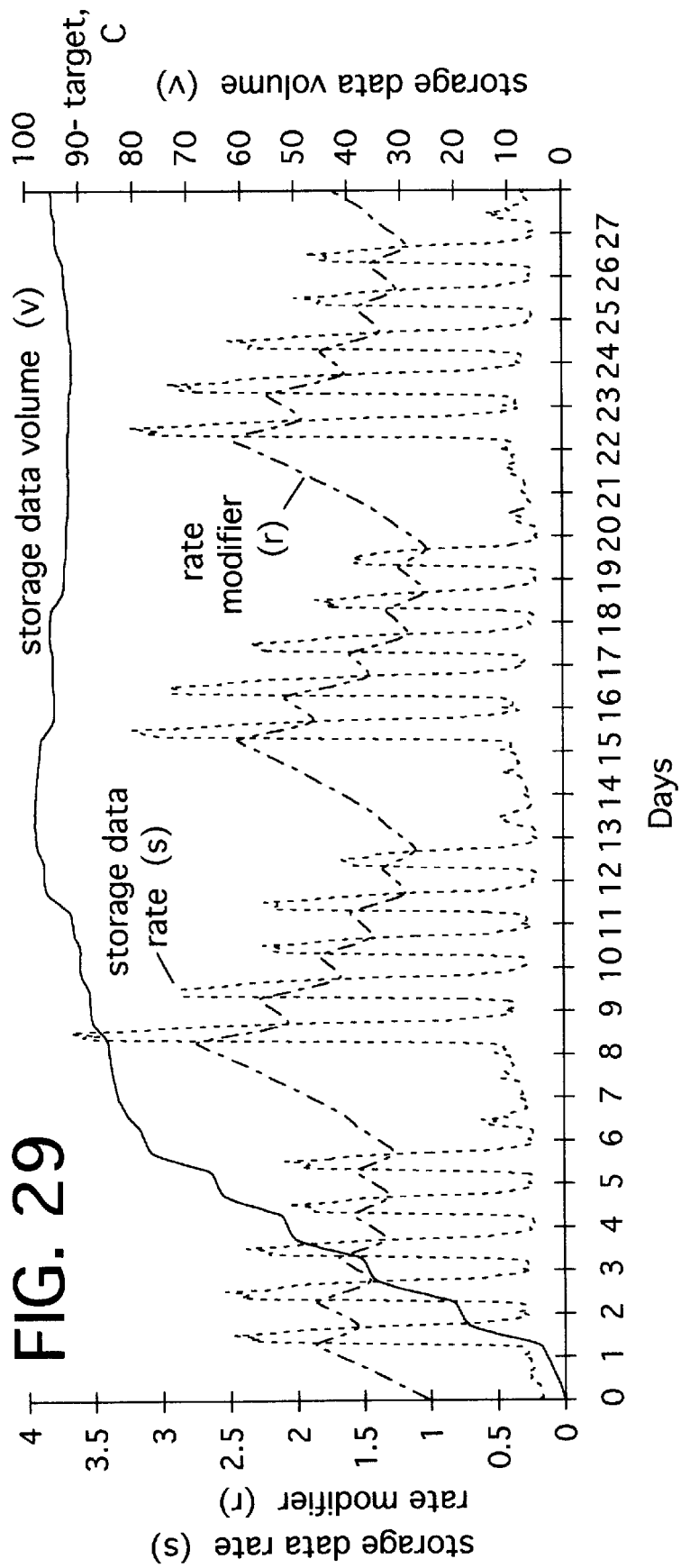
FIG. 29 illustrates the response of the basic control loop for overwriting storage.

FIG. 28 shows a 28-day base data rate, b(t), example that will be used to test the following examples of overwriting control loops. Five peaks per each seven day interval delineate weekday activity similar to the patterns of FIG. 21. FIG. 29 illustrates the effects of implementing the basic control loop of relation 14 using the base rate of FIG. 28 as input. V(t) reaches a maximum deviation from the fill target value, C, of 90 as it crosses 98.5 between days 13 and 14. After that, v(t) settles fairly smoothly toward the target. Rate modifier r(t) fluctuates over a range of 2.75 to 1 as the loop responds to the low data rates in intervals between the end of fifth weekdays and the start of the first weekdays. Beyond day 21 the rate modifier has settled to an average value of 1.68 in response to the fact that the averaged base data rate in FIG. 28 is 0.6 of the value required to fill storage to target in a fill interval (1/0.6≈1.68).

To make variations in the rate modifier smaller during the recording interval we must employ rate profiles and the enhanced control loop. To derive the enhanced loop relation for overwriting storage, we recall that basic loops are a subset of the more general enhanced loop. The enhanced loop of relation 10 was earlier derived from the basic loop of relation 5 by substitution. Similar substitutions can be applied to generalize the basic loop of relation 14 into the enhanced loop of relation 15. Relation 9 is also applied to represent vp(t) as the integral of sp(t).

$$r(t) = rp + \int_0^t \left( \left( k1/C * \int_0^t (sp-s)\, dt \right) + (k2 * T/C * (sp-s)) \right) dt; \quad \text{(relation 15)}$$
$$\text{for } t > 0$$

Figure 30:
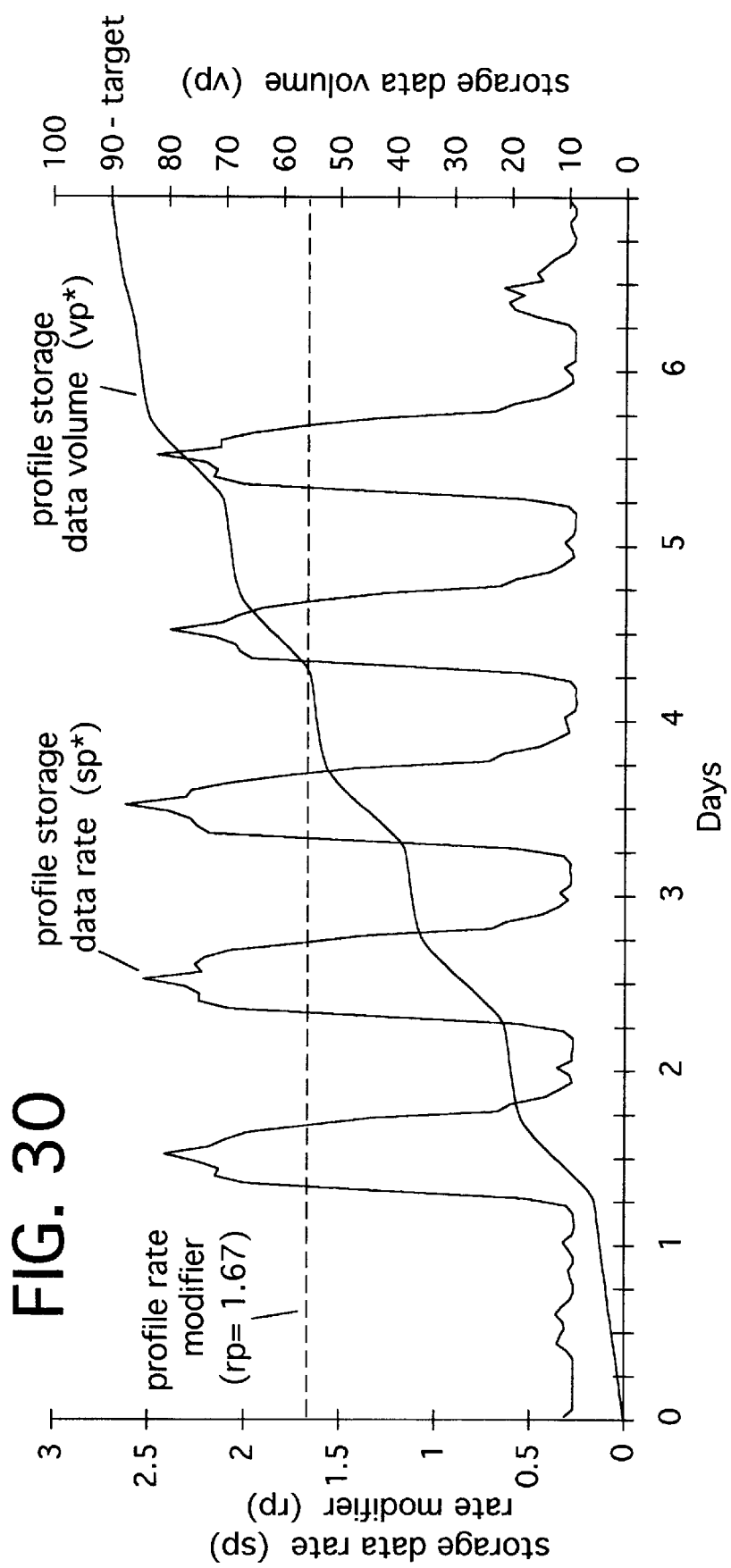
FIG. 30 illustrates the profile rates derived from the first seven days of the data of FIG. 28.
Figure 31:
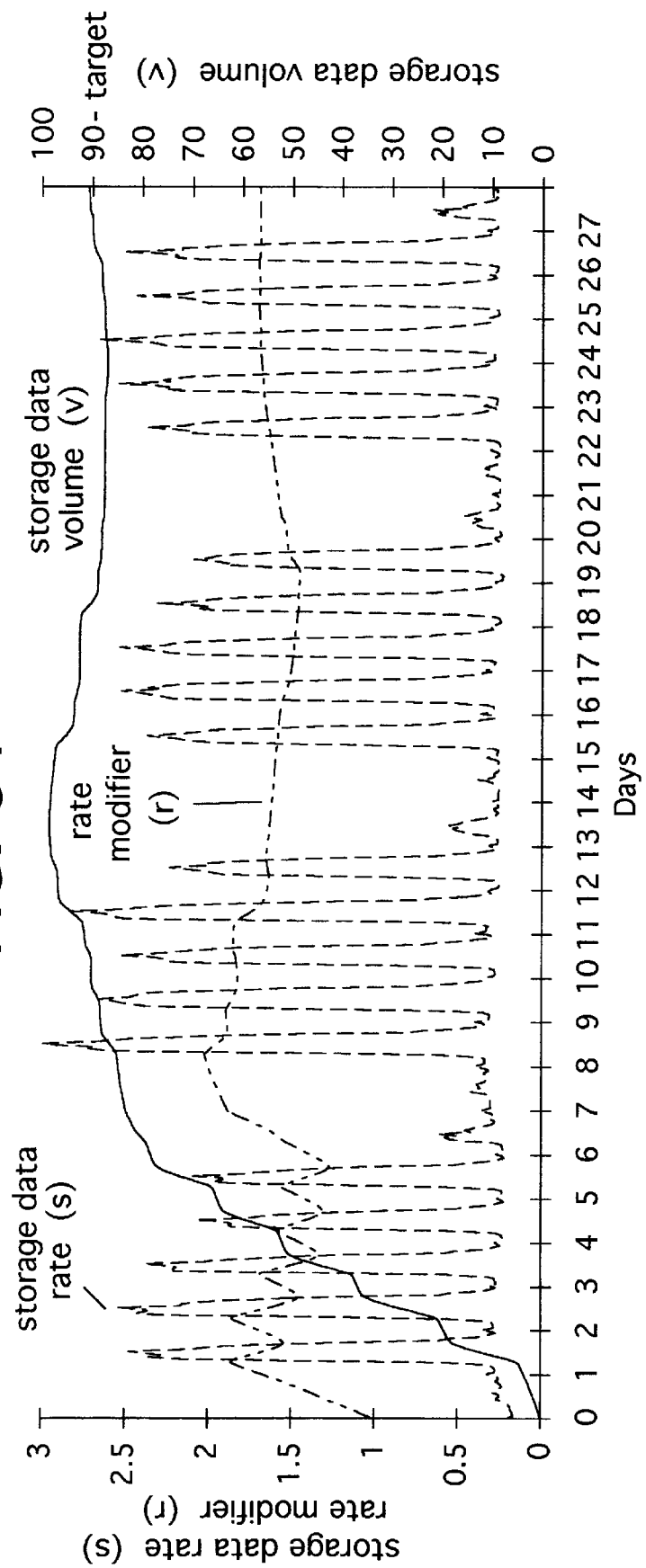
FIG. 31 illustrates the response of a composite basic enhanced control loop for overwriting storage.

A composite basic and enhanced loop for overwriting storage which operates according to relation 15 is illustrated in FIGS. 30 and 31. This 28-day record interval example is designed to show how an instrument, first initialized into a new site of operation without any prior rate profile data, will perform. Rate control during the first seven days will be via the basic control loop. This is done by assigning the constant value C/T in place of the, as yet unavailable, rate profile variable sp(t) in relation 15. Beyond the first seven days of operation. base rate observations taken during the first seven days will be pressed into service as a rate profile.

The base data rate of FIG. 28 is used for this example. FIG. 30 shows the rate profile derived from the first seven days of FIG. 28. This seven day rate profile is labelled as sp*(t). For simplicity of the example we will use this same seven day profile for each of the three week-long intervals—days 7 to 14, days 14 to 21, and days 21 to 28—following the first week of the record interval. Assignment of values for sp(t) are summarized below:

sp(t)=C/T: for 0<t<7
sp(t)=sp*(t−7); for 7<t<14
sp(t)=sp*(t−14); for 14<t<21
sp(t)=sp*(t−21); for 21<t<28

FIG. 31 show the overall results of the loop operation. The first seven days of FIG. 31 are identical to FIG. 29 since basic loop operation is in effect. After the first seven days, fluctuations in the rate modifier diminish as the enhanced loop utilizing the rate profile takes over. Storage data volume, v(t), calculated according to relations 11 and 12 is also included in the figure. Volume begins to level off past the first seven days as expired data begins to be removed at rate s(t−T) according to relation 12. The rate modifier varies only over the range of 1.59 to 1.70 for the last seven days (a range of −5% to +2% compared to the average value of 1.67) while the loop accommodates a base input rate which varies across a ten-to-one range.

It should be pointed out that the preceding examples of overwriting storage are functioning with archive intervals, T, of length equal to the periodicity of the profile data. As stated earlier, profiles are most likely to correlate, or have periodic behavior, across daily or weekly intervals. In the given examples involving one-week archive intervals and one-week data profile periods, the rate that data is stored throughout the current week approximately matches the rate that data, at the same day and time one week earlier, is removed. Thus the quantity of data in storage remains roughly constant. This would be true even were the archive interval a multiple number of weeks—two weeks or four weeks for example—relative to the one-week profile periodicity.

The overwriting storage rate control techniques described earlier can be expanded to include the case where the archive interval is not an integer multiple of the rate profile data period. For example, if a four-day archive interval were used with the base rate shown in FIG. 28 then data in storage, v(t), would tend to peak by the fifth weekday (e.g. day 5) and drop to a minimum by the first weekday after the weekend (e.g. day 8). The key to managing this storage variability in an overwriting control system is to scale the rate modifiers so peak storage will coincide with the storage target, C. The methods of determining profiles in Summary 1 are now generalized to include these cases by replacing relation 7 with relation 16 below. We define Tp as the rate profile period such that:

sp(t)=sp(t+N*Tp); where N is any integer

The profile rate modifier, rp, is set as the minimum value of the expression in brackets in relation 16 under trial evaluation of all values of t in the range of zero to Tp.

$$rp = \text{MIN}\left[C / \left(\int_{t'}^{t'+T} bpd\,t\right)\right]; \text{ for } 0 > t' > Tp \quad \text{(relation 16)}$$

In concluding the discussion of rate control techniques it is pointed out that a number of non-linear techniques can be applied both to improve the performance of the rate control systems and to guard against overflow problems that can arise with extreme data rates when operating either single-pass or overwriting control systems. Some of these techniques are outlined briefly below:

1) Upper limit to rate modifier, r(t), prevents image rate acceleration past the point of usefulness when little or no motion is present.
2) Lower limit to data rate profile, sp(t), such that storage is allocated at some minimum rate even during intervals when little or no motion is predicted.
3) Assign non-linear or progressive rate feedback terms that become active as stored data levels approach storage media capacity. Serves as secondary guard against storage media overfill.

RESOLUTION TECHNIQUES

Unlike conventional videotape recorders, a wide choice of image resolutions can be implemented on compressed image data recorders. Since compressed data rates are not linked to the turning rate of the recording medium, the resolution and resulting data content of images can be varied independently image by image. Image resolution can be chosen as a function of camera views, time of day, in response to internal or externally received triggers, or by any other arbitrary criteria.

One method of managing image resolution is to set resolution according to predetermined criteria to cause images from particular camera views, such as entryways, to be recorded at higher resolution than other camera views. Another method is to alter resolution in response to trigger criteria. A motion detection trigger, either from an external device, or from detection of motion within the image itself, can cause a sequence of images to be collected at higher resolution.

From relations 1, 2, and 3 it is clear that image resolution is one of the factors that can be invoked in achieving the best utilization of available data storage space. For example, if images containing relatively little motion content have been compressed and recorded early in a given interval, then data storage space greater than the current target value may remain. Accordingly, a choice can then be made to retain additional images at higher resolution, either on a non-selective or on a triggered basis.

Figure 32B:
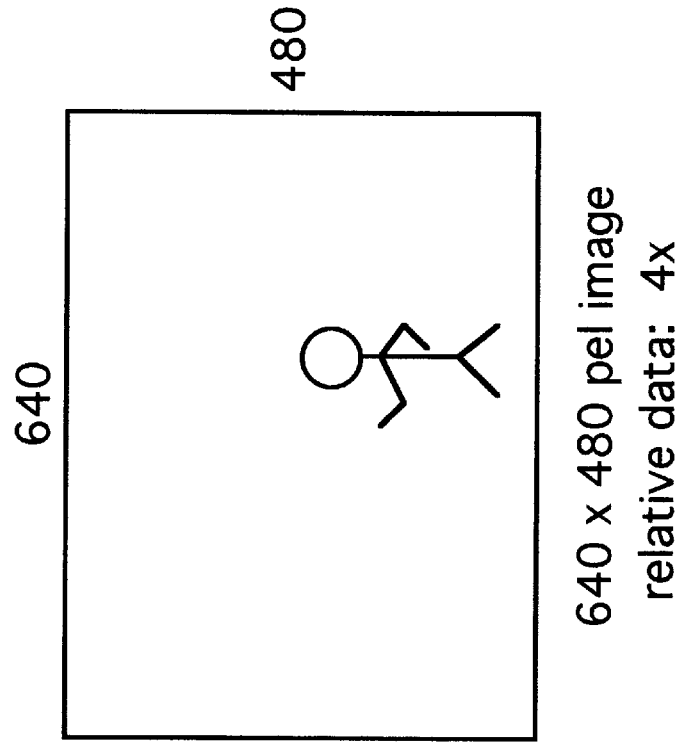
FIG. 32B shows the image of FIG. 32A represented with 640×480 picture elements (pels).
Figure 32A:
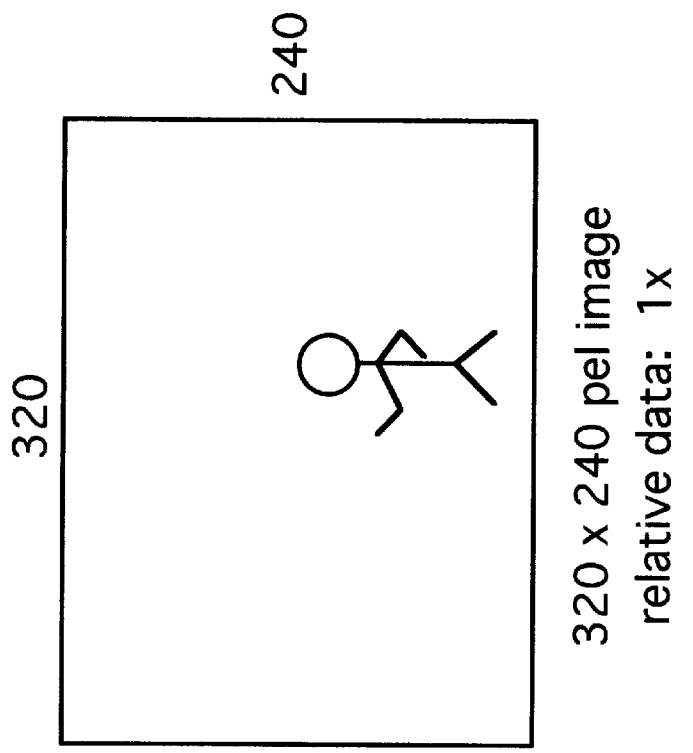
FIG. 32A shows an example of an image represented with 320×240 picture elements (pels).

Selected subsets, or windows, of the input image can also be compressed and saved at high resolution. To demonstrate, we assume an input image can be acquired either at a resolution of if 320×240 picture elements (pels) or 640×480 pels as depicted in FIGS. 32A and 32B. Also assume that image sizes after compression are proportional to the original image array size, e.g. the compressed 640×480 pel image occupies four times as much data storage space as the compressed 320×240 pel image.

Figure 32D:
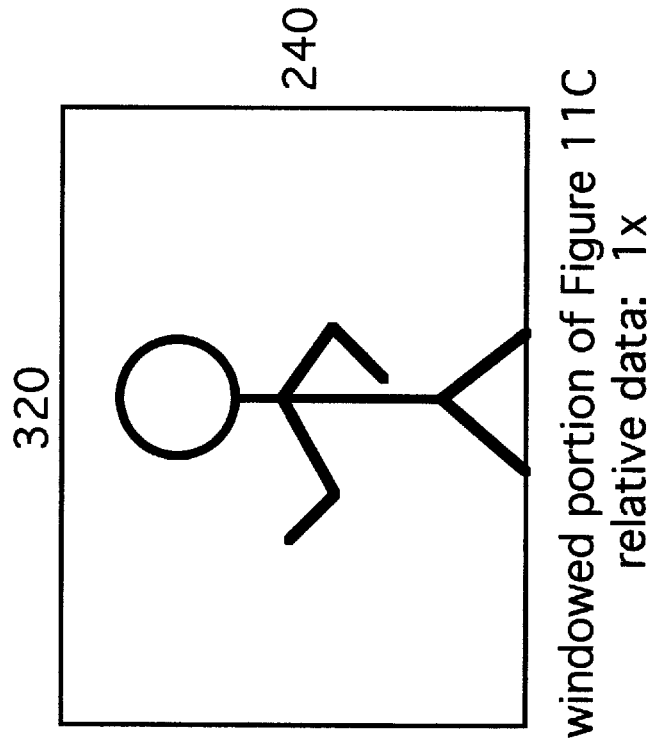
FIG. 32D shows an expansion of the windowed portion of FIG. 32C.
Figure 32C:
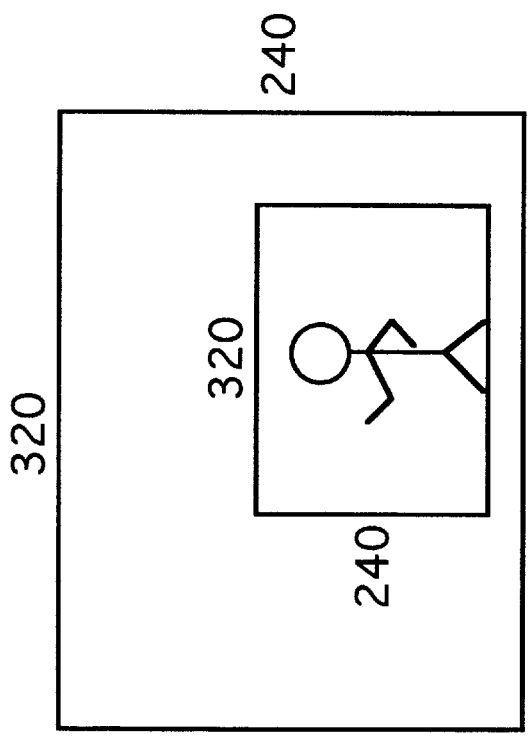
FIG. 32C shows a split-resolution representation of the image of FIG. 32A.

FIG. 32C shows an example in which the complete image is acquired at the lower density of FIG. 32A, while a selected portion—the windowed portion containing the stick figure—is acquired at the higher resolution of FIG. 32B. The resultant can be called a split-resolution image. In this example, the stick figure window occupies ¼ of the image area, and is processed as a sub-image of 320×240 pels (one fourth the number of pels as in FIG. 32B).

A simple technique for compressing and storing a split-resolution image is to carry it as two separate images at two different resolutions. In this case, the two separate images would be those of FIGS. 32A and 32D, where FIG. 32D is the windowed portion of FIG. 32C redrawn to full size. Note that FIG. 32A carries a low-resolution redundancy of the information conveyed in FIG. 32D. This is included so as to maintain the images in a simple rectangular format. This technique requires twice the data of a 320×240 pel image to represent the split-resolution image. but is generally applicable to any image encoding algorithm.

Specific techniques to store portions of a single image at different resolutions may lend themselves to particular image encoding algorithms. DCT encoders such as JPEG operate on 8×8 image blocks that are independent of adjacent blocks. Different pixel densities can be represented by different blocks to build a multi-resolution image. The structure of wavelet image encoding also makes feasible the extraction of sub-images from a larger image array.

As an example of this second technique, we return to FIG. 32C. We still save the window as a high-resolution image, as before. However, the low-resolution image now omits any part of the windowed area. Multi-resolution images such as this example can be represented with less compressed data since the redundancy of carrying the windowed area at low resolution is eliminated. Using this technique, the image of FIG. 32C could be represented with 1.75 times the data of a 320×240 pel image with multi-resolution compression techniques.

One useful example of split-resolution image recording is found in surveillance recording of a doorway or entryway. A high-resolution window can be fixed at the location in the entryway where the head of the person entering normally comes into view. Thus a high-resolution view of the person for identification can be captured along with an overall view of the entry area. Additionally, an image motion detector can be enabled for the windowed area such that an image is captured at the time the person is in the windowed field of view. If the high-resolution window occupies but a small fraction of the image then the split-resolution image requires little more storage space than the standard resolution image.

Moving objects can readily be distinguished in successive images by evaluating the difference between the successive images. A B–A difference image is formed by subtracting pixel values from corresponding locations in two source images, A and B. Zero-valued pixels represent areas in the difference image where the two source images are identical; non-zero pixel values represent areas where the two source images differ.

It should be remembered that, where an object has moved between two successive image views, a B–A difference image will contain both positive and negative image components of the moved object. That is, both the positive of the object as it appeared in image B and the negative of the object as it appeared in image A will be apparent in the B–A difference image (to be exact, any appearance of the 'object' is actually comprised of the pixel difference between the object and the portion of the background image covered or obstructed by the object).

Figure 33B:
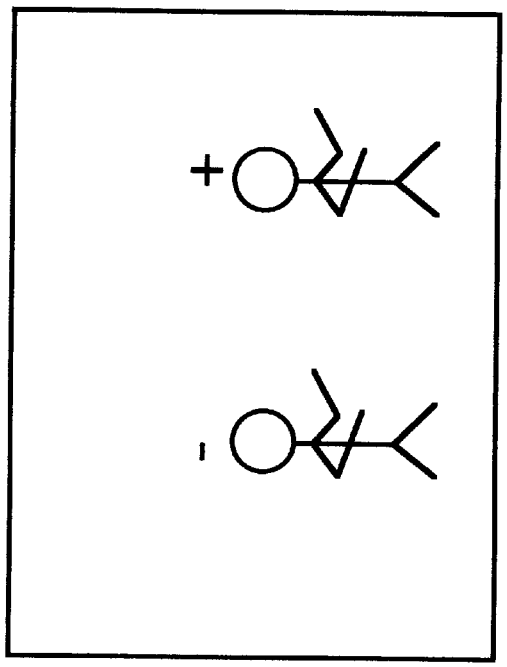
FIG. 33B shows the difference, or delta, of two images where the delay time between images is large.
Figure 33A:
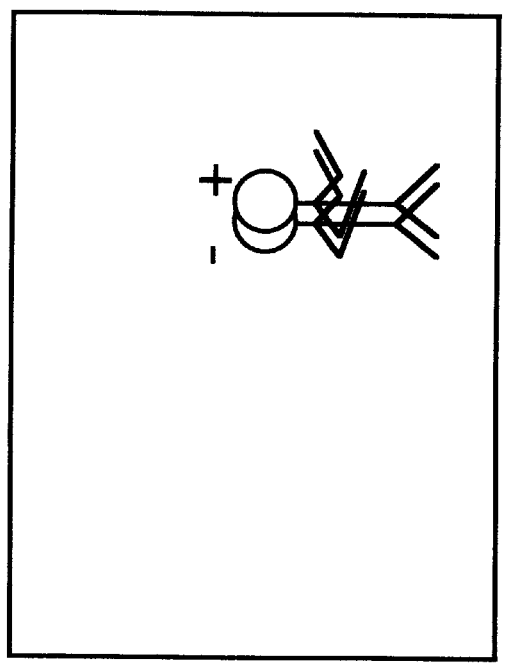
FIG. 33A shows the difference, or delta, of two images where the delay time between images is small.

If the object moves only a few pixels between images, as normally occurs when images of human movement are collected at 30 frames per second, the two difference objects will nearly superimpose as in the illustration of FIG. 33A and little positional accuracy will be lost interpreting both as a single entity. At common surveillance rates of a few images or less per second however, object movement may be great between views. In this case the object will clearly appear twice and separately in the difference image as in the illustration of FIG. 33B. Thus, short of employing elaborate image recognition algorithms, examination of a difference image similar to FIG. 33B will suggest two indistinguishable objects of motion.

One method to correctly isolate a moving object in difference images is to track all objects sequentially from the time they first enter the field of view and, in an iterative manner, track their appearance in difference images as pairs. This is done by noting the new pair member which is assumed positive and discarding the previously appearing pair member which is assumed negative. This method can become confused however when multiple objects are present and overlapping, and when non-object interference such as shadows and lighting changes causes continuity of object tracking to be lost.

Figure 34:
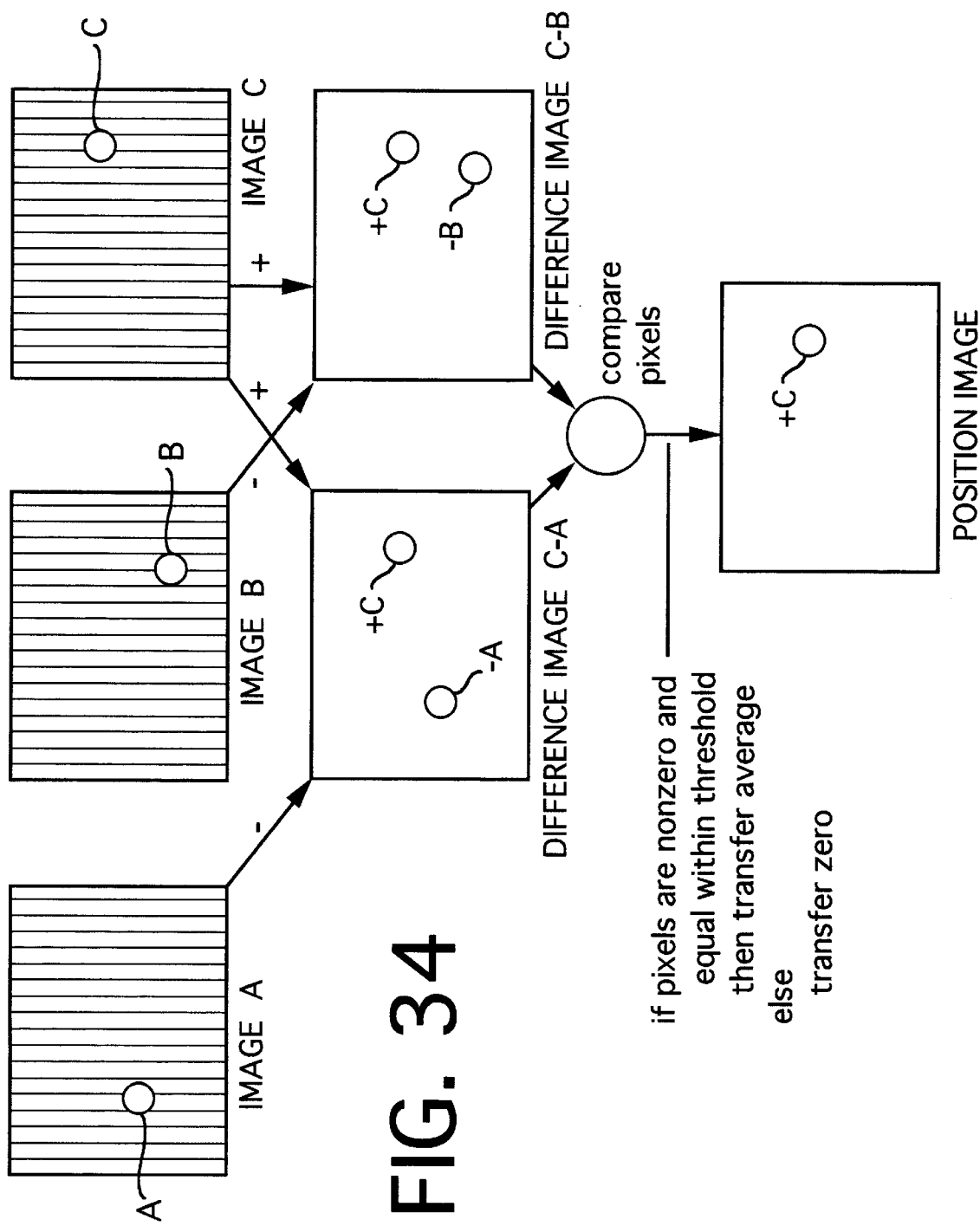
FIG. 34 shows a method for determining the location of a moved object by evaluating three source images.

A preferred method to distinguish moving objects is outlined in FIG. 34. A moving object captured in sequential images A, B, and C is represented by a circle in a different location in each image. The crosshatched areas in images A, B, and C represent fixed background detail in the field of view. This background detail cancels out when difference images C–A and C–B are generated. To identify the location of the moving object in image C a position image is formed from difference images C–A and C–B as follows. Corresponding pixels in the two difference images are first compared. If the pixels are non-zero and match within a preset threshold then the absolute-valued average of the two pixel values is transferred to the new position image. For all other cases a value of zero is transferred to the position image.

In symbolic representation:

if $C-A(x,y) \neq 0$, and $C-B(x,y) \neq 0$, and ABS $[C-A(x,y)-C-B(x,y)] <=$ threshold then $P(x,y) = \frac{1}{2} * $ABS $[C-A(x,y)+C-B(x,y)]$ else $P(x,y) = 0$ where $C-A(x,y)$, $C-B(x,y)$ represent pixel values of difference arrays and $P(x,y)$ represents a value of the position image.

Note that the value of zero is the same value carried for non-object backgrounds in the difference images. Thus, creation of the difference images first cancels out background detail redundant between the original images. Generation of the position image then cancels out non-matching objects between difference images C–A and C–B, causing moving object impressions –A and –B to disappear and allowing moving object impression +C to remain. The location of +C in the position image corresponds to the location of moving object C in original image C.

A bulk recognition algorithm is next applied to the position image created in the preceding steps. Bulk recognition simply isolates and determines the location of groups of non-zero pixels. Criteria must be established as to whether single or multiple objects are to be detected and to the minimum and maximum window sizes. In the case where a single minimum-sized window can enclose a sufficient fraction of non-zero pixels within the position image, the recognition is deemed complete and it remains only to identify the center of the window so determined. If the distribution of non-zero pixels exceeds the minimum window size, then boundaries of a window must be established that contain the aforementioned sufficient fraction of non-zero pixels. Sufficient fraction is a threshold value, e.g. 90% or 95%, used to discard reflections, sharp shadows, or other anomalous effects.

To determine multiple windows for multiple objects the algorithm attempts to isolate groups of non-zero pixels which are surrounded by a perimeter of zero pixels in the position image.

The above methods require relatively little computational power and memory to execute. Difference images are normally available as a byproduct of interframe compression schemes. The difference image C–A may be generated by retaining difference image B–A and summing it with difference image C–B. This saves space over the method of retaining the complete original image A for subtraction from image C since difference images contain many zero values which can be more compactly represented than the original images. For purposes of moving object detection, the difference images can be simplified by setting to zero pixel values that are close to zero. The purpose is to discard slight shadows and lighting shifts while retaining the sharp contrast of the moving object itself.

The image motion detection thus described can be used to direct the positioning of a high-resolution capture window within an input image. In effect, the window can be designed to track moving objects to provide a more detailed image of persons or objects within the scene without drastically increasing the amount of image data to be stored. Useful windows which aid identification of a person within the field of view may typically run from one-fourth to one-thirtieth of the image size. These windows are suited to intraframe compression (no difference frames) since they will likely change location within the image and their content is highly variable. At a typical 20:1 compression of the windowed contents, the windows generate a compressed data flow equivalent to full sized images compressed at rates of 80:1 to 600:1. Thus, the full-time application of tracking windows is practical in terms of the data storage required.

PRE-TRIGGER TECHNIQUES

Digital data recording systems readily lend themselves to techniques for retaining data that arrives in advance of a triggering event. Consider for example a detector responsive to a door opening near an entryway and a camera facing the same entryway. Receipt of a signal from the detector could trigger the recording system to retain camera images that arrived prior to the opening of the door. In the case where camera images are normally captured at standard rates and resolutions, the trigger could cause a set of images to be retained at enhanced rates or resolution. Thus a clearer or more frequent set of images of a person walking toward the door prior to opening the door would later be available to aid in identification. These images are defined as pre-trigger images since they occur prior to the stimulus which causes them to be retained. Collection of enhanced images can continue for some interval after occurrence of the trigger event as well. Such images are defined as post-trigger images. Taken together, pre-trigger and post-trigger images provide a view, in the above example, of the person approaching, opening, and passing beyond the door.

The central method of pre-trigger storage is to routinely retain sets of data representing enhanced image views in a storage buffer. This data is discarded a short time later if no trigger is received. When a trigger does arrive then part or all of the temporary data is transferred to the long-term record as a 'pre-trigger' data sample.

One method to retain pre-trigger images is to encode ('encode' is synonymous with 'compress') all source images at rates and resolutions specified for enhanced image views with a single encoder. The resultant compressed data is stored into a memory buffer as shown in FIG. 35A. A subset of the data in this memory buffer is normally written to mass storage such as to convey images at standard rates and resolution. A larger set of data is passed on to mass storage on receipt of a trigger in order to convey images at enhanced rates and resolution. The storage buffer, which is preferably a solid-state memory, is located ahead of the mass storage device. The constant writing and clearing of data inherent in pre-trigger recording methods is thus carried out on the storage buffer rather than on the mass storage device.

A drawback with the approach of FIG. 35A arises in the use of interframe image compression. A subset of images at lower rates and/or resolution than originally encoded cannot be readily extracted from a set of interframe compressed images. The most reliable method of extracting a reduced set of compressed images from an interframe compressed sequence requires decompressing the sequence beginning at the key, or first frame, and recompressing at the desired rate or resolution.

FIG. 35B shows another arrangement for retaining pre-trigger images. Image encoder #2 and associated mass storage unit comprise a primary recording system without pre-trigger capture capability. Image encoder #1 and the storage buffer comprise a system for separately acquiring sets of data that can later be accessed by the primary recording system.

In FIG. 35B. source images are acquired by image encoder #2 via path 2. Source images are also acquired by image encoder #1 via path 1. Images encoded by encoder #1 are transferred to the storage buffer and normally retained for an interval equal to the pre-trigger recording duration. Contents of the storage buffer can be decoded by an image decoder and transferred to mass storage by way of path 3 and image encoder #2. Path 3 is employed when It is desired to translate from the compressed data format of encoder #1 to the format of encoder #2. For example, were encoder #1 to generate an intraframe compressed format and encoder #2 an interframe compressed format then translation would be readily accomplished by decompressing the intraframe data from the storage buffer and recompressing to interframe format of image encoder #2. Alternately, contents of the storage buffer can be transferred directly to mass storage via path 4 if the compression format is not to be altered.

In the absence of triggers, all data to be retained in mass storage is normally encoded by image encoder #2 via path 2. Enhanced images of the type that will be saved under trigger-initiated conditions are normally encoded by image encoder #1. It may be desired to retain enhanced images that occurred both prior to and subsequent to the trigger, that is, both pre-trigger and post-trigger images. Numerous strategies exist for accomplishing this. For example, post-trigger enhanced images can be encoded by image encoder #1 and these images can be included into the storage buffer along with the pre-trigger images collected earlier. Subsequently, all images in the storage buffer can be transferred to main storage either directly by path 4. or by re-encoding via path 3. Another strategy is to freeze pre-trigger images in the storage buffer when a trigger arrives, and to acquire enhanced images as post-trigger images via image encoder #2. When post-trigger acquisition ceases, the pre-trigger images in the storage buffer can be re-encoded via image encoder #2. This strategy is illustrated in FIG. 36.

Figure 36:
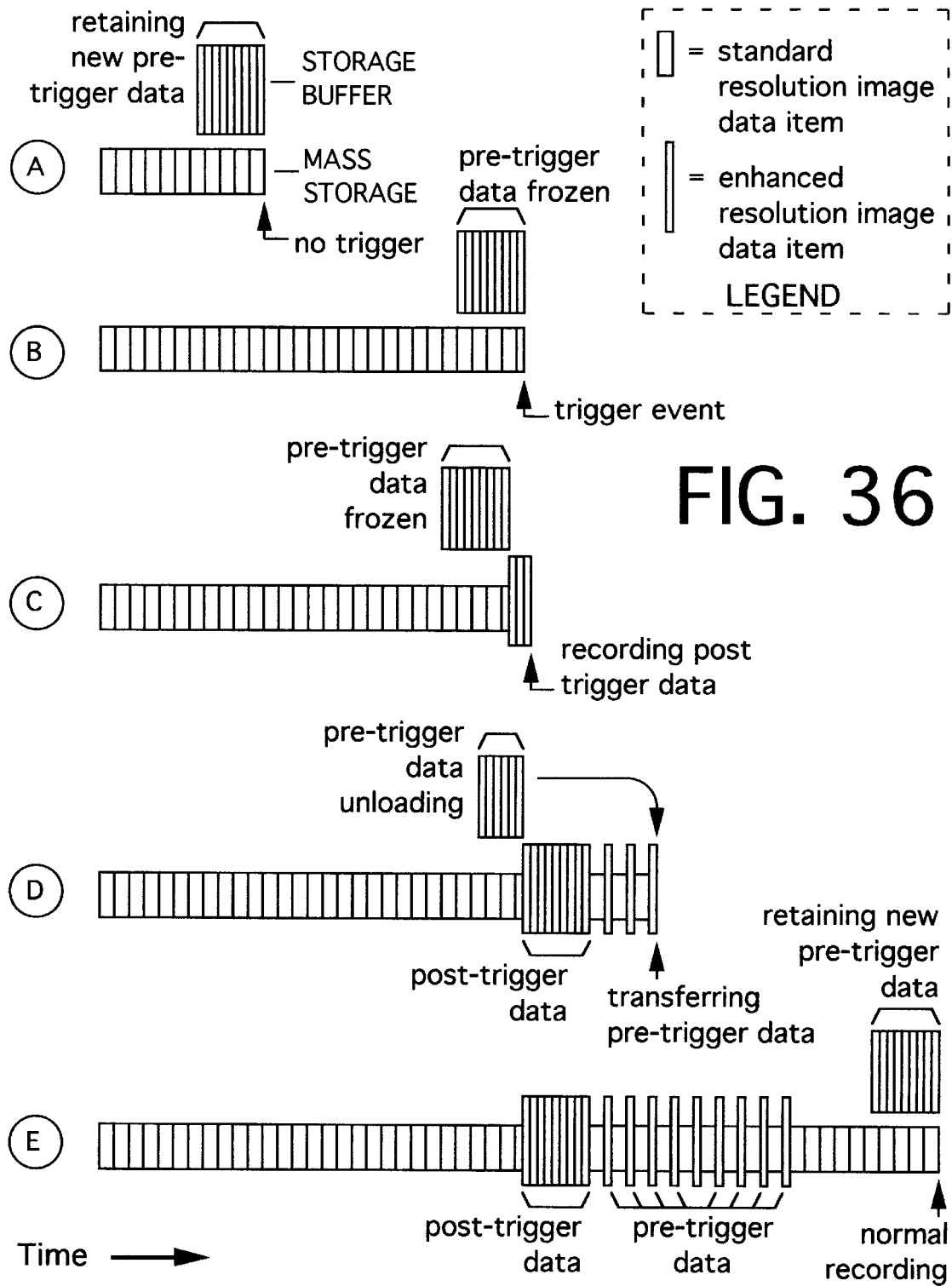
FIG. 36 is an example of data transfer and storage for the pre-trigger and post-trigger recording system of FIG. 35.

In each diagram level A through E of FIG. 36, the representation of the contents of the storage buffer are drawn above the representation of the contents of mass storage. The time scale advances to the right. Standard image data is represented by short horizontally stacked blocks and enhanced data is represented by tall narrow stacked blocks. Level A illustrates the conditions prior to trigger, where standard resolution data is accumulated into mass storage and enhanced resolution data is temporarily retained in the storage buffer. The duration for which the data is retained in the storage buffer is suggested by the horizontal length of the sequence of storage buffer blocks.

Level B depicts the arrival of a trigger event that will initiate the saving of pre-trigger and post-trigger image data. The trigger event causes contents of the storage buffer to be frozen as pre-trigger data; writing and clearing of the storage buffer is suspended. Level C depicts encoding of enhanced images by image encoder #2. These images are transferred into mass storage as post-trigger data.

In Level D, the post-trigger encoding interval has ended. Now the process of re-encoding pre-trigger data contained in the storage buffer begins via the image decoder and image encoder #2 linked by path 3. Encoding of standard image data has resumed as well and so the re-encoding of pre-trigger data and encoding of standard data is done on a time-shared basis by image encoder #2. Blocks of pre-trigger data are unloaded from the storage buffer and re-encoded in the format of encoder #2. Finally, in Level E all pre-trigger data has been transferred to mass storage and image encoder #2 returns fully to the process of encoding standard image data. Image encoder # 1 resumes encoding enhanced image data and the storage buffer refills.

Note that images are placed in mass storage out of time sequence; in particular, pre-trigger data is stored after post-trigger data. This does not represent a problem since each image is stored with a time stamp. When retrieved for viewing, the playback device uses the time stamp to replay the images in correct time-of-occurrence sequence.

In one implementation of the dual encoder system of FIG. 35B, image encoder #1 is an intraframe encoder, such as JPEG, and image encoder #2 is an interframe encoder using key frames and difference frames.

In another implementation of the dual encoder system of FIG. 35B image encoder #1 compresses a high-resolution window, or subset; of the source image and image encoder #2 compresses the full image at standard resolution. Data from image encoder #1 is transferred to mass storage only under conditions of a trigger event. The object of this implementation is the selective, pre-trigger and post-trigger recording of a high-resolution window of the input image.

RAMIFICATIONS

There exist a wide variety of fixed-media and removable-media storage devices that can be employed in implementing this invention. Others will undoubtedly be developed in the future. From a technical standpoint, the main criterion is that the storage device be capable of storing and reproducing a significant quantity of digital data. Present-day removable-media storage devices that satisfy this criterion include: digital magnetic tape drives, floppy disk drives, and re-writable optical disk drives. The primary fixed-media candidate for long-term storage is the magnetic hard disk drive; integrated-circuit memories are feasible for short-term storage or buffering.

Systems with combinations of storage devices having different features can be designed to optimize the performance for various applications. These features can be exploited both in the recording and archiving of data and in the retrieving and playing back of data. Some of these embodiments are described below.

Figure 1:
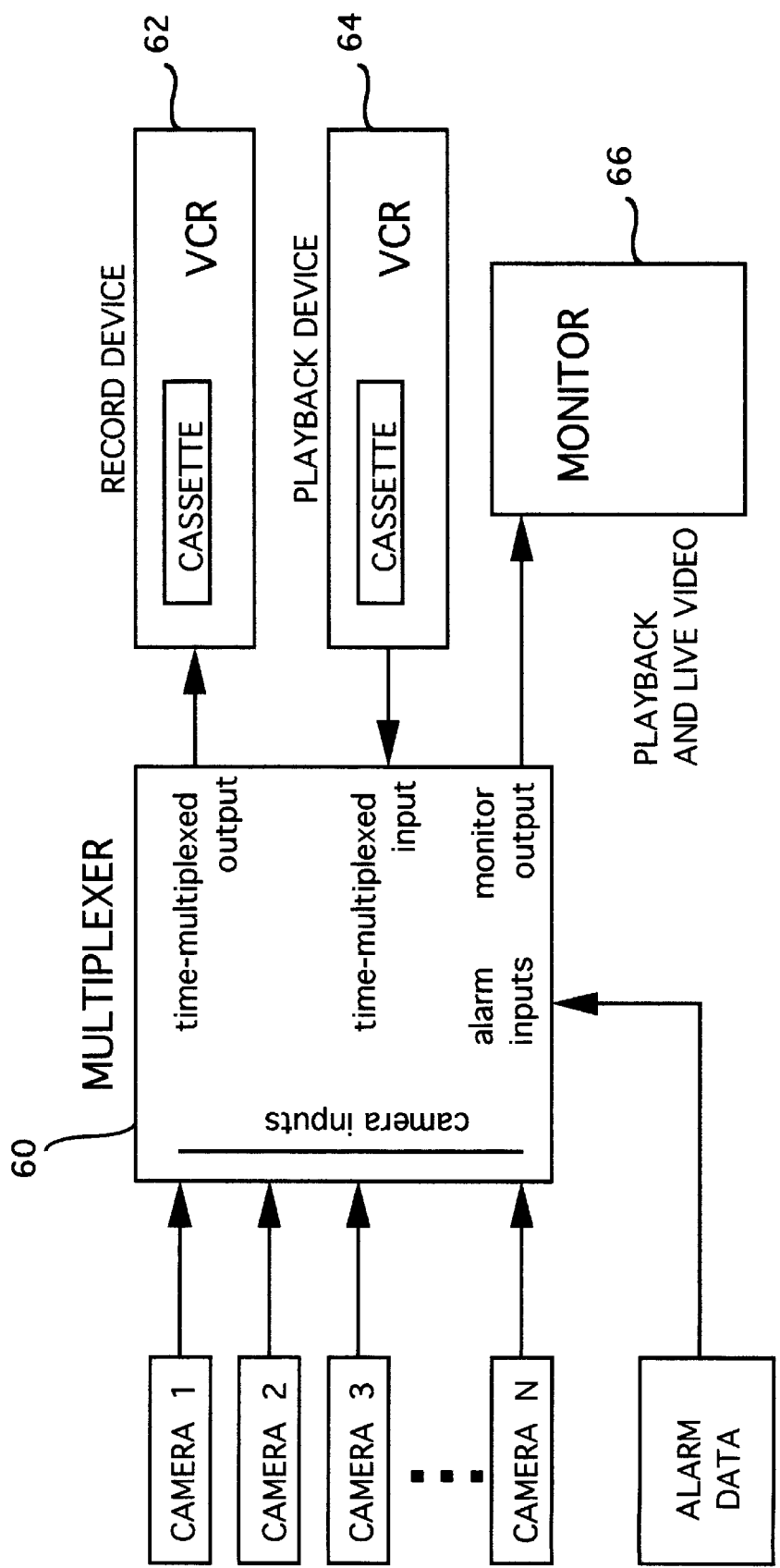
FIG. 1 is a block diagram of a prior-art multi-camera recording and playback application.
Figure 2:
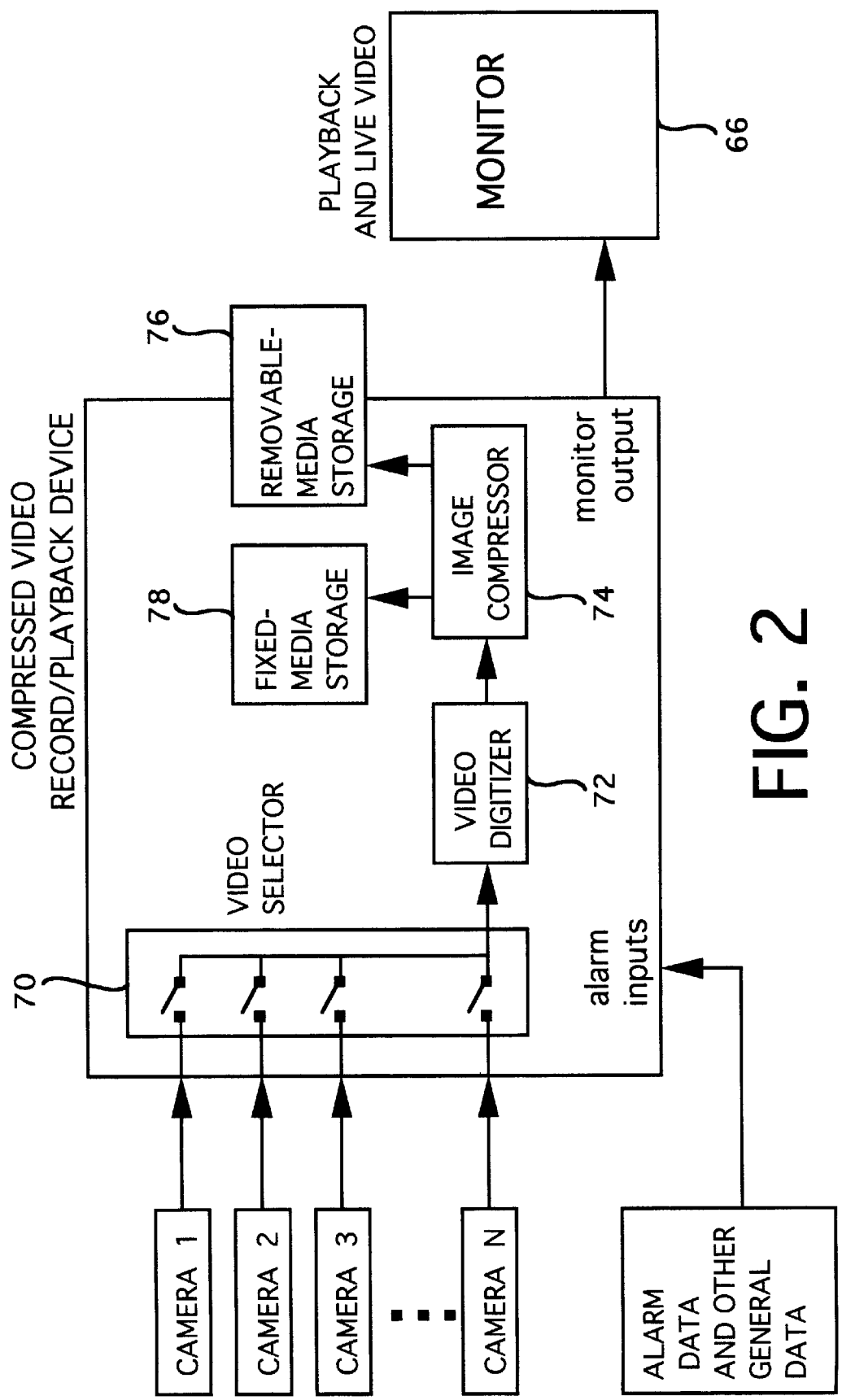
FIG. 2 is a block diagram of a general multi-camera application using the Invention.
Figure 3A:
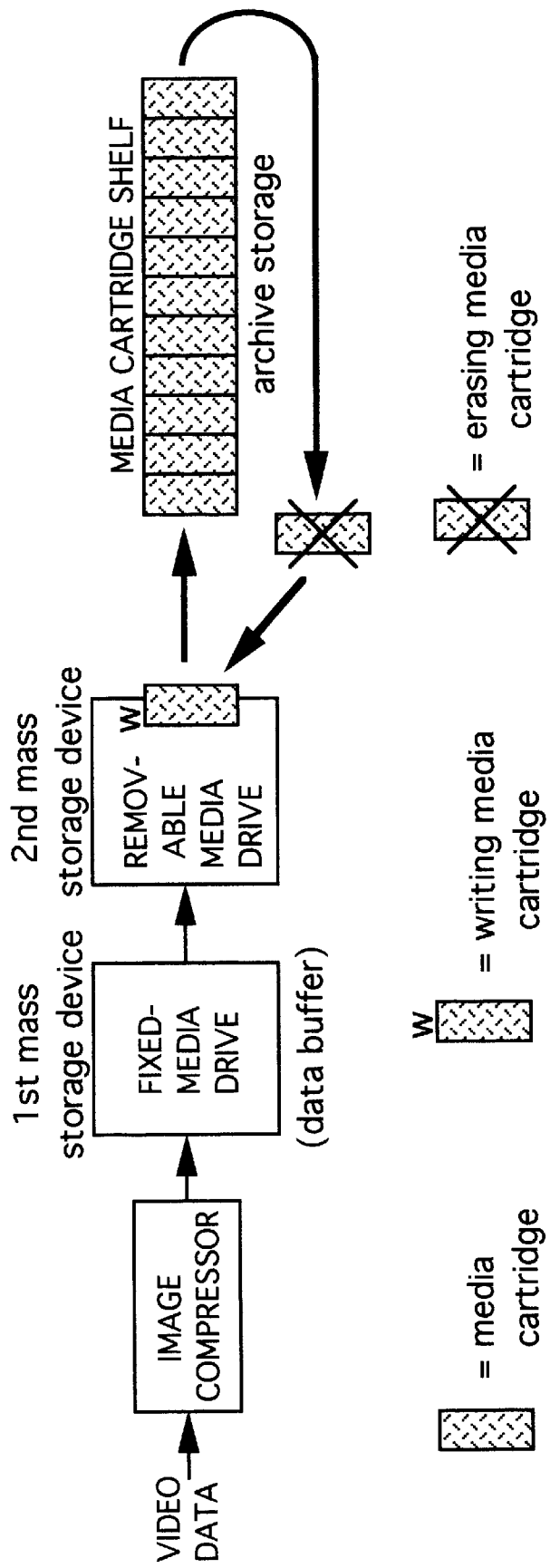
FIG. 3A shows the data archive cycle for a conceptual removable-media recording application.

A first embodiment of this invention uses a removable-media drive as the primary storage device. Digital tape drives are a preferred primary storage device, though re-writable optical disk drives, floppy disk drives, and other removable-media drives can be employed as well. The invention fills media cartridges at a user settable rate (e.g. once every 24 hours). The operator can maintain an archive of data by rotating media cartridges through a shelf storage for the duration of the archive interval. This method, shown in FIG. 3A, is practiced in conventional VCR surveillance installations. However, this invention provides the advantage of storing much more usable data in less physical space.

A disk drive in this first embodiment serves as a data buffer ahead of the removable-media drive. This buffer allows the primary storage media to be removed for exchanging without loss of data. The buffer also allows writing the removable-media drive at rates that optimize life and reliability of the drive. Digital tapes have a significant advantage over VCRs in that the digital tape can generally write data much faster than the compressed images are generated. Thus, with buffering, the digital tape need be moving only infrequently, and the drive can spend large fractions of time with rotating head and transport mechanisms idle.

Figure 3B:
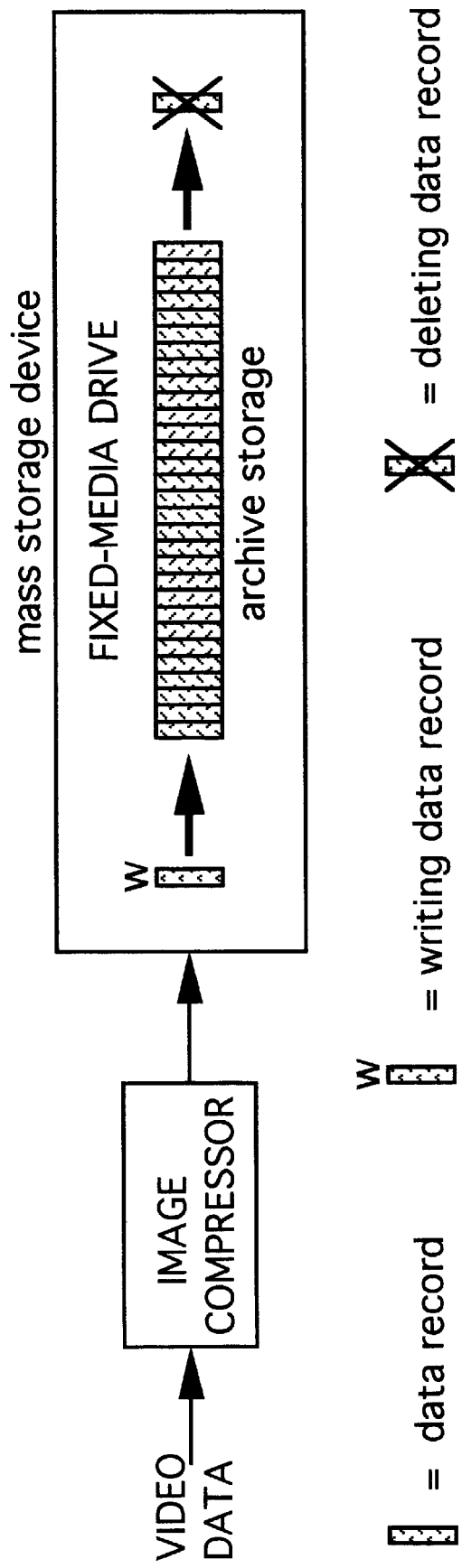
FIG. 3B shows the data archive cycle for a conceptual fixed-media recording application.

A second embodiment of this invention utilizes a fixed-media drive, such as a magnetic hard-disk drive, as the primary storage device. Compressed images are retained on disk up to the limit of a user-determined archive interval (e.g. 1 week), after which they are overwritten with new images. This method, shown in FIG. 3B, enables a system to record indefinitely without operator intervention, yet always have images from within the archive time interval available for playback. It is therefore useful for long-term unattended recording in sites without dedicated surveillance systems personnel.

Figure 37:
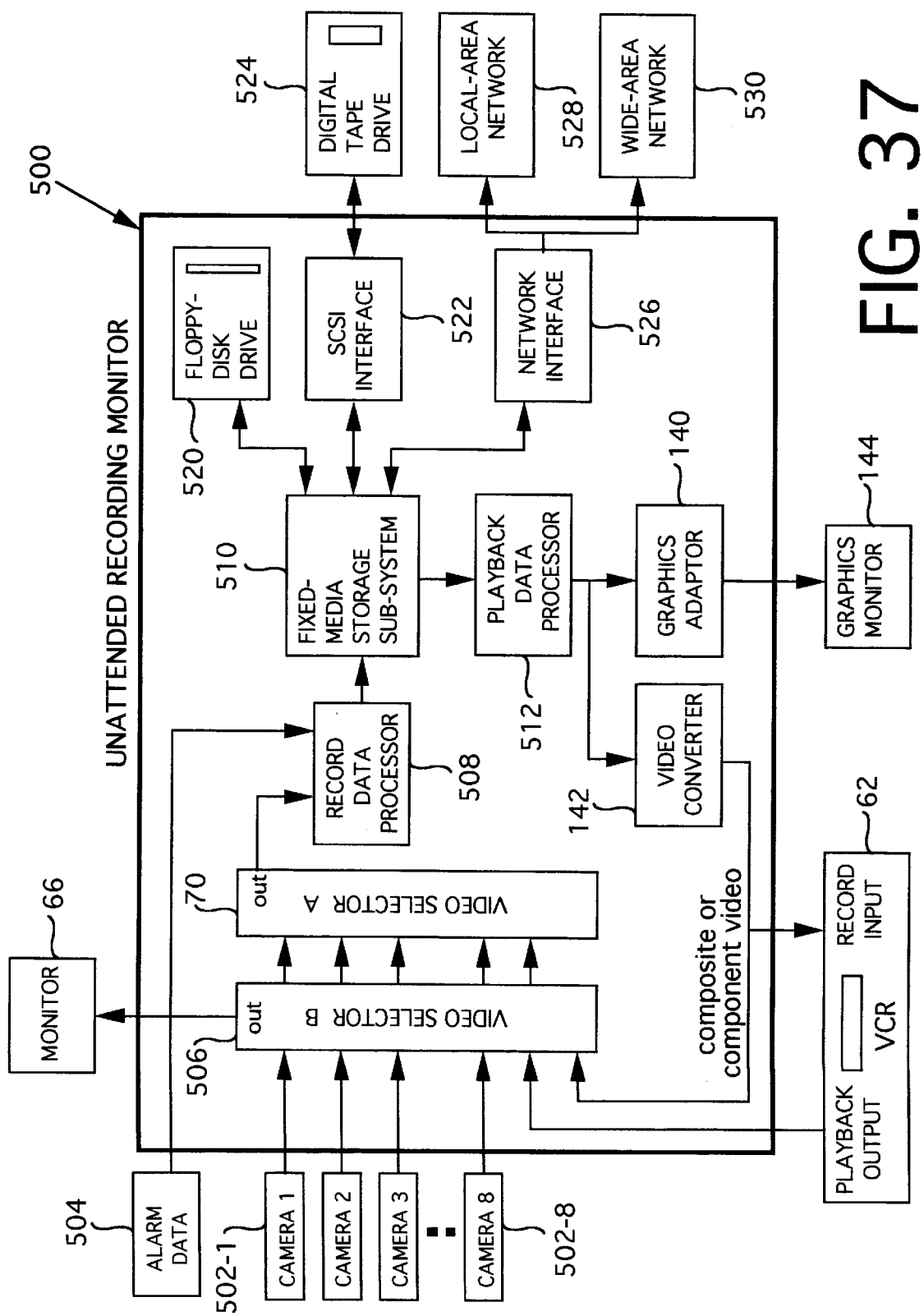
FIG. 37 shows an applications example of a fixed-media record/playback device, named an 'unattended recording monitor'.

FIG. 37 illustrates one possible application of a record/playback device according to the fixed-media embodiment of the invention. This record/playback device will be referred to as an Unattended Recording Monitor 500. Record and playback functions for the unattended recording monitor are represented in simplified form in FIG. 37. These functions have been described in detail elsewhere in this specification.

Referring to FIG. 37, video signals from camera 1 502-1 through camera 8 502-8 couple to video selector A 70 and video selector B 506. The output of video selector A is coupled to a record data processor 508, which includes the functions of video digitizer, image compressor, file manager, and rate control. The record data processor also accepts alarm data 504 from external sources. Data from the record data processor is delivered to a fixed-media storage subsystem 510 for storage. Data replacement processes described elsewhere in this specification remove data older than the archive interval to make room for newer data.

Data for playback is received from the fixed-media storage subsystem by a playback data processor 512. The playback data processor includes decompression and playback time-stepping functions as described elsewhere in this specification. The output of the playback data processor couples to a video converter 142 and to a graphics adaptor 140. The video converter generates a composite or component video (e.g. NTSC or S-Video) output. The graphics adaptor drives a graphics monitor 144. Output of the video converter can be routed through video selector B for viewing on monitor 66.

In normal operation of the unattended recording monitor all video and alarm data is recorded onto a fixed-media storage device contained in the fixed-media storage subsystem 510. Unlike cartridge media, the media in the storage sub-system cannot be removed and set aside when important data is to be preserved. Several means are provided therefore for off loading data of particular interest from the unattended recording monitor to other storage devices and to communications channels. Conversely, data can be on loaded from these same storage devices and communications channels to the unattended recording monitor.

One form of a removable-media drive for off load storage is a floppy disk drive for reading and writing magnetic floppy disks. The floppy disk drive 520 connects to the fixed-media storage sub-system. Floppy disks are intended for transferring small portions of compressed digital data in and out of the unattended recording monitor. In most surveillance work an event of interest can be represented with just a handful of images from a single camera view. If, for example, a five-gigabyte fixed-media drive is used to archive one week's worth of data from eight cameras, then a one-megabyte floppy disk can hold the equivalent of 16 minutes of such video data from a single camera. This is adequate to contain most events of interest. Data can be offloaded to floppy disks as a selective archive. Or data can be on loaded from floppy disks to the fixed-media storage sub-system for eventual playback review.

Another form of removable-media drive for off load/onload storage is the digital tape drive for reading and writing digital magnetic tape cartridges. In the implementation of FIG. 37, a SCSI interface 522 connects to the fixed-media storage sub-system. The digital tape drive 524 connects to this SCSI interface. Given the capacity of typical digital tape drives, it becomes practical to off load the entire contents of the fixed-storage media onto one or more digital tapes.

A third form of removable-media off load storage is offered by a conventional analog VCR. The output of video converter 142 connects to the record input of a VCR 62. The playback output of this VCR connects to inputs of video selector A and video selector B. The unattended recording monitor generates data for recording onto the VCR in one of two playback modes. In the first playback mode, images originating from a single video source are reproduced to match the rate at which they were first recorded. Repeat images may be inserted between active image updates in the video output stream in order to maintain a correct time-of-occurrence in the playback progression. This first playback mode would be used to view images on monitor 66 or to record onto a VCR tape for later direct viewing.

A second playback mode generates data in a special compact format. The purpose of this compact format is to transfer data to and from the VCR more rapidly than could be done under the first playback mode. Data recorded onto a VCR tape in compact format may not be directly viewable on a playback monitor.

A number of compact formats are possible. One compact format removes all repeat frames from the video output stream. Repeat frames were used in the first playback mode to fill the time gaps between the originally recorded active image steps. Images originating from multiple video sources can be interleaved using this format. Machine-readable codes are then inserted into the recorded video stream to later identify the video source associated with each image.

A second compact format codes the compressed digital image data onto the analog video signal. This video signal can then be recorded onto and played back from a VCR. In this way, the VCR serves as a digital offload/onload device for compressed video image data. The second compact format offers the twin advantages of digital coding, which prevents loss of image fidelity through VCR record and playback, and image compression, which permit a greater number of images to be stored per tape.

Compressed digital data is off loaded to a VCR by the following steps: Compressed data from the fixed-media storage sub-system 510 is first transferred to the playback data processor 512. The playback data processor codes this data in a format suitable for impression onto an analog video signal. The coded data is transferred to the video converter 142 which converts the coded data to an analog video form suitable for recording onto a VCR. This coded analog data is applied to the record input of VCR 62.

Compressed digital data is on loaded from a VCR by the following steps: Coded analog video from the playback output of the VCR couples to video selector A 70. Video selector A routes this analog video to record data processor 508 which digitizes the video and decodes the compact format. The decoded data is transferred from the record data processor to the fixed-media storage sub-system.

Off loading data to a VCR is a useful technique since one videotape cartridge can hold a greater number of images than one floppy disk. In addition, VCRs are widely available in surveillance installations and in homes as consumer devices. The VCR thus serves as a means of archival or backup storage for the unattended recording monitor.

In addition to off load/on load storage devices, data can be off loaded to or on loaded from data networks such as local-area networks (LAN) or wide-area networks (WAN). A network interface 526 connects to the fixed-media storage sub-system. The network interface connects to either a local-area network 528 or a wide-area network 530. Examples of local-area networks include Ethernet, Token-Ring and ATM (asynchronous-transfer mode). Examples of wide-area networks include telephone, ISDN, and internet.

Network connections can be used to remotely poll the unattended recording monitor for alarm and other events. Specific image data can then be downloaded by way of the network. Alternately, the unattended recording monitor can be programmed to alert devices on the network in response to certain event criteria. These include loss of a camera signal, or alarm and building entry violations. Thirdly, the unattended recording monitor can be reprogrammed or re-configured by authorized devices on the network.

Digital Implications:

Video cameras that output data directly in digital form are expected to proliferate. These cameras may transmit their data in either a parallel or serial format. Serial formats lend themselves to transmission over a fiber optic link. The recording device embodied in the invention can be configured to receive serial data via fiber optic inputs.

Figure 38:
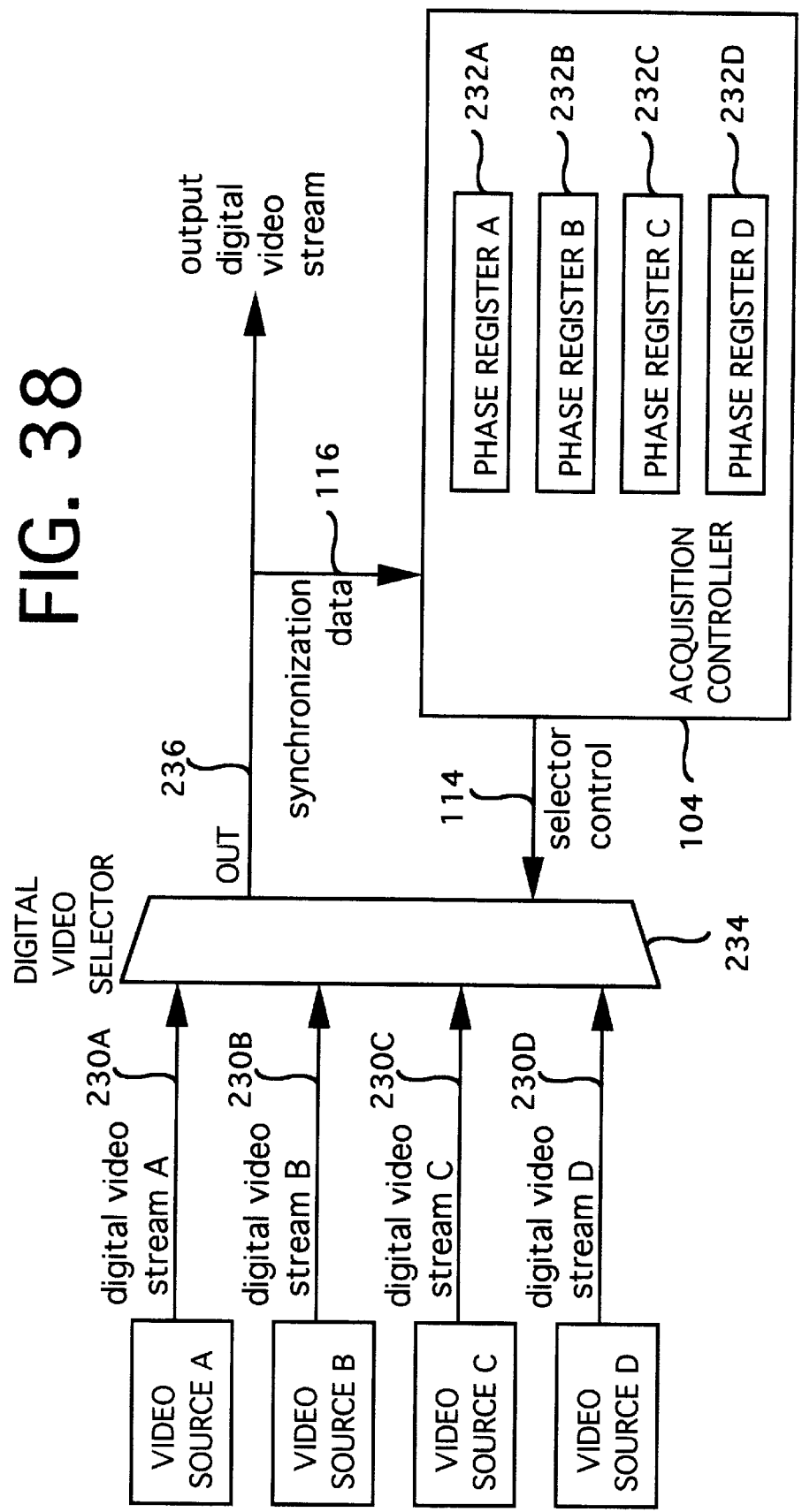
FIG. 38 is a detail block diagram for source selection of asynchronous digital video inputs.

FIG. 38 shows a portion of the record function for acquiring digital video inputs from multiple asynchronous sources. This figure parallels the techniques for acquiring analog video described in connection with FIG. 8. In FIG. 38 digital video streams 230A–D from video sources A through D connect to digital selector 234. The digital selector couples one of the video streams 230A–D to output 236 under influence of selector control 114. The selector output carries an output digital video stream containing images from the selected sources. Synchronization data 116 derived from the output digital video stream is received by acquisition controller 104.

Acquisition of digital video by the system of FIG. 38 is similar to that described in connection with FIG. 8 and FIGS. 9A, 9B, and 9C. The acquisition controller causes the selector to remain connected to one video stream until digital data representing at least one whole field or frame has passed to the selector output. In this manner, video fields or frames can be switched at minimum rates of one-half the source stream rate. If the additional constraint of ordering the selection of streams according to the relative phases of the streams is applied then the field or frame switching rate increases to N/N+1 of the source rate. where N is the number of video sources. Phase registers 232A–D track the phase of video sources as described earlier in connection with FIG. 8 and FIG. 9C.

Although the present invention has been described using particular illustrative embodiments, it will be understood that many variations in construction, arrangement and use are possible within the scope of the invention. The present invention is thus to be considered as including all possible modifications and variations encompassed within the scope of the appended claims.

What is claimed:

1. A method of recording video images, the method comprising:

providing a stream of video images, the images having an associated two-dimensional frame bounding the corresponding visible extent of the images, the frame being selectively and dynamically divisible into a plurality of two-dimensional frame portions that collectively comprise the frame, each portion having attributes including image resolution;

for at least a first and second number of the video images, digitally storing information corresponding to each frame portion at a selected one of a plurality of image resolutions, the plurality of image resolutions including a first and second image resolution;

for the first number of the video images, establishing the stored image resolution of the frame at a single resolution of the plurality of image resolutions;

monitoring for a predefined trigger event;

defining at least a first and second of the frame portions within the video images; and for the second number of the video images and subsequent to the trigger event and the defining step, establishing the stored image resolution of the first frame portion at the first image resolution while simultaneously establishing the stored image resolution of the second frame portion at the second image resolution, such that each of at least some of the digitally stored video images have associated multiple coincident image resolutions corresponding to multiple frame portions.

2. The method of claim 1, wherein said predefined trigger event is a dynamic response to a detected object, the response being derived by signal processing of the information corresponding to the visible frame of the video images.

3. The method of claim 1, wherein said stream of video images is a timelapse sequence of independent digital images.

4. The method of claim 3, wherein said predefined trigger event corresponds to a change in the state of a sensor.

5. The method of claim 3, wherein said timelapse sequence has a rate of two images per second or less.

6. The method of claim 1, wherein said predefined trigger event corresponds to a change in the state of a sensor.

7. A method of recording video images, said method comprising:

providing a first stream of video images having information from only a single video source, said video images having attributes including image resolution, said image resolution attribute having a plurality of valid values;

defining a plurality of portions that collectively comprise the two-dimensional scanning region of each image a first number of the video images of the first stream, the plurality of portions including a first group and a second group, each group having at least one portion of the plurality of portions; and for each of the first number of images, storing each first group portion of the image with the image resolution equal to a first resolution value and storing each second group portion of the same image with the image resolution equal to a second resolution that is enhanced compared to the first resolution value, and wherein the stored first and second group portions of the image are from the same stream of video images.

8. The method of claim 7, wherein at least one portion of the second group portion of said video images at said second resolution is dynamically definable.

9. The method of claim 8, wherein said dynamic definition of at least one portion of the second group portion is derived by signal processing of the information contained in said video images.

10. The method of claim 9, wherein at least one portion of the second group portion is dynamically defined to track a moving object within said video images.

11. The method of claim 9, wherein at least one portion of the second group portion is defined to dynamically correspond with a moving object within said video images.

* * * * *